US012708157B2

(12) United States Patent
Cui et al.

(10) Patent No.: US 12,708,157 B2
(45) Date of Patent: Aug. 18, 2026

(54) INFRARED-TRANSPARENT POROUS POLYMER TEXTILE FOR HUMAN BODY COOLING AND HEATING

(71) Applicant: The Board of Trustees of the Leland Stanford Junior University, Stanford, CA (US)

(72) Inventors: Yi Cui, Stanford, CA (US); Shanhui Fan, Stanford, CA (US); Po-Chun Hsu, Stanford, CA (US); Alex Yu Song, Stanford, CA (US); Peter B. Catrysse, Stanford, CA (US); Yucan Peng, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 868 days.

(21) Appl. No.: 16/066,247

(22) PCT Filed: Feb. 17, 2017

(86) PCT No.: PCT/US2017/018420
§ 371 (c)(1),
(2) Date: Jun. 26, 2018

(87) PCT Pub. No.: WO2017/143222
PCT Pub. Date: Aug. 24, 2017

(65) Prior Publication Data

US 2019/0008217 A1 Jan. 10, 2019

Related U.S. Application Data

(60) Provisional application No. 62/296,549, filed on Feb. 17, 2016.

(51) Int. Cl.
*A41D 13/002* (2006.01)
*A41D 27/28* (2006.01)
(Continued)

(52) U.S. Cl.
CPC ......... *A41D 13/002* (2013.01); *A41D 31/065* (2019.02); *B32B 27/12* (2013.01);
(Continued)

(58) Field of Classification Search
CPC .............................. A41D 13/002; A41D 27/28
(Continued)

(56) References Cited

U.S. PATENT DOCUMENTS 5,560,974 A * 10/1996 Langley .................. B32B 27/12
428/315.7
5,750,242 A 5/1998 Culler
(Continued)

FOREIGN PATENT DOCUMENTS

JP 63035810 A 2/1988
JP 11-503379 A 3/1999
(Continued)

OTHER PUBLICATIONS

Tong, Jonathan K. et al., "Infrared-Transparent Visible-Opaque Fabrics for Wearable Personal Thermal Management," May 29, 2015, ACS Photonics, 2, pp. 769-778. (Year: 2015).*
(Continued)

*Primary Examiner* — Peter Y Choi
(74) *Attorney, Agent, or Firm* — Sheppard, Mullin, Richter & Hampton LLP; Xin Xie

(57) ABSTRACT

A method of regulating a temperature of a human body includes: (1) providing an article of clothing including a textile, wherein the textile includes at least one porous layer including a polyolefin; and (2) placing the article of clothing adjacent to the human body. The porous layer has pores having an average pore size in a range of 50 nm and 1000 nm.

5 Claims, 35 Drawing Sheets

Coating

(51) Int. Cl.
*A41D 31/06* (2019.01)
*B32B 27/12* (2006.01)
*D01F 6/04* (2006.01)
*D01F 6/62* (2006.01)
*D06M 15/356* (2006.01)
*D06M 17/00* (2006.01)
*D06N 3/00* (2006.01)
*D06N 3/04* (2006.01)

(52) U.S. Cl.
CPC .................. *D01F 6/04* (2013.01); *D01F 6/62* (2013.01); *D06M 15/3562* (2013.01); *D06M 17/00* (2013.01); *D06N 3/0054* (2013.01); *D06N 3/0063* (2013.01); *D06N 3/04* (2013.01); *D06N 3/047* (2013.01); *A41D 27/28* (2013.01); *D06N 2209/065* (2013.01)

(58) Field of Classification Search
USPC .................................. 442/59, 131, 132, 133
See application file for complete search history.

(56) References Cited

U.S. PATENT DOCUMENTS 5,950,237 A 9/1999 Micheron et al.
5,955,175 A 9/1999 Culler
6,861,134 B1* 3/2005 Peters .................... G02B 5/124 359/529
8,918,919 B2 12/2014 Scholz
2008/0311392 A1* 12/2008 Tsu ...................... A01G 9/1438 428/336
2014/0271754 A1* 9/2014 Blaney .................... B32B 27/30 424/402
2014/0356574 A1* 12/2014 Conolly .................. B32B 5/026 204/192.15
2015/0275418 A1 10/2015 Nohara

FOREIGN PATENT DOCUMENTS

JP 2001524200 A 11/2001
WO 1996032252 A1 10/1996
WO 1998012494 A1 3/1998

OTHER PUBLICATIONS

Po-Chun Hsu et al. , "Radiative human body cooling by nanoporous polyethylene textile", Science 353,1019-1023(2016), available at https://www.science.org/doi/10.1126/science.aaf5471. (Year: 2016).*
Communication Pursuant to Article 94(3) EPC on EP Application No. 17753946.7 dated May 28, 2020, 5 pages.
First Office Action and Search Report on CN Application No. 201780011262.X dated Dec. 26, 2019, 21 pages (English Translation).
International Preliminary Report on Patentability for PCT Application No. PCT/US2017/018420 dated Aug. 30, 2018, 8 pages.
Communication Pursuant to Rules 70(2) and 70a(2) EPC issued in EP Application No. EP 17753946.7 Dtd Aug. 1, 2019.
Supplementary European Search Report issued in European Application No. EP 17753946.7 Dtd Jul. 15, 2019, 6 pages.
International Search Report and Written Opinion (ISA/KR) for International Application No. PCT/US2017/018420, mailed May 30, 2017.

* cited by examiner

Heating

• Metal coating reflects IR

Cotton

Polyester

Nylon

Silk

Spandex

INFRARED-TRANSPARENT POROUS POLYMER TEXTILE FOR HUMAN BODY COOLING AND HEATING

CROSS-REFERENCE TO RELATED APPLICATION

This application is a national stage entry under 35 U.S.C. § 371 of International Application No. PCT/US2017/018420, filed Feb. 17, 2017, which claims the benefit of U.S. Provisional Application No. 62/296,549, filed Feb. 17, 2016, the content of which is incorporated herein by reference in its entirety.

STATEMENT REGARDING FEDERALLY SPONSORED RESEARCH OR DEVELOPMENT

This invention was made with Government support under contract DE-AR0000533 awarded by the Department of Energy. The Government has certain rights in the invention.

BACKGROUND

Indoor heating, ventilation, and air conditioning (HVAC) contributes about one-third of the global energy consumption. Reducing usage of HVAC can benefit both the economy and the environment. For example, expanding a setpoint range of HVAC by about +/−4° F. can save more than about 30% of energy consumption of buildings. Human body heat dissipation has three forms: conduction, convection, and radiation. Among these dissipation routes, radiation accounts for about 40% or more of the total heat loss under normal skin conditions, but traditional textiles are not designed to control radiative heat loss. Traditional textiles trap air around the human body to change convection or conduction dissipation rates. However, the heat dissipation from radiation typically is not adequately controlled by traditional textiles. It is desirable to provide a textile material that is infrared (IR)-transparent and can tune its thermal property by radiation control.

It is against this background that a need arose to develop embodiments of this disclosure.

SUMMARY

An IR-transparent textile with a cooling/heating bifunctional effect can help reduce indoor HVAC usage. Some embodiments of this disclosure use a porous IR-transparent textile to help human body dissipate radiation for improved cooling compared to traditional textiles. The porous structure of IP-transparent textiles also has a higher breathability and higher air permeability. When combining with coatings, this textile can become reflective to human body IR radiation and operate in a heating mode.

Unlike traditional textiles, an IR-transparent textile of some embodiments has a low absorption of IR radiation emitted by a human body, so the IR radiation can be transmitted freely into an environment and result in a wearer feeling cooler. Meanwhile, pores are suitably sized to scatter visible light and render the textile opaque to visible light. In some embodiments, the pores are sized to primarily scatter visible light rather than IR radiation. These pores can be interconnected, and can render the textile breathable and increase heat dissipation via conduction and convection. The result is an IR-transparent and visibly opaque textile. Besides an IR-transparent porous textile for cooling purpose, it can be provided with bifunctionality, namely, cooling and heating in the same piece of textile. To realize the bifunctionality, the textile incorporates a dual layer which has high emissivity on one side and low emissivity on the other. When the low-emissivity layer faces outside, it constrains the thermal radiation loss and keeps a wearer warm. On the other hand, when the high-emissivity layer faces outwards, the thermal radiation is free to emit and the wearer feels cooler.

In some embodiments, a method of regulating a temperature of a human body is provided. The method includes placing a textile adjacent to the human body, wherein the textile includes at least one layer or sheet including a porous polyolefin or other porous polymer, wherein the layer has pores having sizes in a range of about 50 nm and about 1000 nm and wherein the layer is IR-transparent and opaque to visible light.

In some embodiments, the porous polyolefin is porous polyethylene. In some embodiments, the porous polyolefin is porous polypropylene. Another porous polyolefin can be used, such as another thermoplastic polyolefin or polyolefin elastomer having suitable pores. Other porous polymers can be used, such as polymers substantially devoid of one or more of the following functional groups: C—O; C—N; aromatic C—H; and S═O, such as polymers with a content of no greater than about 1 mmole/g, no greater than about 0.1 mmole/g, no greater than about 0.01 mmole/g, no greater than about 0.001 mmole/g, or no greater than about 0.0001 mmole/g of one or more of these functional groups.

In some embodiments, the porous polyolefin (or other porous polymer) has or defines pores which are sized to primarily scatter visible light instead of IR radiation. For example, the pores can be nano-sized (e.g., as nanopores) so as to be comparable to wavelengths of visible light and below wavelengths of IR radiation, or below wavelengths of mid-IR radiation. In some embodiments, the pores have an average pore size in a range of about 50 nm and about 1000 nm, such about 50 nm to about 900 nm, about 50 nm to about 800 nm, about 50 nm to about 700 nm, about 50 nm to about 600 nm, about 50 nm to about 500 nm, about 50 nm to about 400 nm, about 100 nm to about 400 nm, or about 500 nm and about 1000 nm, although larger pores having an average pore size up to about 2 μm or up to about 3 μm are also contemplated. In some embodiments, the porous polyolefin (or other porous polymer) has an average pore size no greater than about 1000 nm, such as within the stated ranges in the foregoing. A pore size can be determined using, for example, the Barret-Joyner-Halenda model. In some embodiments, the porous polyolefin (or other porous polymer) has a pore volume (corresponding to empty spaces or voids due to presence of the pores) in a range of about 10% and about 90%, such as about 20% to about 80%, about 30% to about 70%, or about 40% to about 60%, or in a range of at least about 10%, such as at least about 15%, at least about 20%, at least about 25%, at least about 30%, at least about 35%, or at least about 40%, and up to about 60%, up to about 70%, or more.

In some embodiments, the layer including the porous polyolefin (or other porous polymer) has a transmittance of IR radiation at a wavelength of 9.5 μm of at least about 30%, at least about 40%, at least about 50%, at least about 60%, at least about 70%, or at least about 80%, and up to about 90% or more, up to about 95% or more, or up to about 98% or more. In some embodiments, the layer including the porous polyolefin (or other porous polymer) has a weighted average transmittance of IR radiation over a wavelength range of 7-14 μm of at least about 30%, at least about 40%, at least about 50%, at least about 60%, at least about 70%, or at least about 80%, and up to about 90% or more or up to about 95% or more. In some embodiments, the layer including the porous polyolefin (or other porous polymer) has an opacity to visible radiation over a wavelength range of 400-700 nm of at least about 30%, at least about 40%, at least about 50%, at least about 60%, at least about 70%, or at least about 80%, and up to about 90% or more, up to about 95% or more, or up to about 99% or more.

In some embodiments, the layer including the porous polyolefin (or other porous polymer) is a nonwoven textile layer including the porous polyolefin (or other porous polymer).

In some embodiments, the textile is multi-layered, the layer is a first layer, and the textile further includes a second layer, such as selected from a layer of cotton (e.g., a cotton mesh) or a layer of polyester (e.g., a polyester mesh). More generally, the layer including the porous polyolefin (or other porous polymer) can be laminated or otherwise combined with one or more additional layers, such as one or more layers of other textile materials (e.g., cotton or polyester).

In some embodiments, the layer including the porous polyolefin (or other porous polymer) is a woven textile layer including the porous polyolefin (or other porous polymer).

In some embodiments, the layer is a woven textile layer including the porous polyolefin (or other porous polymer), wherein the porous polyolefin can be arranged into a yarn and the yarn can be woven into the textile layer, and optionally wherein the yarn can be mixed with another textile material, such as selected from cotton or polyester.

In some embodiments, the textile is chemically treated to become hydrophilic.

In some embodiments, the textile defines a plurality of holes and wherein the holes having a size (e.g., an average diameter) of about 100 μm (more generally, within a range of about 1 μm to about 1 mm) with a spacing (e.g., an average spacing) of about 500 μm (more generally, within a range of about 1 μm to about 1 cm) between adjacent holes.

In some embodiments, the textile provides a cooling or heating effect.

In some embodiments, the textile is coated with an IR reflecting layer to provide a heating effect.

In some embodiments, the textile can be used in a variety of articles of clothing, such as apparel and footwear, as well as other products.

In some embodiments, the layer including the porous polyolefin (or other porous polymer) is a first layer including a first porous polyolefin (or other first porous polymer), and the textile further includes a second layer including a second porous polyolefin (or other second porous polymer) which can be the same or different from the first porous polyolefin (or other first porous polymer) included in the first layer. The textile further includes a first coating and a second coating, wherein the first coating and the second coating have different emissivities with respect to IR radiation, the first coating and the second coating are disposed between the first layer and the second layer, the first coating is adjacent to (e.g., directly next to) the first layer, and the second coating is adjacent to (e.g., directly next to) the first coating and is adjacent to (e.g., directly next to) the second layer. In some embodiments, the first coating is a high-emissivity coating or layer and has an emissivity of IR radiation at a wavelength of 9.5 μm of at least about 0.6, at least about 0.65, at least about 0.7, at least about 0.75, at least about 0.8, at least about 0.85, or at least about 0.9, and the second coating is a low-emissivity coating or layer and has an emissivity of IR radiation at a wavelength of 9.5 μm of no greater than about 0.5, no greater than about 0.45, no greater than about 0.4, no greater than about 0.35, or no greater than about 0.3. In some embodiments, the first coating is a high-emissivity coating or layer and has a weighted average emissivity of IR radiation over a wavelength range of 7-14 μm of at least about 0.6, at least about 0.65, at least about 0.7, at least about 0.75, at least about 0.8, at least about 0.85, or at least about 0.9, and the second coating is a low-emissivity coating or layer and has a weighted average emissivity of IR radiation over a wavelength range of 7-14 μm of no greater than about 0.5, no greater than about 0.45, no greater than about 0.4, no greater than about 0.35, or no greater than about 0.3. In some embodiments, a difference in emissivities (at a wavelength of 9.5 μm or weighted average over a wavelength range of 7-14 μm) of the first coating and the second coating is at least about 0.2, at least about 0.3, at least about 0.4, at least about 0.5, at least about 0.6, or at least about 0.7, and up to about 0.8 or more. In some embodiments, a thickness of the first layer is greater than a thickness of the second layer, such as where the thickness of the first layer is at least about 1.1 times, at least about 1.3 times, at least about 1.5 times, or at least about 1.8 times, and up to about 2 times or more, or up to about 3 times or more of the thickness of the second layer. In some embodiments, placing the textile adjacent to the human body is such that, in a cooling mode, the first coating is placed further away from the human body than the second coating. In some embodiments, placing the textile adjacent to the human body is such that, in a heating mode, the second coating is placed further away from the human body than the first coating. Suitable materials for the first coating include carbonaceous materials (e.g., carbon black or other forms of carbon), non-metal oxides (e.g., silicon dioxide), and non-metal nitrides (e.g., silicon nitride), and suitable materials for the second coating include metals (copper, aluminum, and titanium) and metal alloys.

In some embodiments, the textile has a water vapor transmission rate of at least about 0.005 $g/cm^2 \cdot hr$, at least about 0.008 $g/cm^2 \cdot hr$, at least about 0.01 $g/cm^2 \cdot hr$, at least about 0.012 $g/cm^2 \cdot hr$, at least about 0.014 $g/cm^2 \cdot hr$, or least about 0.016 $g/cm^2 \cdot hr$, and up to about 0.02 $g/cm^2$ hr or more. In some embodiments, the textile has an air permeability of at least about 10 $cm^3/sec \cdot cm^2 \cdot Pa$, at least about 20 $cm^3/sec \cdot cm^2 \cdot Pa$, at least about 30 $cm^3/sec \cdot cm^2 \cdot Pa$, at least about 40 $cm^3/sec \cdot cm^2 \cdot Pa$, at least about 50 $cm^3/sec \cdot cm^2 \cdot Pa$, or at least about 60 $cm^3/sec \cdot cm^2 \cdot Pa$, and up to about 80 $cm^3/sec \cdot cm^2 \cdot Pa$ or more. In some embodiments, the textile has a wicking rate (or distance) of at least about 2 mm, at least about 4 mm, at least about 6 mm, or at least about 8 mm, and up to about 10 mm or more. In some embodiments, the textile has a tensile strength of at least about 10 N, at least about 20 N, at least about 30 N, or at least about 40 N, and up to about 60 N or more. In some embodiments, the textile has a transmittance of IR radiation at a wavelength of 9.5 μm of at least about 30%, at least about 40%, at least about 50%, at least about 60%, at least about 70%, or at least about 80%, and up to about 90% or more, up to about 95% or more, or up to about 98% or more. In some embodiments, the textile has a weighted average transmittance of IR radiation over a wavelength range of 7-14 μm of at least about 30%, at least about 40%, at least about 50%, at least about 60%, at least about 70%, or at least about 80%, and up to about 90% or more or up to about 95% or more. In some embodiments, the textile has an opacity to visible radiation over a wavelength range of 400-700 nm of at least about 30%, at least about 40%, at least about 50%, at least about 60%, at least about 70%, or at least about 80%, and up to about 90% or more, up to about 95% or more, or up to about 99% or more.

In additional embodiments, a textile is provided, wherein the textile includes at least one layer or sheet including a porous polyolefin (or other porous polymer), wherein the layer has pores having sizes in a range of about 50 nm and about 1000 nm, wherein the layer is IR-transparent and opaque to visible light, and wherein the textile is chemically treated to become hydrophilic. In some embodiments, the textile is coated with, or includes a coating of, a hydrophilic agent, such as polydopamine (PDA).

In additional embodiments, a textile is provided, wherein the textile includes at least one woven textile layer or sheet including a porous polyolefin (or other porous polymer), wherein the woven textile layer includes fibers having pores with sizes in a range of about 50 nm and about 1000 nm, wherein the woven textile layer is IR-transparent and opaque to visible light.

In further embodiments, a textile is provided, wherein the textile includes at least one layer or sheet including a porous polyolefin (or other porous polymer), wherein the textile further includes a first coating and a second coating adjacent to the layer including the porous polyolefin, and the first coating and the second coating have different emissivities with respect to IR radiation.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 7A. Molecular structures of textile materials.

FIG. 8. Molecular structure of polyethylene.

DESCRIPTION

Porous Polymer Textile for Radiative Human Body Cooling

Energy consumption and climate change are two challenges for humans in the 21st century. The high consumption of energy directly leads to excessive greenhouse gas emissions which severely disturbs the climate balance and causes global warming and extreme weather. Consequently, efforts have been made to develop renewable energies such as solar, wind, ocean, hydrogen and carbon-neutral fuels. On the other hand, reducing current energy consumption and improving energy efficiency are also desirable.

Energy efficiency, such as using more energy-efficient appliances or building designs, is a cost-effective way to overcome the challenges of energy shortage. Additionally, indoor heating and cooling is a significant part of global energy consumption, and it is desirable to reduce the energy consumption of indoor temperature control. Thermal management on an individual person is a strategy to expand indoor temperature setpoint ranges to save energy and to achieve desirable personal cooling.

Some embodiments of this disclosure introduce IR-transparent textiles for indoor wearers. In some embodiments, the proposed textiles are heating/cooling bifunctional, which helps to reduce the usage of HVAC, without compromising comfort and breathability. The proposed IR-transparent textiles can be useful for any entity who wants to lower its HVAC energy consumption. For example, it can be used for uniforms at work environments and casual apparels for residential houses.

Some embodiments provide a textile to be either IR-transparent for cooling or IR-reflective for heating and therefore is more effective in maintaining desired human skin temperature.

Figure 1:
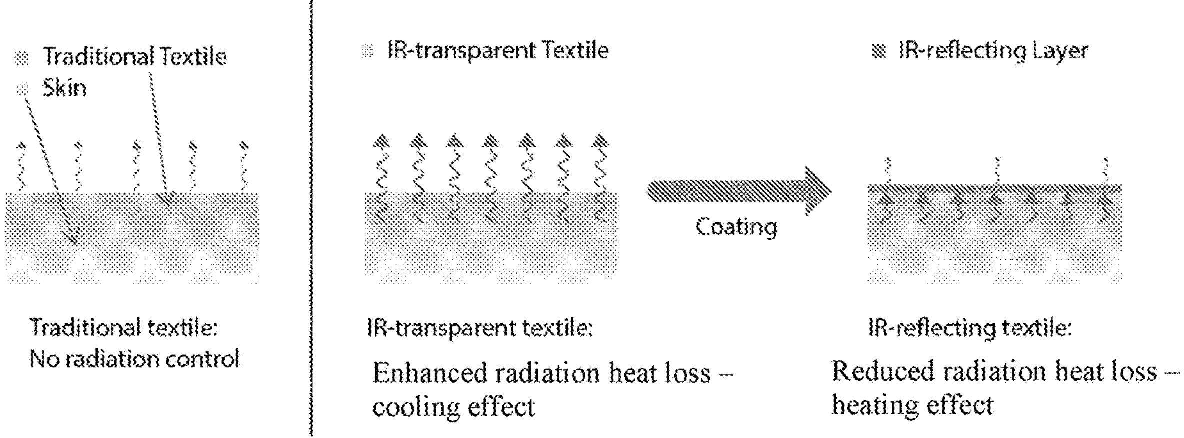
FIG. 1. Concept of photon management control.
Figure 2:
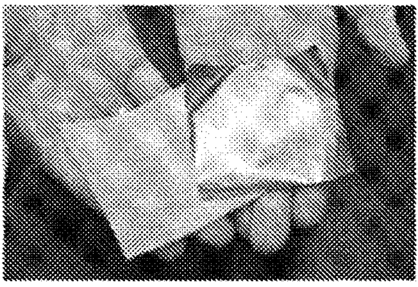
FIG. 2. Example of a textile with heating mode.

Referring to FIG. 1, a traditional textile mainly focuses on improving convection or conduction heat loss to achieve a cooling effect, but is not designed to control radiation heat loss which is a major factor. Porous IR-transparent film is proposed to be used as a textile that allows human body radiation to transmit more freely into an environment and to achieve effective body cooling. The porous structure scatters visible light to make it visibly opaque but still IR-transparent. In addition, the porous structure provides convection/conduction heat loss through its interconnected pores. When coated with an IR-reflecting layer (e.g., a metal layer), this textile turns into a heating mode by trapping human body radiation around a body, as shown in FIG. 2.

Based on the concept of photon management control, a passive thermo-responsive textile is developed which can regulate its radiation dissipation without including electrical wiring. Also, a pore size and geometry can be engineered to achieve higher breathability, and the surface can be chemically modified for improved water affinity.

In some embodiments, this disclosure demonstrates a nanoporous polyethylene (nanoPE) as a textile material which promotes effective radiative cooling to facilitate human body heat dissipation. NanoPE is substantially transparent to mid-IR human body radiation. Based on simulation results, the human skin temperature covered by nanoPE is about 2.7° C. lower than that covered by cotton, resulting in a potential air conditioning energy saving by about 25-35%. The size of nanopores (e.g., about 50-1000 nm) is designed to scatter visible light for an opaque appearance but leaving mid-IR transmittance substantially unchanged. In addition, several treatments were successfully applied for nanoPE for improved wearability, such as air permeability, water wicking rate and mechanical strength suitable for textiles. This nanoPE is both effective and scalable, and can provide an efficient way for indoor energy saving.

Figure 3:
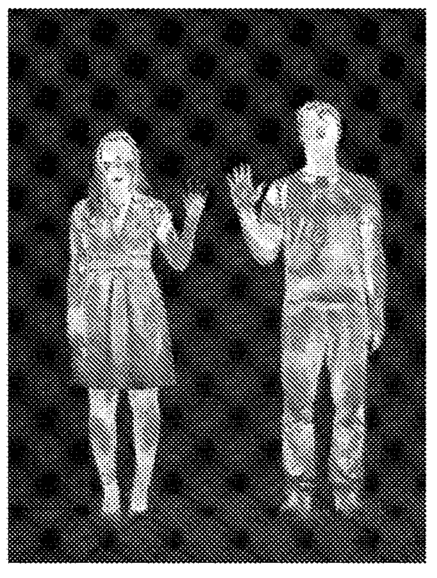
FIG. 3. Radiation of body heat dissipation.

Referring to FIG. 3, at normal skin temperature of about 34° C., a human body emits about 7-14 μm mid-IR radiations with its peak at about 9.5 μm.

In an indoor scenario, IR radiative heat dissipation contributes to more than about 50% of the total body heat loss. If this radiation dissipation pathway can be enhanced during summer and suppressed during winter, the purpose of personal thermal management would be realized. However, traditional textiles have little control over IR radiation. Based on this strategy, passive personal heating can be achieved without additional energy input during cold weather by using metallic nanowires-coated textiles that reflect more than about 40% of human body IR radiation and warm up the human body. As for personal cooling in hot weather, the goal is to render textiles IR-transparent so that human body radiation can be quickly dissipated. Since human skin is an excellent IR emitter (emissivity is about 0.98), an IR-transparent textile allows a great amount of heat to pass through.

Figure 4:
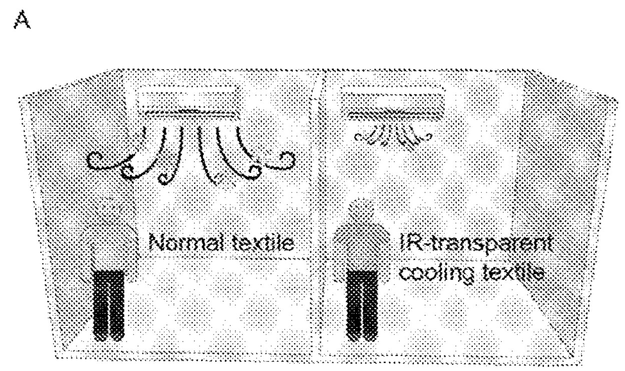
FIG. 4. IR-transparent textile for reducing indoor cooling energy consumption. (A) A schematic explains the function of an IR-transparent textile. Human body radiation dissipates freely through the IR-transparent textile and enhances the body cooling. This means the indoor temperature set by the air conditioner can be higher to lower energy input. Traditional textiles are IR-opaque and do not have adequate radiative cooling effect. (B) Air conditioner setpoint comparison to maintain the same thermal comfort, as the function of IR transmittance of textile. When the textile becomes less insulating, the air conditioner setpoint can increase, without making the wearers uncomfortable. IR-opaque cotton and bare skin are also plotted for comparison. The result shows that radiative cooling effect can greatly reduce the demand for indoor cooling. A polyolefin film can have about 90-95% of IR transmittance and therefore is desirable for IR-transparent textile material.
Figure 4:
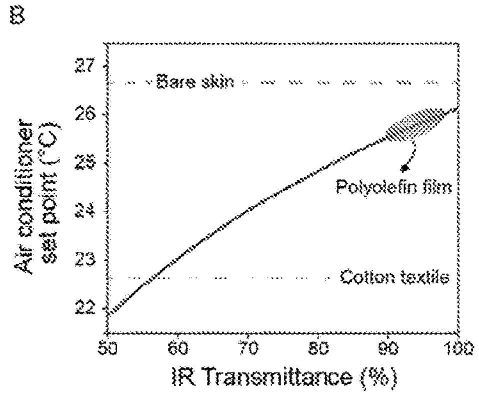

Referring to FIG. 4A, under the premise of having similar convective/conductive cooling effect of normal textile, an IR-transparent textile provides greater human body heat dissipation, so the indoor temperature can be higher without causing thermal discomfort. In terms of energy, increasing the indoor temperature setpoint by about 1° C. can result in energy savings for about 7-15%, and an about 4° C. setpoint difference can save up to about 35-45%. In addition, unlike Peltier cooling or circulated water/air cooling, personal radiative cooling is passive with no additional energy input involved. Therefore, wearing IR-transparent clothes can save substantial amount of energy.

To estimate the impact of textiles on air conditioner setpoint, an example steady-state heat transfer model of clothed human skin is numerically solved. Assuming the metabolic heat generation rate and the skin temperature are substantially constant and the heat transfer is one-dimensional, textiles with lower thermal insulation have a smaller temperature difference between the skin and the air, which means the air conditioner setpoint will be higher. Solving the heat transfer equations at each interface can yield the air conditioner setpoint. Detailed calculations of heat transfer and air conditioner setpoint are set forth below.

Net Radiation Method for Transparent Intermediate Layers

Figure 5:
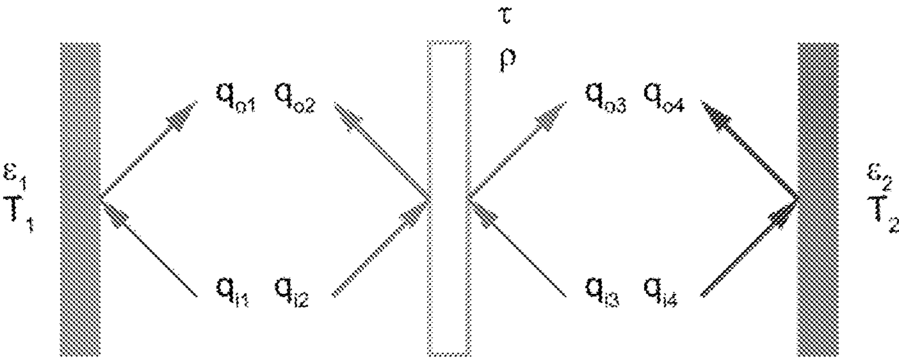
FIG. 5. Geometry for radiative heat transfer between skin and room wall separated by a transparent layer (with reflectivity p and transmissivity z).

To calculate radiation heat transfer between opaque surfaces (skin and room wall) with a transparent layer (ideal non-absorbing textile) between them, a modified net radiation method is used, which applies to systems involving walls that are transparent for radiant energy. As illustrated in FIG. 5, the net radiation equations for the geometry are as follows:

At surface 1 (skin)

$$q_{i,1} + q = q_{o,1} \tag{1}$$

$$q_{o,1} = \varepsilon_1 \sigma T_1^4 + (1-\varepsilon_1) q_{i,1} \tag{2}$$

At surface 2 (wall)

$$q_{i,4} = q + q_{o,4} \tag{3}$$

$$q_{o,4} = \varepsilon_2 \sigma T_2^4 + (1-\varepsilon_2) q_{i,4} \tag{4}$$

For the transparent layer (ideal non-absorbing textile, $\varepsilon_3=0$)

$$q_{o,2} = q_{i,3}\tau + q_{i,2}\rho \tag{5}$$

$$q_{o,3} = q_{i,2}\tau + q_{i,3}\rho \tag{6}$$

where τ and ρ are the overall transmissivity and reflectivity of the layer. The outward and inward radiative heat fluxes $q_o$ and $q_i$ are related as:

$$q_{i,3} = q_{o,4}, \quad q_{i,2} = q_{o,1} \tag{7}$$

$$q_{i,1} = q_{o,2}, \quad q_{i,4} = q_{o,3}$$

These relations are solved for q (W/m$^2$), which is the heat flux being transferred from the skin to the wall. The result is simplified by using the relation $\rho=1-\tau$, between the reflectivity and transmissivity (valid for a non-absorbing layer) to yield:

$$q = \frac{\sigma(T_1^4 - T_2^4)}{\frac{1}{\varepsilon_1} + \frac{1}{\varepsilon_2} + \frac{1}{\tau} - 2} \tag{8}$$

For radiative heat transfer between two opaque surfaces, $\tau=1$ is assumed in equation (8) to yield:

$$q = \frac{\sigma(T_1^4 - T_2^4)}{\frac{1}{\varepsilon_1} + \frac{1}{\varepsilon_2} - 1} \tag{9}$$

Air Conditioner Setpoint Simulation

Figure 6:
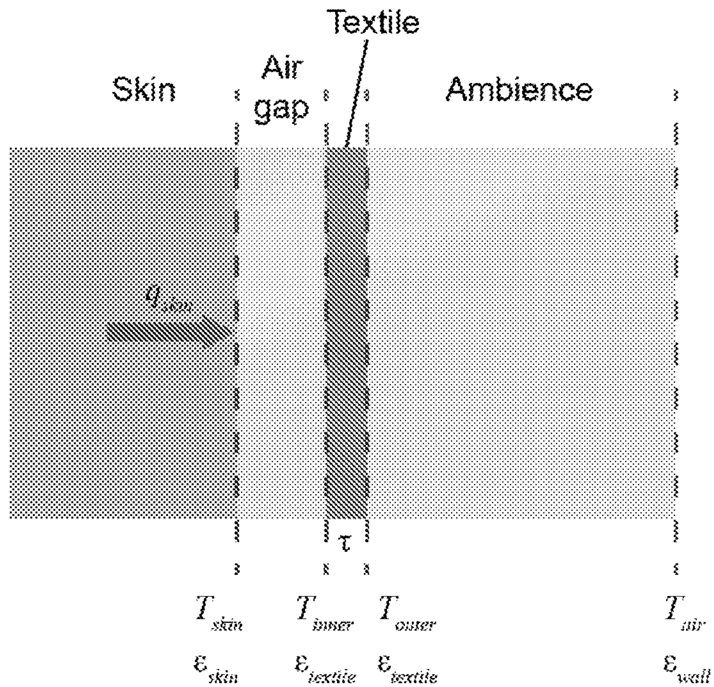
FIG. 6. Schematic of heat transfer model of clothed human skin.

The air conditioner setpoint specifies the ambient temperature based on different textile insulation property at constant skin temperature ($T_{skin}$=34° C.) and constant body heat generation (q=70 W/m$^2$). First, a model is used to simulate the heat transport from the human skin to the ambient environment as an one-dimensional, steady-state problem. The model schematic is shown in FIG. 6.

Since there is no other heat source, the total heat flux should equal the metabolic heat flux at every position, and it is contributed by radiation and non-radiation heat transfer:

$$q_{total} = q_{skin} = q_{radiation} + q_{non-radiation} \tag{10}$$

There are three unknowns: the air conditioner setpoint ($T_{air}$), the textile outer surface temperature ($T_{outer}$), and the textile inner surface temperature ($T_{inner}$). The three heat transport equations describe the heat transfer mechanism at the textile outer surface, inside the textile, and in the air gap. For IR-opaque textiles, the outer surface heat transfer includes natural convection and radiation. Inside the textile, heat conduction dominates. In the air gap, there are air conduction and radiation. Note the Rayleigh number for the air gap is of the order of 0.2, so the non-radiation heat transfer is mostly conduction instead of convection. For the IR-transparent textile, the non-radiation heat transfer equations are the same as the IR-opaque textile. The radiation heat flux, however, contributes to the total heat flux inside the textile and has the same value everywhere between the skin and the air. This is because the IR-transparent textile is assumed to have zero emissivity, so there are two radiation emitters: the skin and the wall. The equations for the bare skin, IR-opaque textile, and IR-transparent textile are as follows:

Bare Skin $$h(T_{skin} - T_{air}) + \frac{\sigma(T_{skin}^4 - T_{air}^4)}{\frac{1}{\varepsilon_{skin}} + \frac{1}{\varepsilon_{wall}} - 1} = q_{skin} \tag{11}$$

IR-opaque textile $$\begin{cases} \text{Top surface} & h(T_{outer} - T_{air}) + \dfrac{\sigma(T_{outer}^4 - T_{air}^4)}{\frac{1}{\varepsilon_{textile}} + \frac{1}{\varepsilon_{wall}} - 1} = q_{skin} & (12) \\ \text{Inside} & \dfrac{k_{textile}}{t_{textile}}(T_{inner} - T_{outer}) = q_{skin} & (13) \\ \text{Air gap} & \dfrac{k_{air}}{t_{air}}(T_{skin} - T_{inner}) + \dfrac{\sigma(T_{skin}^4 - T_{inner}^4)}{\frac{1}{\varepsilon_{skin}} + \frac{1}{\varepsilon_{textile}} - 1} = q_{skin} & (14) \end{cases}$$

IR-transparent textile $$\begin{cases} \text{Top surface} & h(T_{outer} - T_{air}) + \dfrac{\sigma(T_{skin}^4 - T_{air}^4)}{\frac{1}{\varepsilon_{skin}} + \frac{1}{\varepsilon_{wall}} + \frac{1}{\tau} - 2} = q_{skin} & (15) \\ \text{Inside} & \dfrac{k_{textile}}{t_{textile}}(T_{inner} - T_{outer}) + \dfrac{\sigma(T_{skin}^4 - T_{air}^4)}{\frac{1}{\varepsilon_{skin}} + \frac{1}{\varepsilon_{wall}} + \frac{1}{\tau} - 2} = q_{skin} & (16) \\ \text{Air gap} & \dfrac{k_{air}}{t_{air}}(T_{skin} - T_{inner}) + \dfrac{\sigma(T_{skin}^4 - T_{air}^4)}{\frac{1}{\varepsilon_{skin}} + \frac{1}{\varepsilon_{wall}} + \frac{1}{\tau} - 2} = q_{skin} & (17) \end{cases}$$

where the parameters are as follows:

TABLE 1

| Symbol | Explanation | Value | Unit |
|---|---|---|---|
| $q_{skin}$ | Metabolic heat flux | 70 | $W \cdot m^{-2}$ |
| h | Natural convection heat transfer coefficient | 3 | $W \cdot m^{-2} \cdot K^{-1}$ |
| k | Thermal conductivity | Textile, $k_{textile} = 0.069$<br>Air gap, $k_{air} = 0.03$ | $W \cdot m^{-1} \cdot K^{-1}$ |
| t | Thickness | Textile, $t_{textile} = 300$<br>Air gap, $t_{air} = 1000$ | μm |
| σ | Stefan-Boltzmann constant | $5.67 \times 10^{-8}$ | $W \cdot m^{-2} \cdot K^{-4}$ |
| ε | Surface emissivity | Room wall, $\varepsilon_{wall} = 1$<br>Skin, $\varepsilon_{skin} = 0.98$<br>IR-opaque textile, $\varepsilon_{textile} = 0.77$ | unitless |
| τ | IR transmittance | 0.5~1 | unitless |
| T | Temperature | Skin, $T_{skin} = 307.15$<br>Air conditioner set point, $T_{air}$<br>Textile outer surface, $T_{outer}$<br>Textile inner surface, $T_{inner}$ | K |

Since the surface emissivity of IR-transparent textile is assumed to be zero, the IR reflectance of the partially IR-transparent textile yields $\rho=1-\varepsilon-\tau=1-\tau$. For radiation dissipation, reflection reverses the heat transport. Absorption and re-radiation can at least partially transport heat toward both sides. This is the reason why partially IR-transparent textiles are warmer than IR-opaque textiles when τ is less than about 0.56.

Referring to FIG. 4B, the simulation shows that the bare skin is the upper threshold for air conditioner setpoint. For the IR-transparent textile, as the IR transmittance increases, the setpoint rises due to the additional radiative cooling. When the IR transmittance reaches about 95%, the setpoint becomes about 25.8° C., about 0.8° C. lower than that of bare skin. This level of IR transmittance can be achieved by polyolefin films. The same simulation is done for cotton textile, except that cotton is IR-opaque and thus follows different radiation heat transfer equations. It is shown that, due to the lack of adequate radiative cooling, the setpoint for cotton textile is about 22.6° C., which is about 3.2° C. lower than about 95% transparent textile. The simulation demonstrates that radiative cooling can significantly promote heat dissipation that cannot be achieved by convective/conductive cooling alone.

Figure 7A:
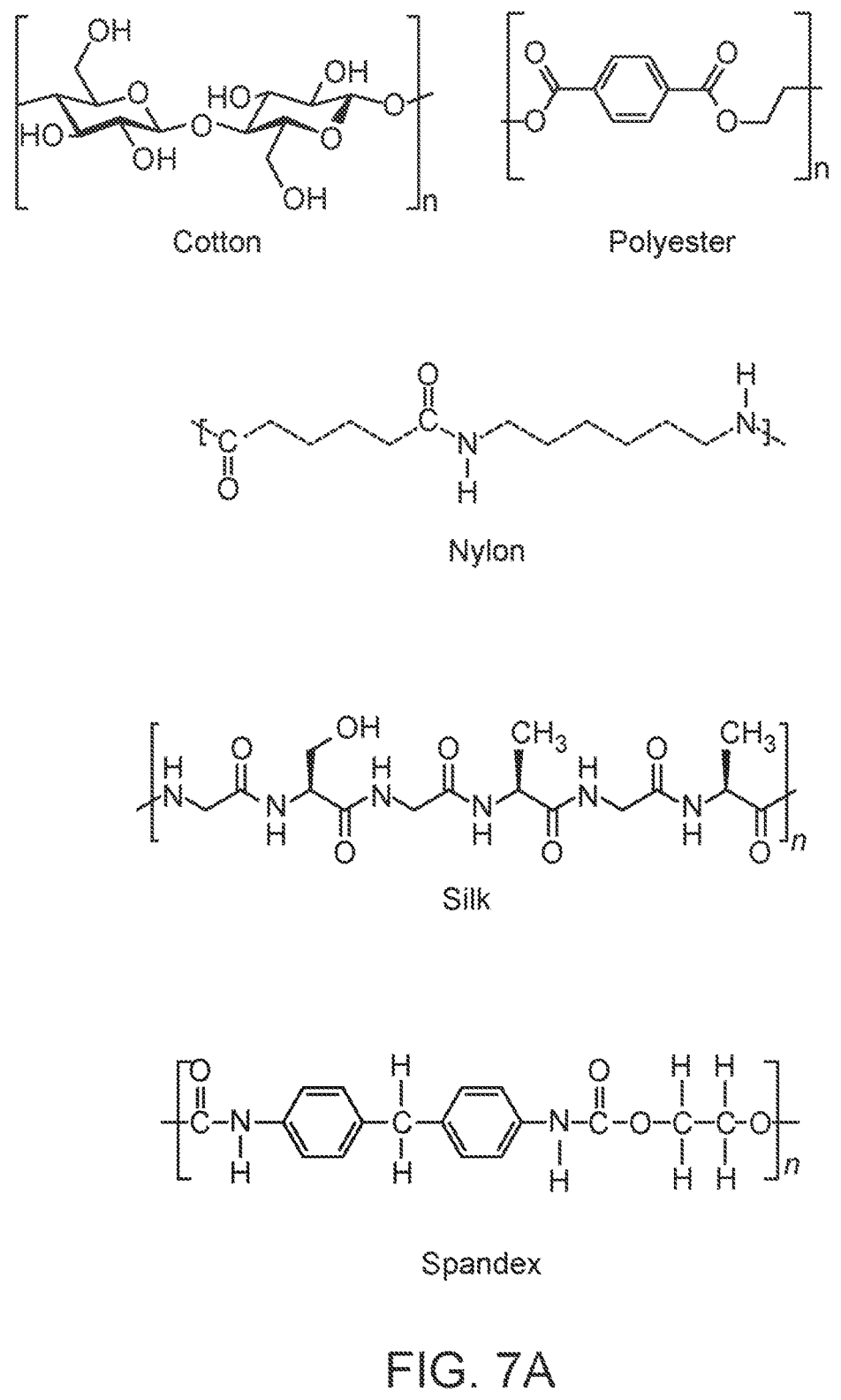
Figure 7B:
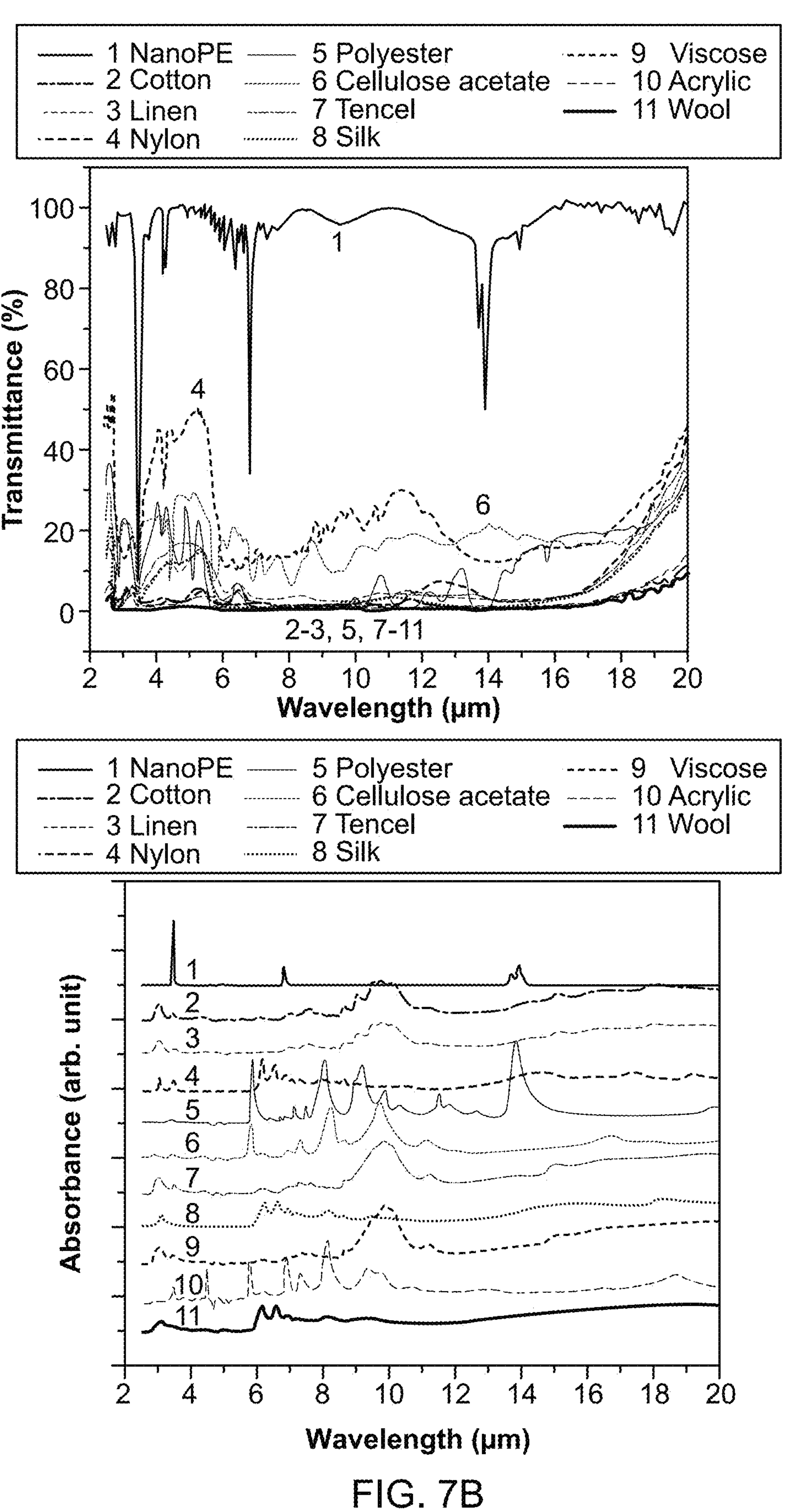
FIG. 7B. IR properties of other textile materials versus nanoporous polyethylene (NanoPE). (A) Fourier transform infrared spectroscopy (FTIR) total transmittance spectra. (B) Attenuated total reflectance (ATR) FTIR spectra show several absorption peaks of other fabrics occur within the wavelength range of human body radiation.

Despite holding great potential to enhance cooling effect, it is desirable to identify textile materials transparent to IR but opaque to visible light. The radiation spectrum (about 7-14 μm) overlaps with most of the IR absorption wavelength of traditional textile materials, such as C—O stretching (about 7.7-10 μm), C—N stretching (about 8.2-9.8 μm), aromatic C—H bending (about 7.8-14.5 μm), S═O stretching (about 9.4-9.8 μm), and so on. FIG. 7A shows the molecular structures of several textile materials. As illustrated in FIG. 7B, several textile materials strongly absorb human body radiation and have low IR transparencies.

Figure 8:
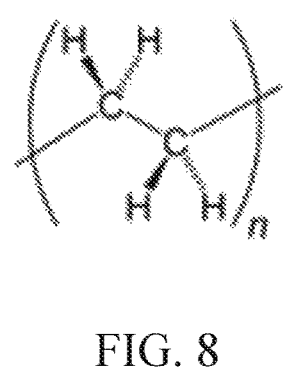

Referring to FIG. 8, polyolefins such as polyethylene (PE) has aliphatic C—C and C—H bonds, and its relatively narrow absorption peaks are about 3.4 μm, about 3.5 μm, about 6.8 μm, about 7.3 μm and about 13.7 μm, which are all far away from the peak of human body radiation. However, a typical PE film is undesirable as a textile material because PE is visibly transparent and does not have desired properties for textiles, such as air permeability and water wicking.

Figure 9:
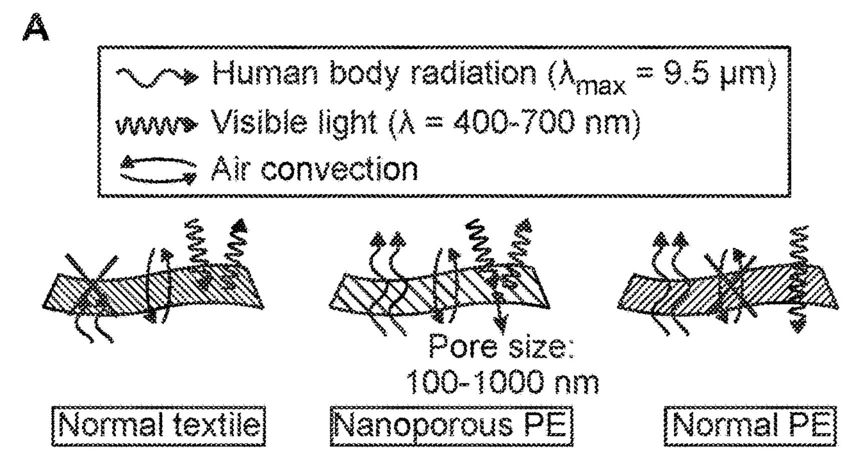
FIG. 9. IR property and morphology of nanoPE. (A) Schematics of comparison between nanoPE, normal PE, and cotton. NanoPE satisfies IR transparency, visible light opacity, and convection simultaneously. (B) Simulated total and specular transmittance of IR and visible light, respectively. (C) Simulated weighted average transmittance based on human body radiation for various pore sizes. The average transmittance drops from above about 90% to about 80% as the pore size increases and begin to affect the transmission of human body radiation. (D) Image of nanoPE shows its scalability. (E) Scanning Electron Microscopy (SEM) image of nanoPE. The inset is a zoomed-in SEM image of nanoPE. The nanopores are about 50-1000 nm in size, which is desirable to ensure high IR transmittance. (F) Total FTIR transmittance of nanoPE, normal PE, and cotton. Because of the small pore size, nanoPE is as transparent as normal PE. Cotton, on the other hand, is opaque. (G) Image of the samples. NanoPE has a similar appearance as cotton, but typical PE is transparent and not suitable as a textile material. (H) Visible opacity measurement quantitatively confirms that nanoPE is as opaque as cotton.
Figure 9:
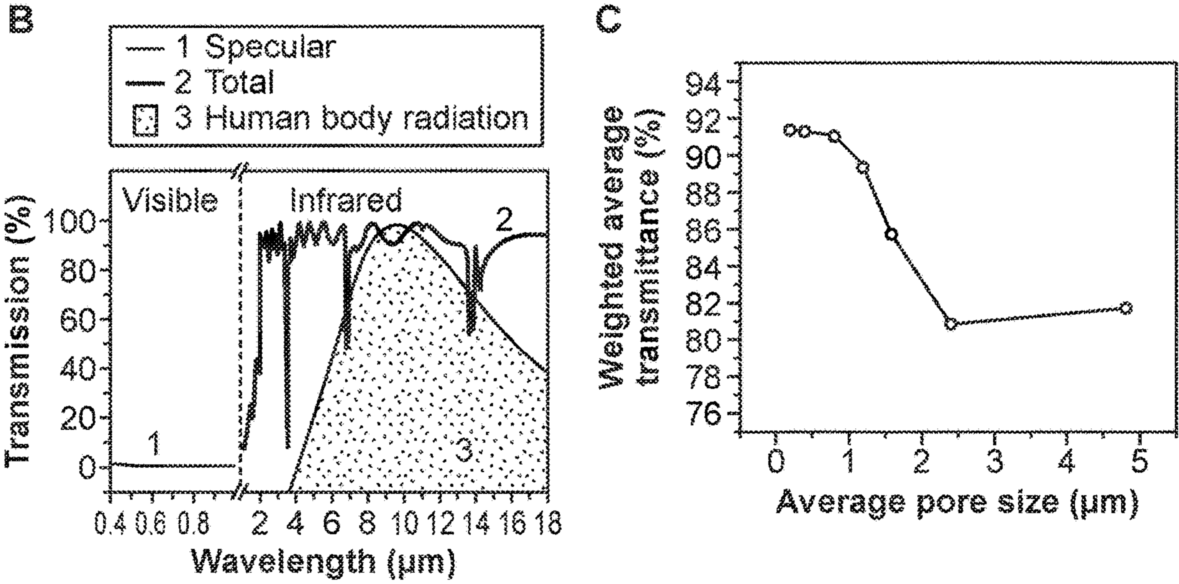
Figure 9:
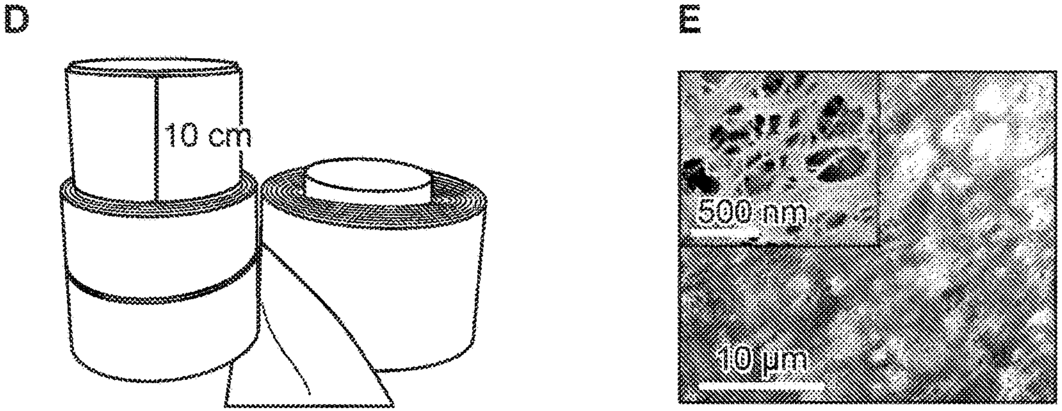
Figure 9:
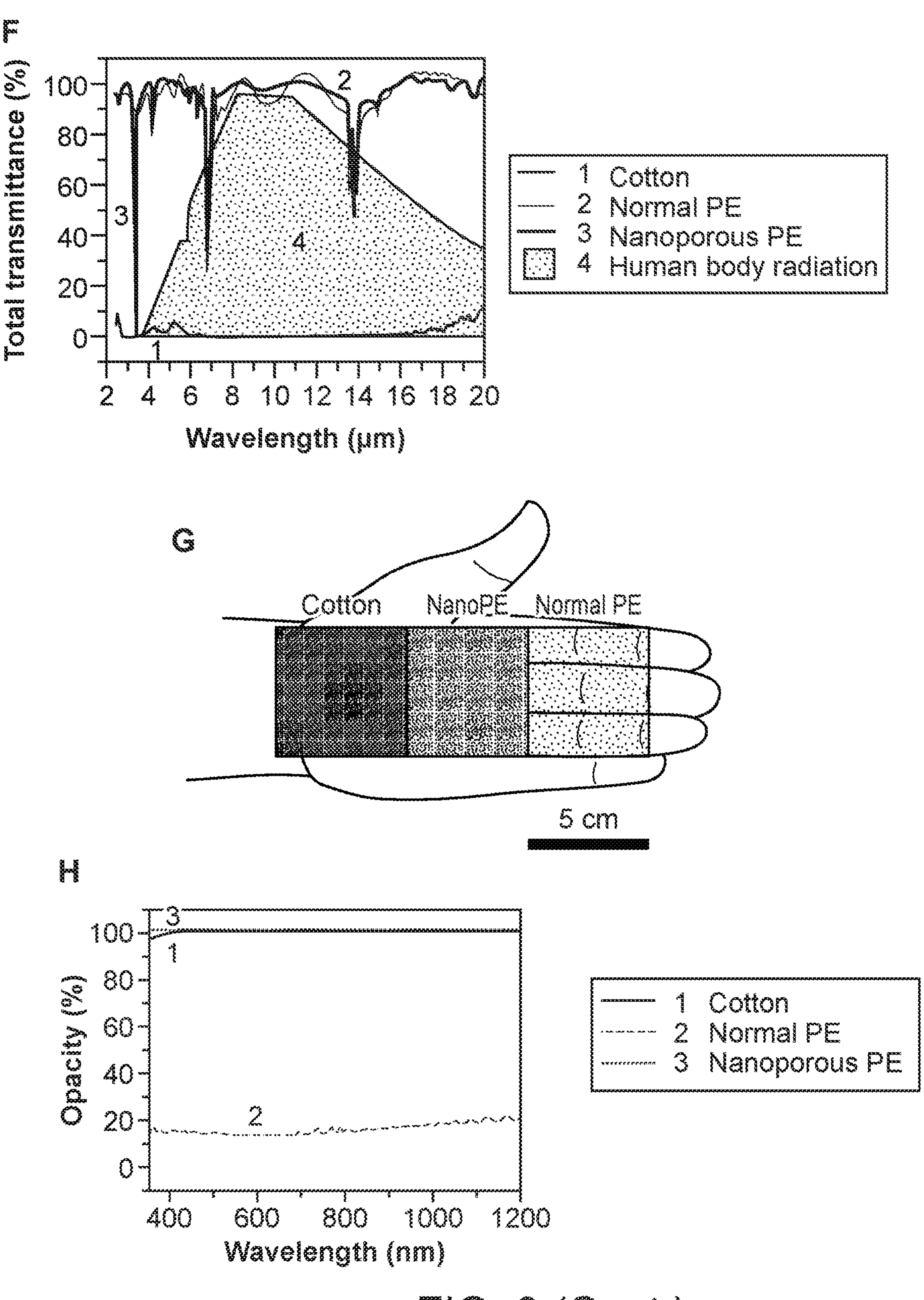

Referring to FIG. 9A, in some embodiments, this disclosure proposes nanoPE as a desirable IR-transparent textile for human body cooling. NanoPE has interconnected pores that are about 50-1000 nm in size. The nanoPE offers multiple attractive features: (1) the pore sizes are in the size range comparable to the wavelength of visible light (about 400-700 nm), which can scatter visible light strongly and render PE opaque to human eyes; (2) the pore sizes are much smaller than IR wavelengths, so the nanoPE film is still highly transparent to IR; and (3) interconnected pores increase air permeability and can have water wicking when the polyethylene surface is chemically modified to be hydrophilic.

Referring to FIG. 9B, to confirm the photonic effects for dual wavelength range (visible and IR), rigorous coupled-wave analysis (RCWA) was used to numerically simulate the transmittance of nanoPE with about 400 nm of average pore size in both visible and IR ranges. The human body radiation spectrum is shown for reference. The nanoPE does show above about 90% total transmittance in IR regions with a cut-off at about 2 μm. For visible light regions ($\lambda<1$ μm), specular transmittance was used to better represent the visual appearance. As expected, the nanoPE has low visible light specular transmittance due to strong scattering of the nanopores.

Figures 10, 11:
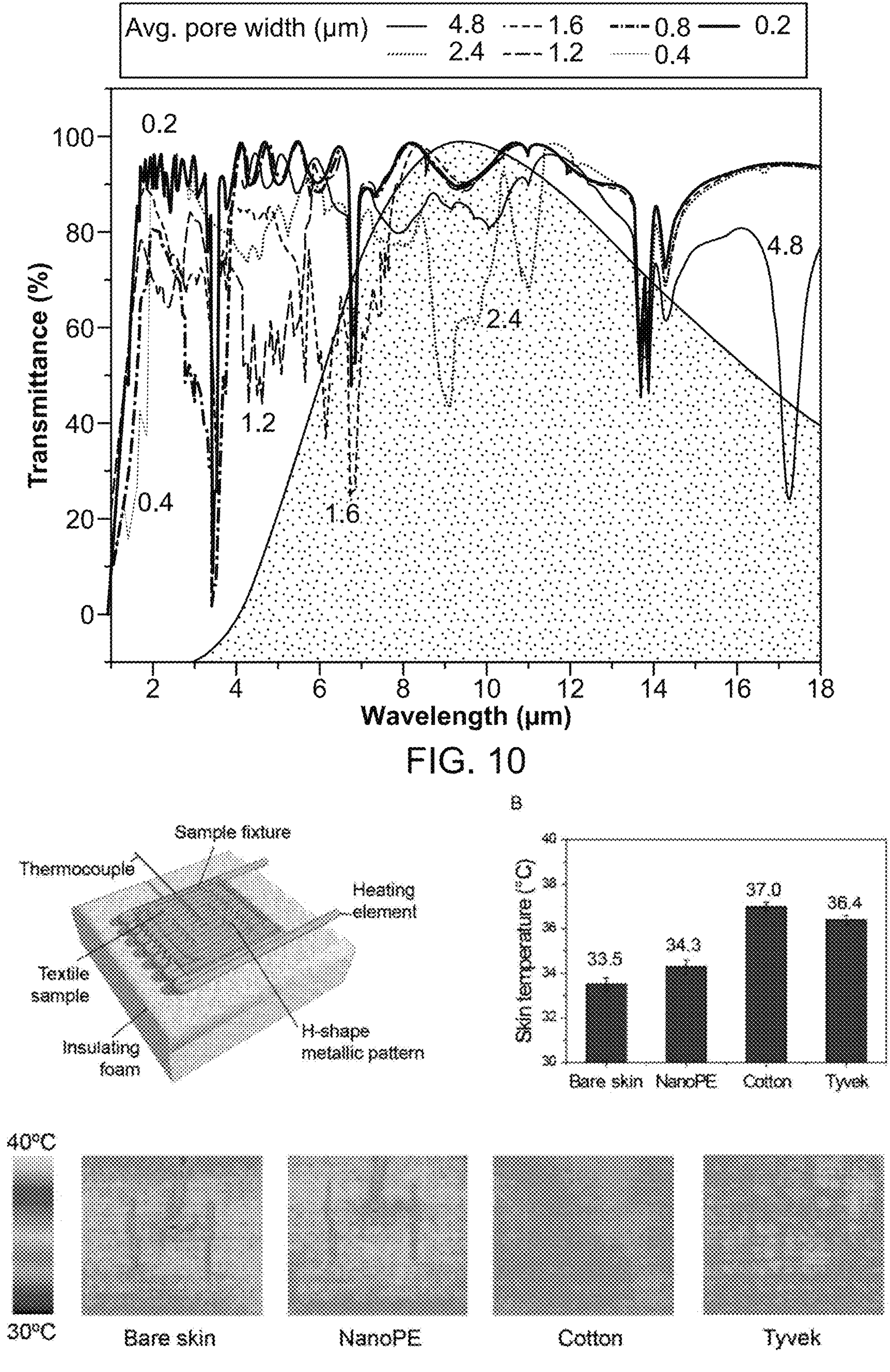
FIG. 10. Simulation of IR transmittance for various pore sizes. The average pore sizes are about 0.2 μm, about 0.4 μm, about 0.8 μm, about 2 μm, about 1.6 μm, about 2.4 μm, and about 4.8 μm. As the pore size increases, the corresponding transmittance dip shifts toward longer wavelength, which will reduce the average transmittance to human body radiation (represented by the grey shadow area).
FIG. 11. Thermal measurement of nanoPE and various textile samples. (A) Experimental setup of textile thermal measurement. A heating element which generates substantially constant heating power is used to simulate human skin, and the "skin temperature" is measured by a thermocouple. Lower skin temperature indicates a better cooling effect. (B) Thermal measurement of bare skin, nanoPE, cotton, and Tyvek. NanoPE has better cooling effect than cotton and Tyvek because of its high IR transparency. (C) Thermal imaging of bare skin and the three samples. NanoPE can reveal the H-shape metallic pattern because of its IR transparency.

Referring to FIG. 10, the pore size dependence of IR transmittance is also evaluated. When the average pore size increases from about 200 nm to about 4.8 μm, the scattering-induced transmittance dip moves from visible to near-IR and then mid-IR. When the transmittance dip moves into the range of about 7-14 μm, the PE film becomes less transparent to human body radiation.

Referring to FIG. 9C and FIG. 10, the weighted average IR transmittance based on human body radiation starts to decay at a pore size of about 1.2 μm and reaches minimum at about 2.4 μm. At about 4.8 μm, the transmittance dip moves towards a longer wavelength which is away from human body radiation, so the weighted average transmittance slightly increases. The simulation result supports the proposed benefit of nanoPE and serves as a guideline to achieve a desired textile.

As shown in FIG. 9D, nanoPE has a white appearance and is opaque to visible light, unlike typical visibly transparent PE films.

Referring to FIG. 9E, the SEM image shows that nanoPE has nanopores of about 50-1000 nm in size and some aligned fiber-like structures which are a few micrometers wide. The zoomed-in SEM image (FIG. 9E, inset) shows the nanopores which satisfy the size specification of a desirable IR-transparent textile and form pathways for fluid permeation. FIG. 9F shows the total IR transmittance measured by an FTIR spectrometer equipped with a diffuse gold integrating sphere. The nanopores do not noticeably affect the total IR transmittance, giving almost the same transmittance for nanoPE and normal PE. To evaluate the effective transmittance, their weighted average transmittances based on human body radiation are about 96.0% for nanoPE, about 93.8% for normal PE, and about 1.5% for cotton. The high transmittance indicates the narrow absorption peaks of PE have little impact on human body radiation. Besides IR transmittance, the visible appearance is also compared in FIG. 9G. NanoPE and cotton both exhibit white color due to visible light scattering, while normal PE is visibly transparent. To evaluate their visible appearance quantitatively, opacity is first specified as the ability to prevent an object behind the textile to be recognized, so it is expressed as (1−specular transmittance)×100%. Using an ultraviolet-visible (UV-Vis) spectrometer, their opacities are shown in FIG. 9H. Both nanoPE and cotton have opacity higher than about 99% for the entire visible spectrum, while normal PE has about 20% opacity. These optical measurements establish that nanoPE is desirable for IR transparent and visible-opaque textiles.

Figure 12:
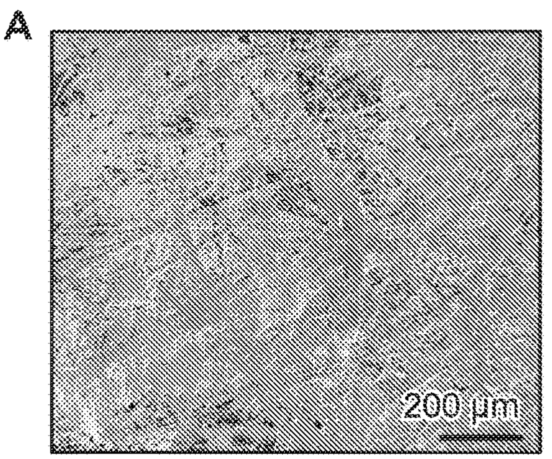
FIG. 12. Morphology and IR property of a fibrous polyethylene textile. (A) SEM image of textile exhibits large fibers and coarse pores, which result in low IR transmittance. (B) Zoomed-in SEM image. (C) FTIR transmittance of textile.
Figure 12:
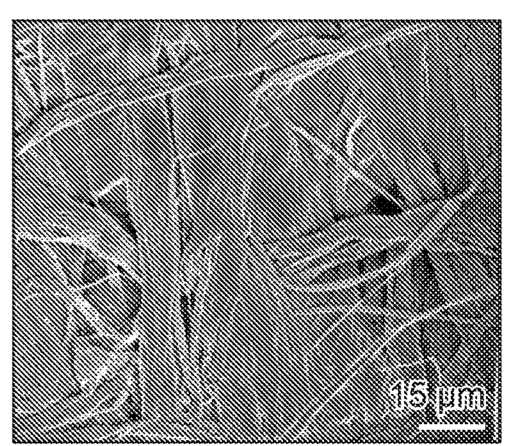
Figure 12:
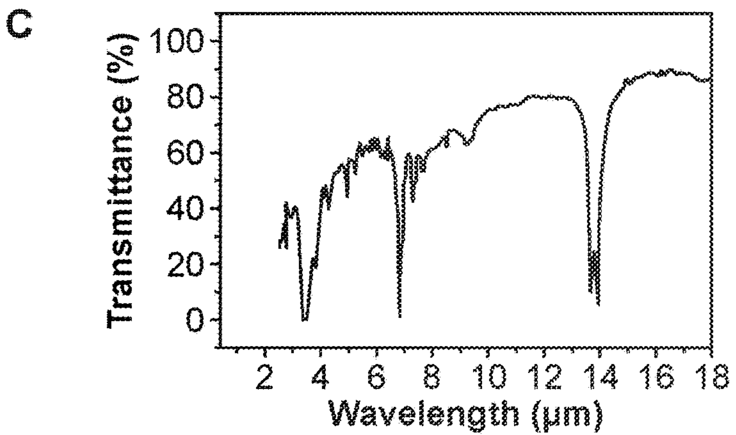

Referring to FIG. 11A, a device is used to experimentally demonstrate the cooling effect of nanoPE. Human skin is simulated by the heating element which generates substantially constant power. A thermocouple is placed onto the surface of the heating element, with an H-shape metallic pattern for thermal imaging. The textile sample is then placed on the top of the thermocouple, and the temperature measured by the thermocouple will change based on the insulation property of the textile sample. The skin temperatures of bare skin, and that covered by nanoPE, cotton, and a polyethylene material (available as Tyvek) are shown in FIG. 11B. Tyvek is a fibrous polyethylene textile, but its pore and fiber sizes are tens of microns and less desirable for transmitting human body radiation, shown in FIG. 12.

Referring back to FIG. 11C, a thermal camera was used to visualize the IR transparency under thermal measurements. For bare skin, the thermal image reveals the thermocouple and the H-shape metallic pattern due to the low emissivity of metal. For nanoPE, the thermal image is about the same as for bare skin, indicating that nanoPE is transparent for IR radiation. Cotton and Tyvek, on the other hand, did not show the metallic pattern and also appeared colder due to the blockage of IR radiation.

Figure 13A:
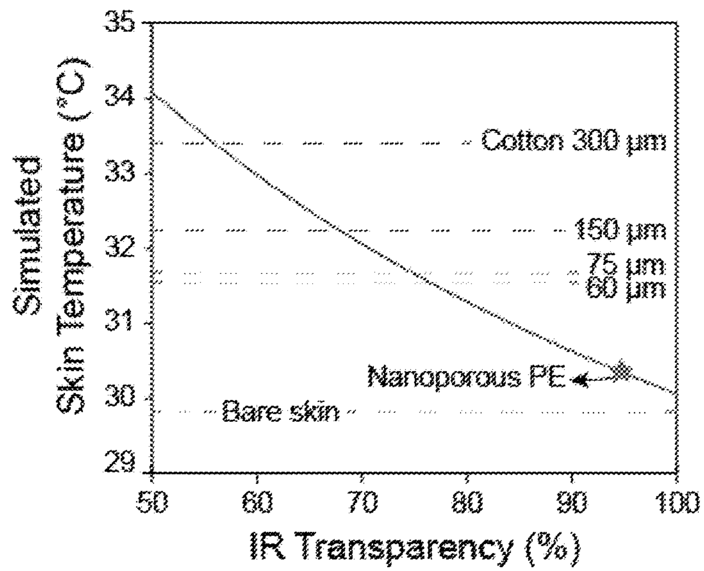
FIG. 13A. Simulated skin temperature comparison.

Referring back to FIG. 11B and also to FIG. 13A, nanoPE has excellent cooling capabilities which increase the skin temperature by about 0.8° C. compared to bare skin. In contrast, cotton and Tyvek heat up the skin by about 3.5° C. and about 2.9° C., respectively. To appreciate the impact of this temperature increase, one has to consider that human skin temperature increases by about 3° C. after vigorous exercise, so a few degrees Celsius change in skin temperature yields a substantial difference in thermal discomfort.

Figure 13B:
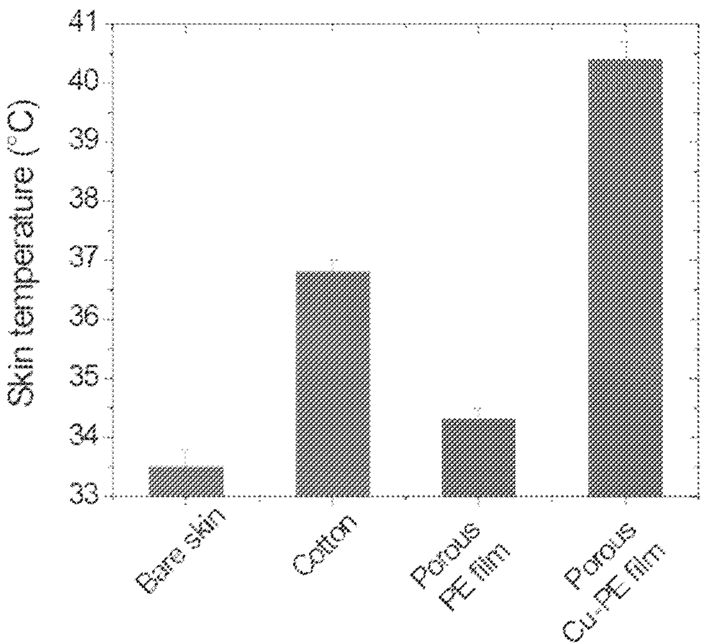
FIG. 13B. Skin temperature comparison (operating in heating mode).

Referring to FIG. 13B, after coating with copper (porous Cu-PE film), the sample works in a heating mode and increases the skin temperature to about 40.4° C.

Figure 14:
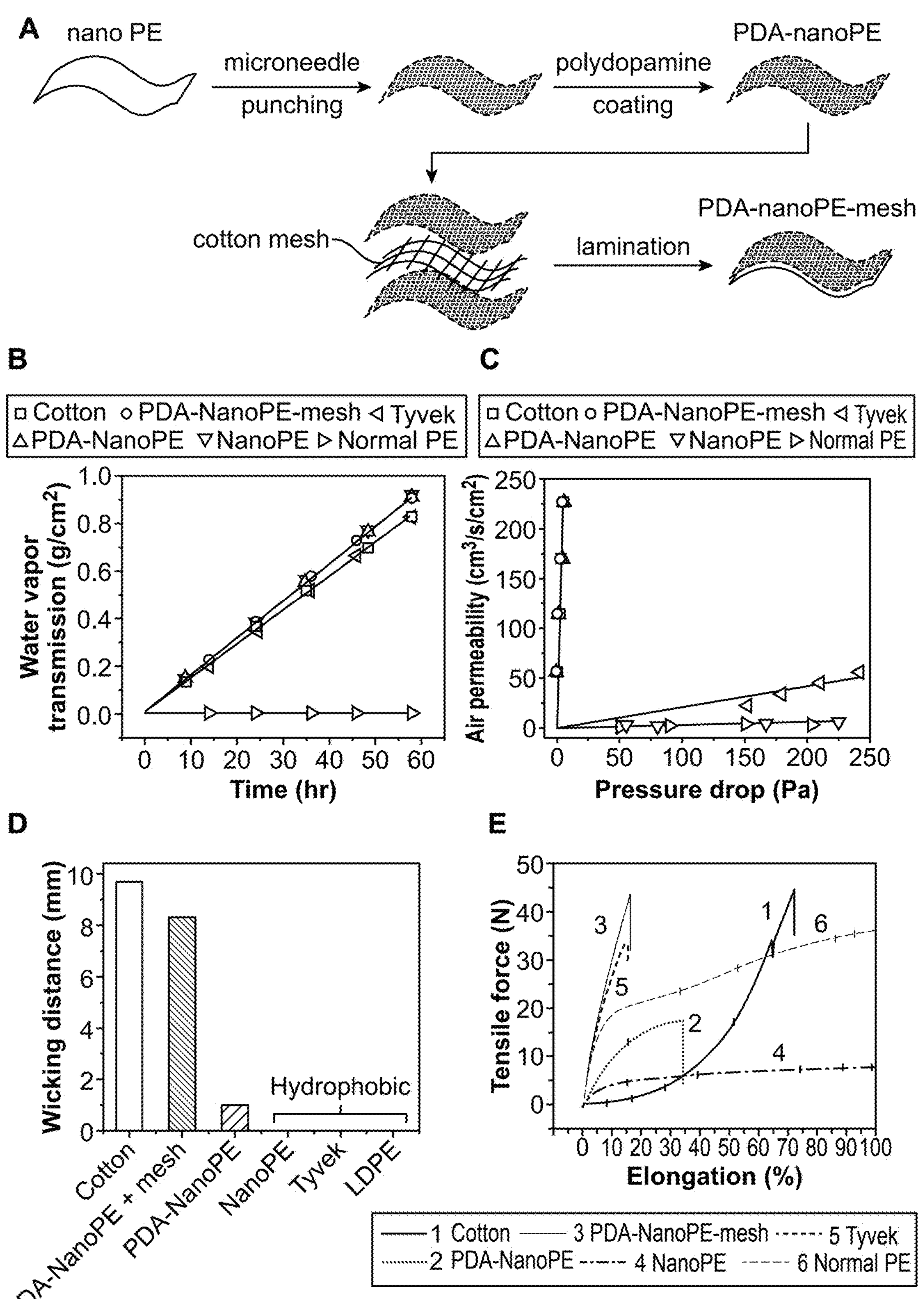
FIG. 14. The treatment of nanoPE for various wearability testing. (A) Schematic of the fabrication process of polydopamine (PDA)-nanoPE-mesh. In all the textile tests, PDA-nanoPE-mesh shows comparable performance as cotton. (B) Water vapor transmission rate test shows how human perspiration can transmit through the textile. (C) Air permeability test examines the air flow rate through the textile at a certain pressure drop. (D) Wicking distance shows the ability to transport perspiration for quick evaporation. (E) Tensile strength test demonstrates that PDA-nanoPE-mesh has substantially the same ultimate tensile strength as cotton.

Referring to FIG. 14, besides high IR transparency and high convective heat dissipation which ensure superior cooling effect, additional material properties can be incorporated for a textile to be wearable, such as wicking, mechanical strength and air permeability. To further render nanoPE suitable for human cloth, several processes were carried out.

Figure 15:
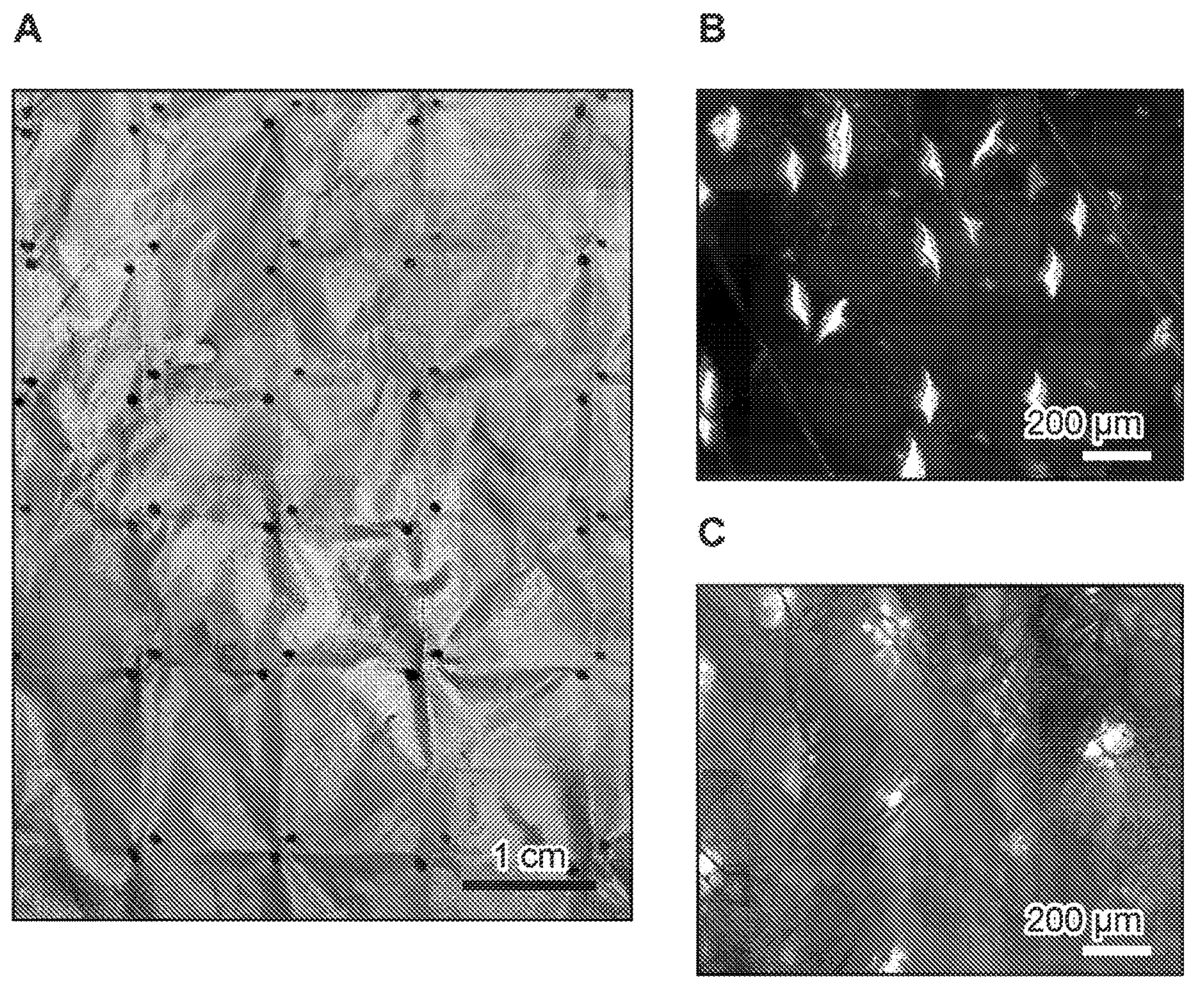
FIG. 15. Optical characterization of PDA-nanoPE-mesh. (A) Image of PDA-nanoPE-mesh. The holes that are about 1 mm in size are welding points. The micron-sized holes for improving air permeability are barely noticeable. (B) Optical microscope (OM) image of PDA-nanoPE-mesh shows the size and the spacing of micron-sized holes are about 100 μm and about 200 μm, respectively. (C) OM image of cotton textile.

First, micro-needle punching creates holes that are about 100 μm in size and about 500 μm in average spacing, creating more effective pathways to enhance the air permeability. Second, the holey nanoPE was coated by polydopamine (PDA), which is an effective hydrophilic agent and benign to the human body. Lastly, cotton mesh is sandwiched between two layers of PDA-nanoPE and thermally bonded by point welding to reinforce the mechanical strength. Details about the process of PDA-nanoPE-mesh can be found in FIG. 14A. FIG. 15 shows optical images of PDA-nanoPE-mesh material.

Referring to FIG. 14B, several tests for textile property were performed on PDA-nanoPE-mesh, PDA-nanoPE, nanoPE, Tyvek, cotton, and normal PE. FIG. 14B demonstrates the water vapor transmission rate (WVTR), which represents the ability of transmitting water vapor from human perspiration by natural diffusion and convection. All nanoPE samples have high WVTRs (about 0.016 g/cm$^2$·hr), whether micro-needle-punched or not. These results show the nanopores themselves are permeable enough for water vapor under the natural convection situation. Cotton and Tyvek have slightly lower WVTRs (about 0.014 g/cm$^2$·hr), and normal PE is substantially non-permeable.

Referring to FIG. 14C, air permeability of the samples was characterized. Air permeability is specified as the transmitted flow rate of air as a function of an applied pressure, and it represents the ability of the textile to let air blow in and then carry the body heat away. Because of the micron-sized holes that resemble the spacing between the yarns in weaved cotton textiles, the air permeability of PDA-nanoPE-mesh, PDA-nanoPE, and cotton are similar, in the range of about 40 to about 60 cm$^3$/sec·cm$^2$·Pa. In contrast, Tyvek, nanoPE and normal PE show lower air permeability. Since the micron-sized hole is as small as human hair (about 100 μm), the visual opaqueness is not noticeably affected.

Referring to FIG. 14D, wicking rate is another desirable property of a textile. It shows how efficient liquid water transports in the textile. A higher wicking rate means perspiration can spread and evaporate quickly. Cotton can have a high wicking rate due to the hydrophilic cellulose fibers. As shown in FIG. 14D, the wicking rate of cotton textile is about 9.7 mm. PDA-nanoPE-mesh has a comparable wicking distance of about 8.3 mm, due to its PDA coating and capillary effect from its dual layer structure. PDA-nanoPE is hydrophilic, but the lack of horizontal spacing constrains the capillary effect. Tyvek, nanoPE, and normal PE are hydrophobic and therefore lack a measured wicking length.

Figure 16:
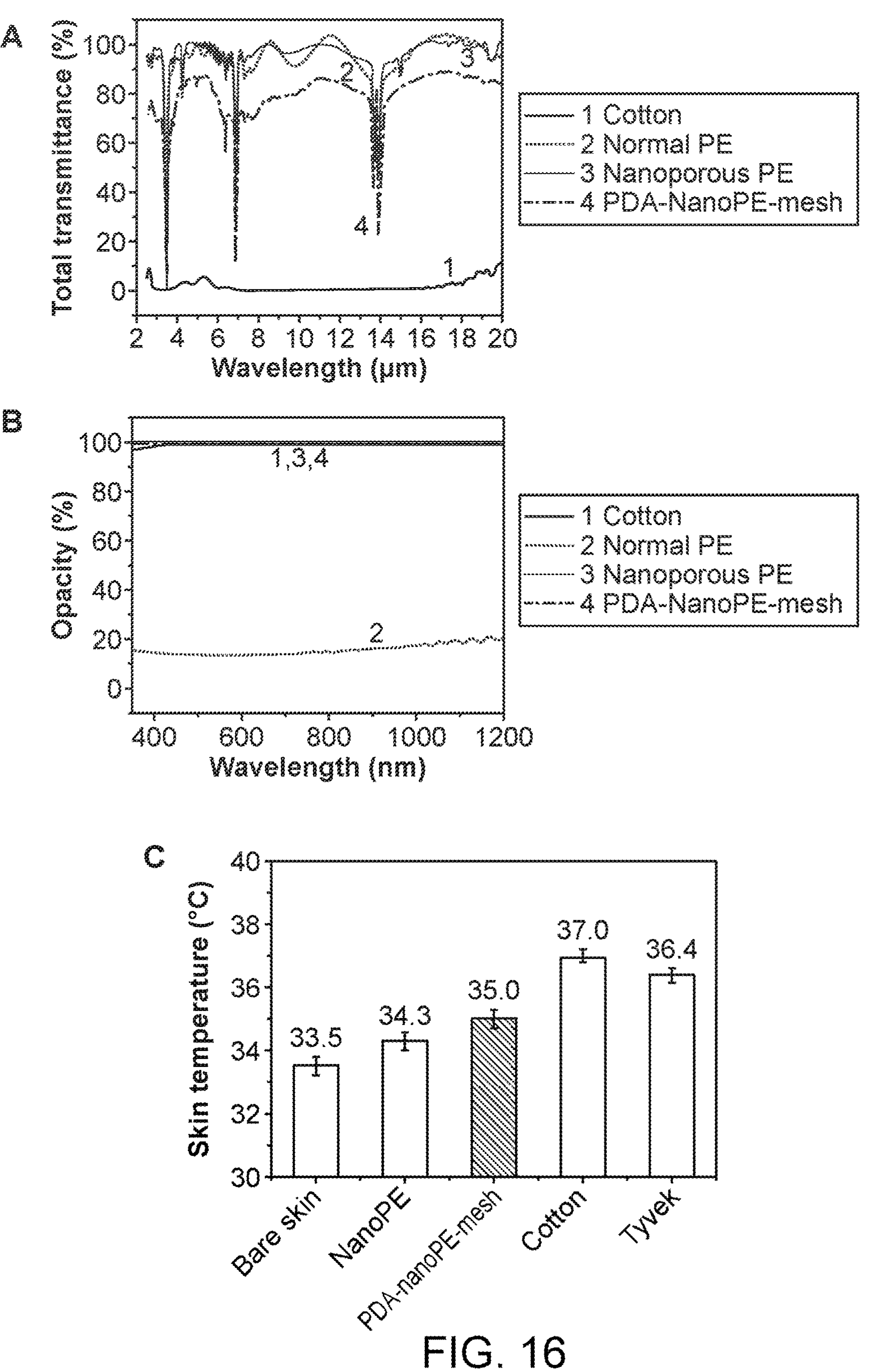
FIG. 16. Properties of PDA-nanoPE-mesh. (A) Total IR transparency. (B) Visible opacity. (C) Cooling property.

Referring to FIG. 14E, the mechanical strength of the textiles is measured. With the aid of the cotton mesh, a strip of about 2 cm-wide PDA-nanoPE-mesh can endure about 45 N of tensile force which is comparable with cotton. It is noted that, due to careful choices of PDA thickness, micro-hole size and mesh filling ratio, these processes for improving wearability have little impact on the IR transparency, cooling property, and opacity, as illustrated in FIG. 16.

In conclusion, a bifunctional textile material (such as nanoPE) is proposed and demonstrated, which is transparent to human body IR radiation and opaque to visible light. An outstanding cooling effect on the simulated human skin is shown, which may lower the energy consumption of indoor cooling. The proposed bifunctional textile can be further improved by incorporating multiple modes of insulation, which involves micro-emitters that can change the metallic coverage automatically or through manual electronic controls. Additional embodiments can also focus on maximizing the ranges of temperature tuning by having higher/lower emissivity coatings. Considering the effectiveness and scalability of nanoPE, the proposed bifunctional textiles can mitigate the global energy and environmental crisis.

Dual-Mode Textile for Human Body Radiative Heating and Cooling

Maintaining human body temperature is a basic activity for living, which often consumes huge amounts of energy to keep an ambient temperature constant. To expand the ambient temperature range while maintaining human thermal comfort, the concept of personal thermal management is demonstrated in heating and cooling textile separately through human body infrared radiation control. Realizing these two opposite functions within the same textile would represent a significant technological advancement. Here some embodiments are directed to a dual-mode textile that can perform both passive radiative heating and cooling using the same piece of textile without including energy input. The dual-mode textile is composed of a bilayer emitter embedded inside an infrared (IR)-transparent nanoporous polyethylene (nanoPE) layer. It is demonstrated that the asymmetrical characteristics of both emissivity and nanoPE thickness can result in two different heat transfer coefficients and achieve heating when low emissivity layer facing outside and cooling by wearing the textile inside out with high emissivity layer facing outside. This can expand the thermal comfort zone by about 6.5° C. Numerical fitting of the data further predicts about 14.7° C. of comfort zone expansion for dual-mode textile with large emissivity contrast.

Endothermy plays a pivotal role to maintain proper function of humans. It is a subtle balance achieved by several thermoregulation measures, such as metabolic rate, blood circulation, perspiration, piloerection (goose bumps), shivering, and so on. Failure to maintain core body temperature often results in severe medical emergencies. Although medical emergencies are much less common in daily life, thermal comfort is still heavily affecting health, productivity, and economy. Indoor thermal comfort is generally achieved by air conditioning of the entire room or building, but it costs considerable amount of energy. In the US, about 12% of total energy consumption is for indoor temperature control. Without air conditioning, clothing becomes the primary way for human body temperature control. However, common clothing have constrained range of thermal insulation, which often fails to match up with the fluctuating weather. Large and sudden diurnal temperature variation can lead to respiratory infections and cardiac diseases. These issues demand effective ways for human body temperature management. In particular, textile-based personal thermal management has great potential because it focuses the temperature control near human body instead of the entire building.

Radiative thermal management can be an effective method to surpass traditional ways of heating or cooling. By controlling emissivity, transmissivity, and reflectivity, different heat transfer controls can be achieved. For human body at rest, infrared (IR) radiation (about 7-14 μm in wavelength) accounts for about 40-60% heat loss. For personal heating, metallic nanowire coating onto regular textile can reflect IR radiation back to human body. Cooling textile would involve as much IR radiating away from human body, which is demonstrated using nanoporous polyethylene (nanoPE). NanoPE is transparent to mid-IR due to low absorption and little scattering while opaque to human eyes due to strong scattering of visible light by the nanopores (about 50-1000 nm in diameter). Thus far, the opposite of IR radiation control for heating and cooling has set a constraint that one type of textile can perform a single thermal function. It remains as a challenge how to design a single textile to perform both heating and cooling functions. Practically, such a dual-mode textile would help the human body adapt to a wide range of ambient temperature or physiological condition. Traditionally, this can be done by adding/removing the clothing or constantly adjusting the thermostat. However, extra clothing is not always available. Frequent change of thermostat is inefficient and energy-wasting, and it often cannot satisfy all the residents at the same time.

Here, some embodiments demonstrate a dual-mode textile for both heating and cooling by using a bilayer thermal emitter embedded inside the IR-transparent nanoPE. This dual-mode textile can readily switch the modes between heating and cooling by flipping between inside and outside, which is considered passive and does not involve electrical wiring or external energy input. The tunability of heat transfer coefficient can expand the thermal comfort zone and help the users adapt to the changing environment.

Figure 20:
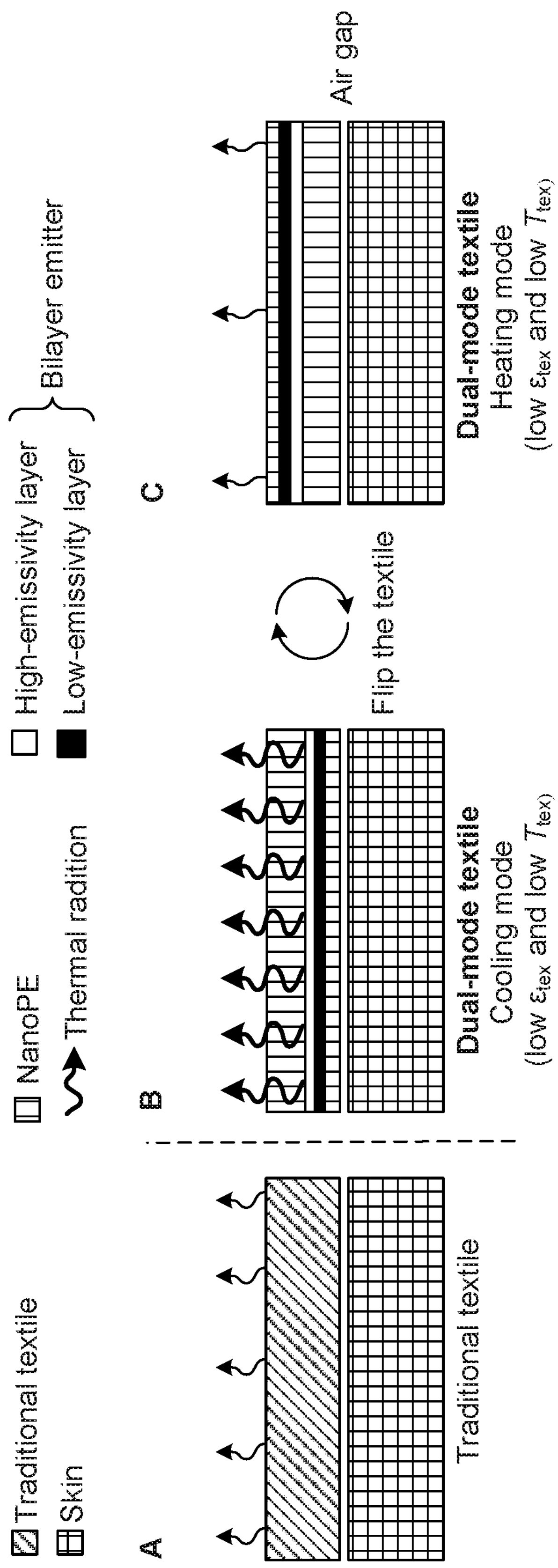
FIG. 20. Schematic of dual-mode textile. (A) Traditional textile has a single emissivity, so the radiation heat transfer coefficient is fixed. (B) For a bilayer thermal emitter embedded in IR-transparent nanoPE, when the high-emissivity layer faces outside and the nanoPE between the skin and the emitter is thin, the high emissivity and high emitter temperature result in a large heat transfer coefficient, so the textile is in cooling mode. (C) The textile is flipped, and the low emissivity and low emitter temperature cause the heat transfer coefficient to decrease. The textile now operates in heating mode.

To understand the basic mechanism of dual-mode textile, consider the radiation heat flux $q_{rad}$ from human cloth towards the ambience:

$$q_{rad} = \frac{\sigma(T_{tex}^4 - T_{amb}^4)}{\frac{1}{\varepsilon_{tex}} + \frac{1}{\varepsilon_{amb}} - 1} \approx \sigma\varepsilon_{tex}(T_{tex}^4 - T_{amb}^4) \quad (18)$$

where σ is the Stefan-Boltzmann constant, $\varepsilon_{tex}$ is textile surface emissivity, $\varepsilon_{amb} \approx 1$ is ambience emissivity, $T_{tex}$ is the textile surface temperature, and $T_{amb}$ is the ambient temperature. For cooling or heating purposes, it is desired to have either a high or a low $q_{rad}$ respectively. To realize the dual-mode textile, therefore, both $\varepsilon_{tex}$ and $T_{tex}$ should be controllable. When $\varepsilon_{tex}$ and $T_{tex}$ are high, $q_{rad}$ will increase, so the human body heat dissipation becomes more efficient, and the textile is in cooling mode. On the contrary, when $\varepsilon_{tex}$ and $T_{tex}$ are low, the textile is in heating mode. Traditional textiles are IR-opaque and have emissivity of about 0.8, which varies little because of the similarity of chemical composition of material choice, so it can have one heat transfer coefficient (FIG. 20A).

In the proposed design, the bilayer thermal emitter which has different emissivities on each side is embedded inside the nanoPE textile which also has asymmetric thicknesses on each side. Because nanoPE is IR-transparent, the emitter inside the nanoPE can freely radiate towards the ambience. The bilayer emitter can control the emissivity, and the nanoPE thickness controls the temperature of emitter from being closer or farther from the hot side (human skin). In cooling mode (FIG. 20B), the high-emissivity layer (high $\varepsilon_{tex}$) is facing towards the outside environment, and the thickness of nanoPE between the emitter and the skin is small. This small thickness ensures efficient thermal conduction between the warm human skin and the emitter, which increases the emitter temperature (high $T_{tex}$). This combination of high emissivity (high $\varepsilon_{tex}$) facing outside and short emitter-to-skin distance (high $T_{tex}$) will result in high heat transfer coefficient, so the textile is in cooling mode. If $\varepsilon_{tex} = \varepsilon_{skin} = 0.98$ and the thermal resistance between the human skin and the emitter is zero ($T_{tex} = T_{skin}$), the cooling effect will be as strong as wearing just the nanoPE cooling textile. When the textile is flipped, the low emissivity side is facing out (low $\varepsilon_{tex}$), and the emitter-to-skin distance increases, resulting in lower thermal conductance (low $T_{tex}$), so the textile is in heating mode (FIG. 20C).

Figure 24:
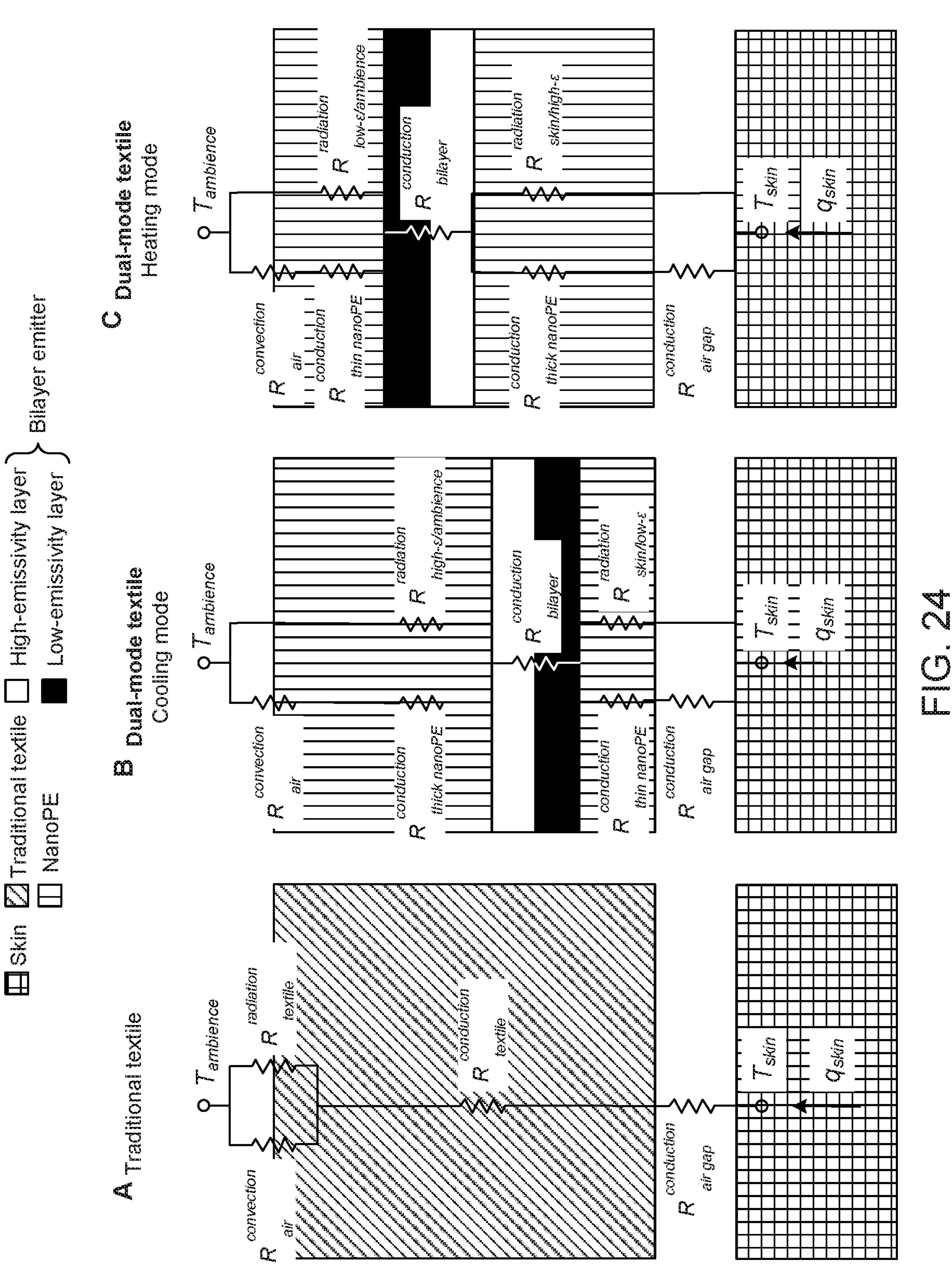
FIG. 24. Thermal circuit model of textiles. (A) Traditional textile. (B) Cooling-mode textile. (C) Heating-mode textile.
Figure 25:
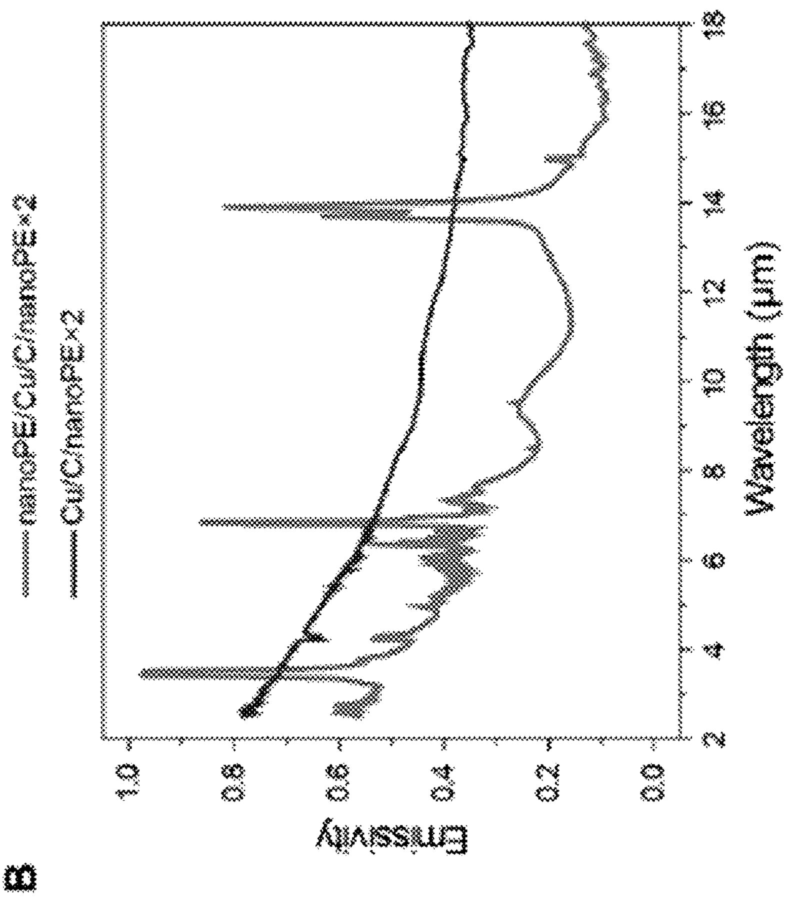
FIG. 25. Copper deposition on carbon/nanoPE. (A) Image of copper-coated carbon/nanoPE. Because copper is about 150 nm-thick, while the roughness of the carbon layer is about 9 μm, the appearance remains rough and dark. (B) Emissivity of copper-coated carbon/nanoPE. The emissivity is much higher than the sample in which copper is coated on the nanoPE.
Figure 25:
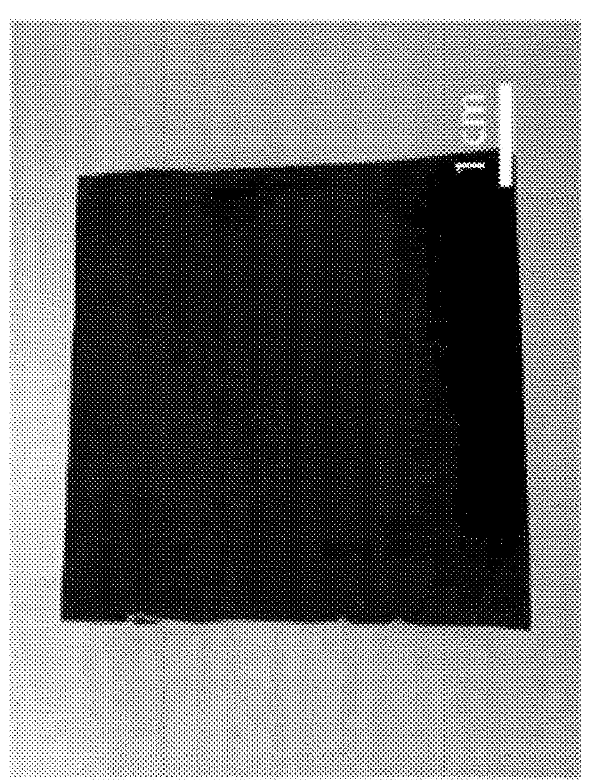

It is noteworthy that the electromagnetic response of the structure at either heating or cooling mode is reciprocal. What varies between the heating and cooling mode is the different temperature of the emitter. Neither is such a structure a photon-based thermal rectifier. In this case the heating and cooling mode correspond to different structure configurations between the high temperature heat source (the human body) and the low temperature heat sink (the ambient environment) (FIG. 24). The dual-modality is a synergistic result of radiation, conduction, and convection. When the mode switches, the radiation heat transfer components change, but the air convection and the interface resistance do not. The parallel and serial relationship among these heat transfer components will end up having two different effective heat transfer coefficients for two modes. Moreover, the IR-transparency of nanoPE plays an important role in achieving effective radiative cooling at the cooling mode while keep the heating mode sufficiently warm. Although replacing nanoPE with IR-opaque textile may still have asymmetrical heat transfer modes, its cooling power and dual-modality are not as efficient as the IR-transparent nanoPE. Full analysis can be found in the Examples.

Figure 21:
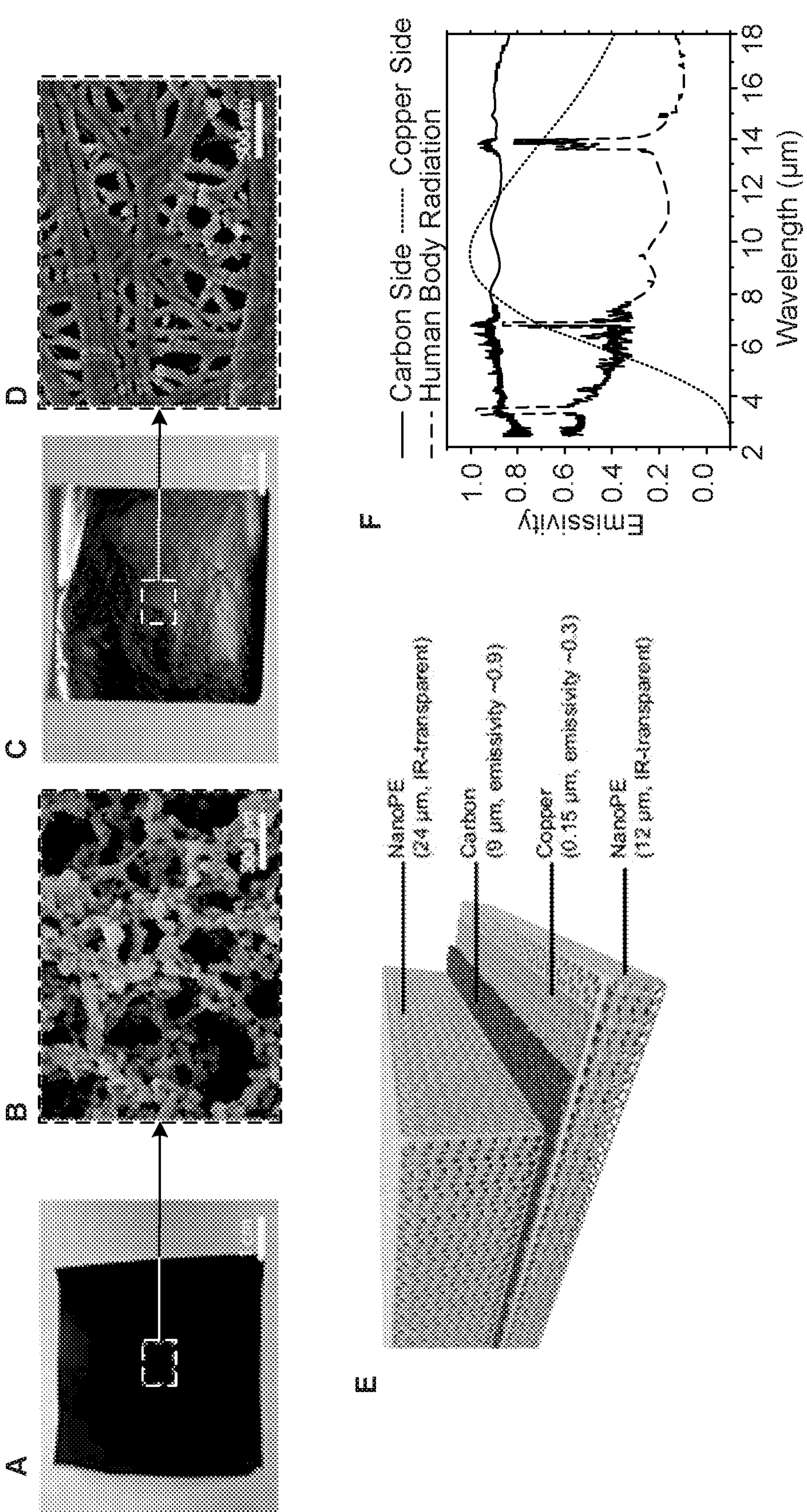
FIG. 21. Dual-mode textile morphology and emissivity characterization. (A) Image of carbon-coated nanoPE including the high-emissivity layer. (B) SEM image of carbon coating reveals its rough and porous structure which is advantageous for increasing the emissivity. (C) Image of copper-coated nanoPE including the low-emissivity layer. (D) SEM image of copper coating shows the surface is optically smooth for mid-infrared. The nanopores remain open for air and vapor permeability. (E) Image of the dual-mode textile. There are two nanoPE layers on the side of carbon and one nanoPE layer on the side of copper. (F) Emissivities of carbon and copper coating measured by FTIR equipped with a diffuse gold integrating sphere. (G) Schematic of the dual-mode textile marked with materials and thicknesses. All the materials are porous for allowing air and vapor breathability.

To realize the dual-mode textile, the material choice and fabrication method of the bilayer emitter should be considered. Carbon has a large absorption coefficient in the range of mid-infrared, about 28000-87000 $cm^{-1}$ in the wavelength range of human body radiation, which makes it a desirable candidate for a high-emissivity layer. FIG. 21A is the image of an about 9 μm-thick carbon coating on an about 12 μm-thick nanoPE by a doctor blade. The coating is rough and highly porous, rendering a dark and matte surface which is advantageous for both high emissivity and for air and vapor permeability (FIG. 21B). On the other hand, a low-emissivity layer involves high reflectivity, so a metal generally fits this criterion. About 150 nm of copper is deposited onto nanoPE as the low-emissivity layer, which is smooth and shiny (FIG. 21C). Scanning electron microscope (SEM) image shows the semi-conformal copper coating is thin enough to leave the nanopores open, so the air and vapor permeability of the textile can be maintained (FIG. 21D). By sandwiching the two emitters face-to-face, the bilayer emitter structure is achieved, with nanoPE on both sides (FIG. 21E). An additional piece of nanoPE is added to the carbon side to create the thickness asymmetry. The final thickness of nanoPE is about 24 μm at the carbon side and about 12 μm at the copper side.

Besides morphological inspection, it is desired to measure the emissivity within the wavelength range of mid-infrared to characterize the radiation heat transfer property. Fourier transform infrared spectroscopy (FTIR) is used with a diffuse gold integrating sphere to probe the emissivities from both sides (FIG. 21F). The transmittance ($\tau$) and the reflectivity ($\rho$) were measured to calculate the emissivity ($\varepsilon$) by $\varepsilon=1-\tau-\rho$. At the carbon side, the emissivity is about 0.8 to about 1.0 between the wavelengths of about 2 μm to about 18 μm. The weighted average emissivity based on human body radiation at about 33° C. is about 0.894. On the other hand, copper shows much lower emissivity, with weighted average value of about 0.303. The strong absorption peaks at the wavelength of about 3.4, about 3.5, about 6.8, about 7.3, about 13.7, and about 13.9 μm are attributed to polyethylene. These absorption peaks have little impact on the embedded emitters because their positions are far away from the majority of human body radiation which peaks at about 9.5 μm. The final structure of the dual-mode textile is summarized and illustrated in FIG. 21G.

Figure 22A:
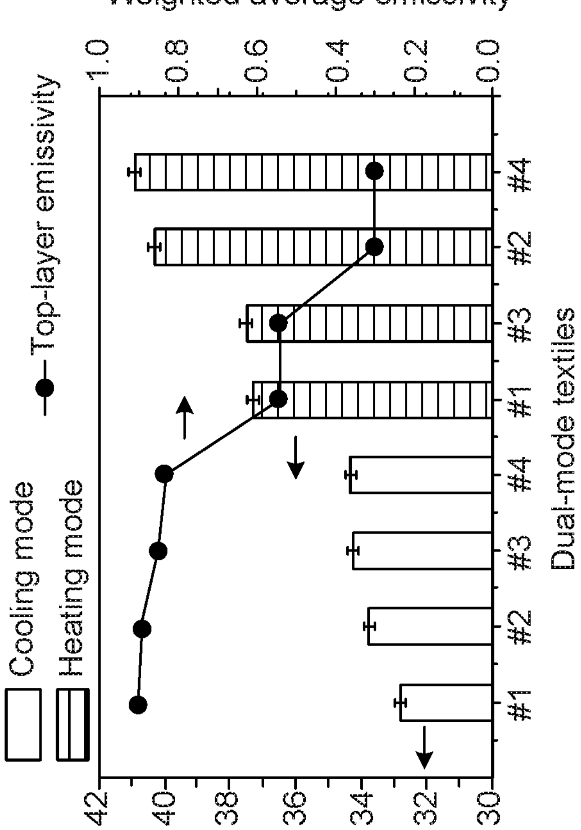
FIG. 22. Thermal measurement of a dual-mode textile. (A) Steady-state artificial skin temperature of various conditions: bare skin, traditional textile, cooling mode textile, and heating mode textile. The cooling and heating mode is the same piece of sample with different sides facing out, and the resulting artificial skin temperature is different. (B) Four dual-mode textiles with eight different top layer emissivities result in different skin temperatures. The skin temperature is inversely related to the top layer emissivity, which indicates the importance of radiation heat transfer towards the environment. (C) The temperature difference caused by mode switching is positively related to the emissivity difference of the two layers. Carbon-only and copper-only samples are also measured to verify that the dual-modality does not depend on the absolute value of emissivity but its difference. (D) Calculated artificial skin temperature as a function of top and bottom layer emissivities. The maximal temperature difference generated by the dual-mode textile occurs when $\Delta\varepsilon$=about 0.8, which is marked with star signs.
Figure 22A:
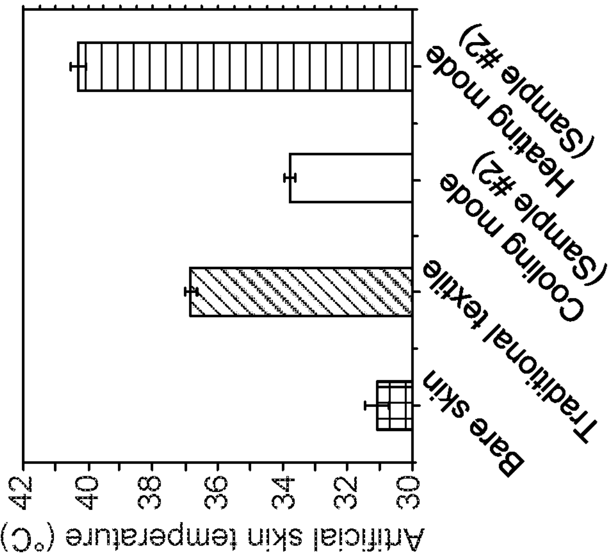
Figure 26:
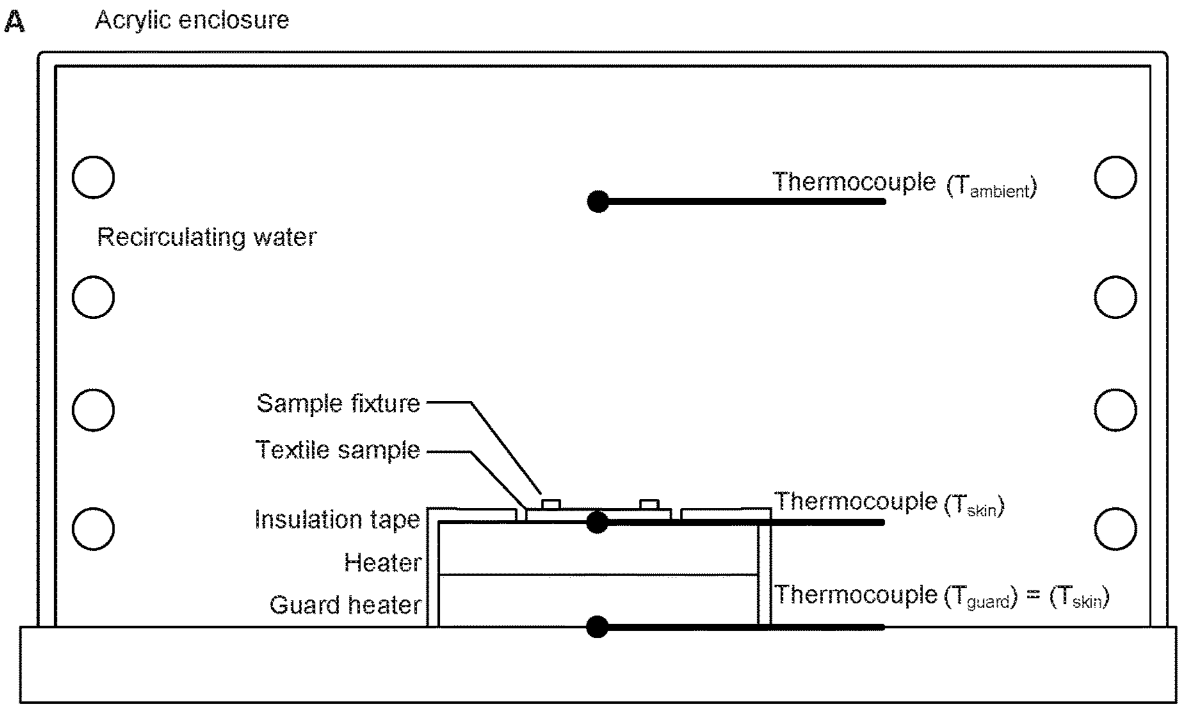
FIG. 26. Schematic of thermal measurement apparatus. (A) Side-view of thermal measurement apparatus. Note the dimensions are not to scale. (B) Tilted-view of the heater part of the apparatus.
Figure 26:
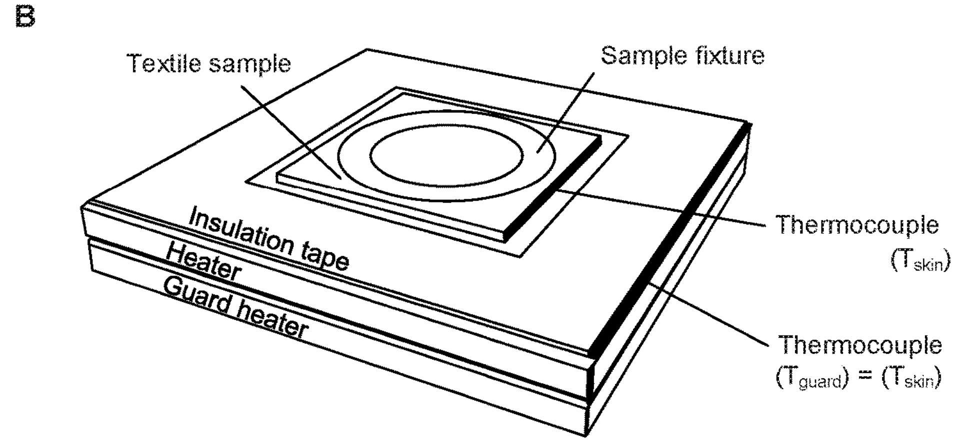
Figure 27:
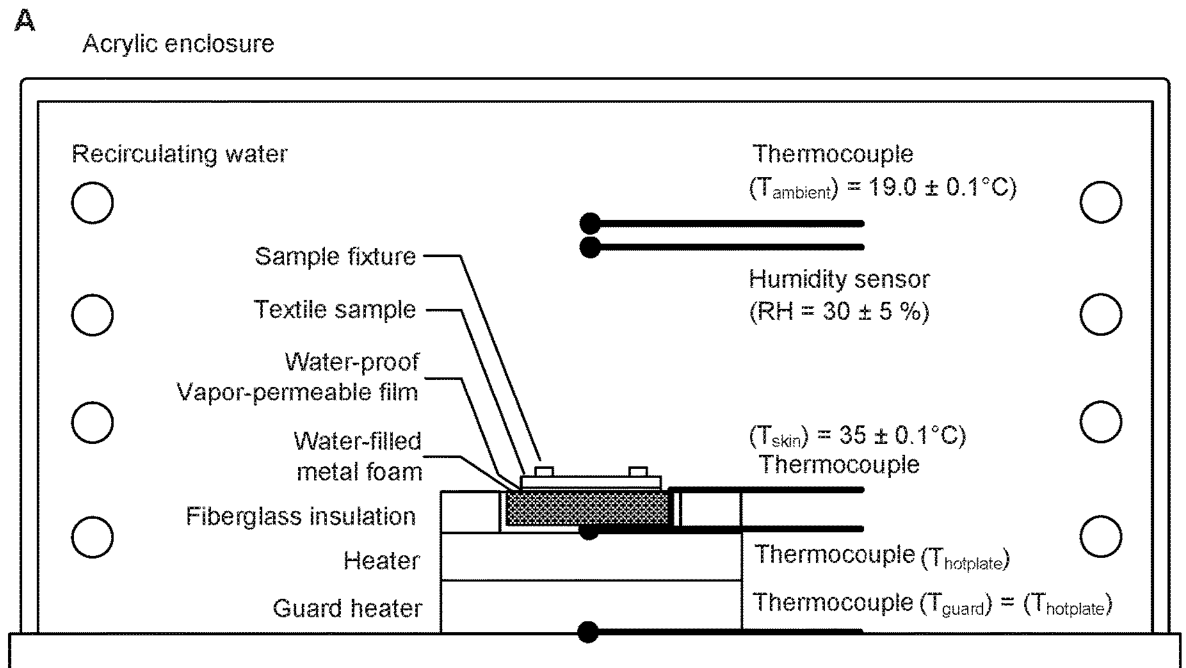
FIG. 27. Sweating hotplate thermal measurement. (A) Schematic of sweating hotplate thermal measurement. In addition to the basic components of the thermal measurement apparatus as shown in FIG. 26, water can now evaporate from the metal foam through the textile sample into the ambience. In this measurement, the heat flux is adjusted to achieve the targeted skin temperature (about 35° C.). (B) Total heat transfer coefficients derived from the heat flux and the temperature difference. Even if the evaporative heat is included, the dual-mode textile still exhibits two different heat transfer coefficients. The traditional textile is warmer than the heating textile, which is different from the dry thermal measurement result (FIG. 26A). This indicates that the traditional sweatshirt has worse humidity transport property and is consistent with the water vapor transmission rate measurement in FIG. 30.
Figure 27:
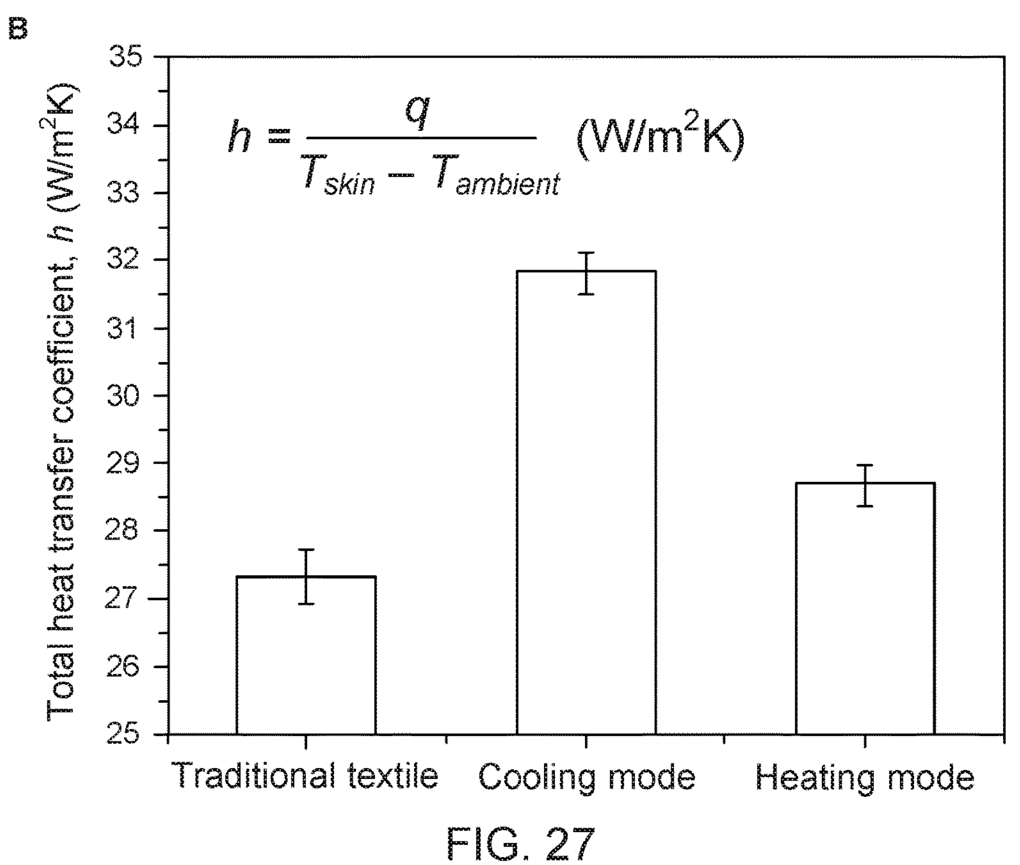
Figure 30:
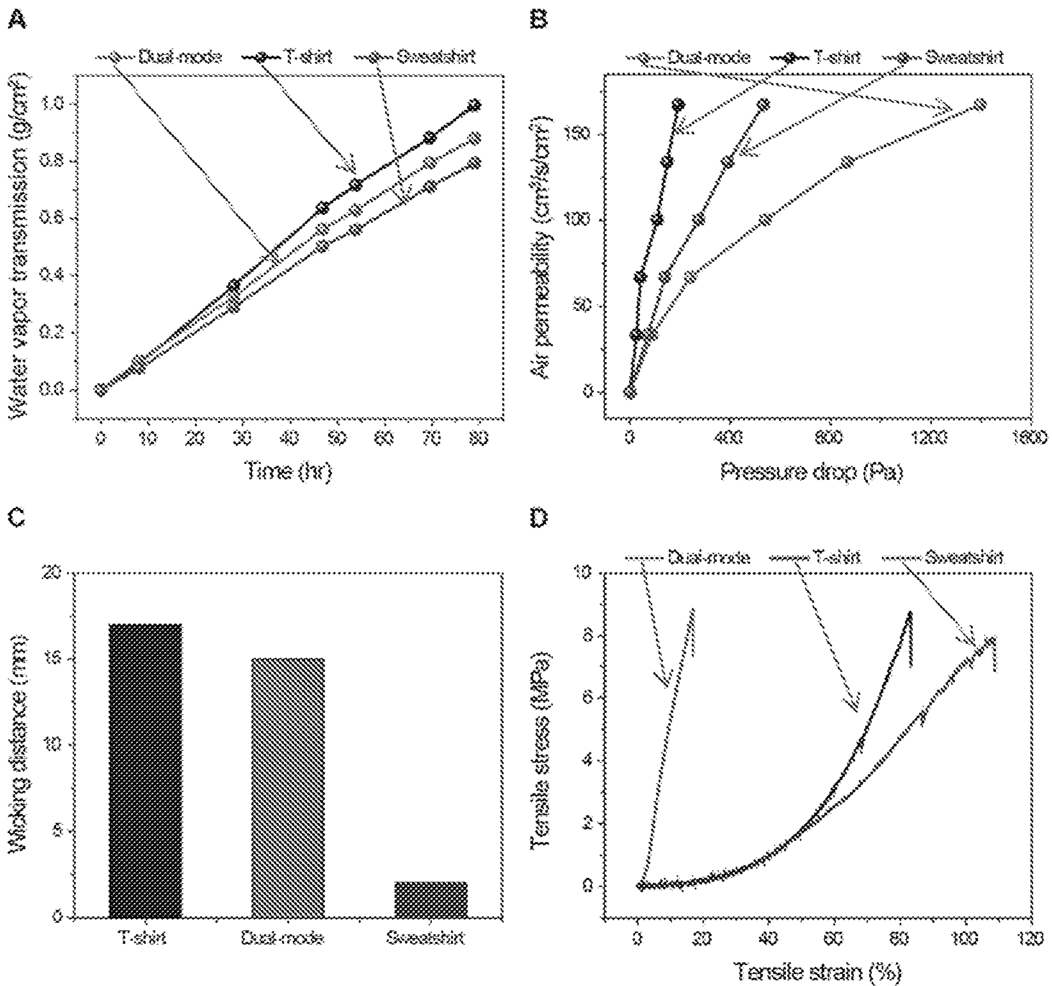
FIG. 30. Wearability tests of dual-mode textile, T-shirt, and sweatshirt. (A) Water vapor transmission test. (B) Air permeability test. (C) Wicking test. (D) Tensile strength test.

The change of thermal insulation by mode-switching and the influence of emissivity are demonstrated by a steady-state artificial skin temperature measurement with simulated metabolic heat generation and controllable ambient temperature in a clear acrylic chamber. The simulated metabolic heat generation is provided by an electric heater and is kept substantially constant at about 51 $W/m^2$ throughout the entire measurement, and the chamber temperature is kept substantially constant at about 22.0° C. by a cooling/heating water recirculator (FIG. 26). The cooling and heating effect of the dual-mode textile is first demonstrated in FIG. 22A. At the bare skin condition, the artificial skin temperature is about 31.0° C. Placing a piece of traditional textile onto the artificial skin increases its temperature to about 36.9° C. As for dual-mode textile, when the carbon side (high-emissivity) is facing outward, it operates in cooling mode and causes the artificial skin temperature to decrease to about 33.8° C. When the dual-mode textile is flipped inside out and with the copper (low-emissivity) facing outward, it operates in heating mode and increases the artificial skin temperature to about 40.3° C. This about 6.5° C. difference of artificial skin temperature is created by flipping the same piece of dual-mode textile with exactly the same thickness and mass. Sweating hotplate method was also employed to test the dual-modality under the influence of additional moisture evaporation (FIG. 27). The result shows that, even including the evaporative heat loss, the cooling mode still has about 10% higher total heat transfer coefficient than the heating mode. The traditional textile, when considering evaporative heat loss, becomes a little warmer than the heating-mode textile. This means water vapor does not propagate in the traditional textile (a sweatshirt in this experiment) as efficiently as in the dual-mode textile, which is consistent with the result of water vapor transmission rate measurement (FIG. 30). It has thus been demonstrated that flipping such textile results in drastically different thermal insulation properties. This dual-modality can greatly enhance the adaptability of human skin to the environment.

Figure 22B:
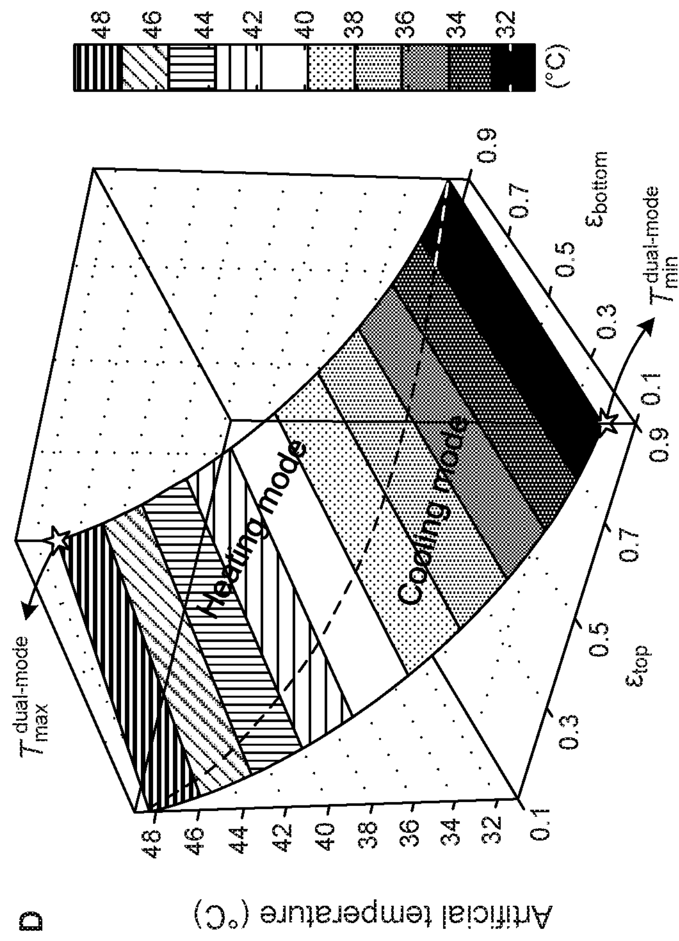
Figure 22B:
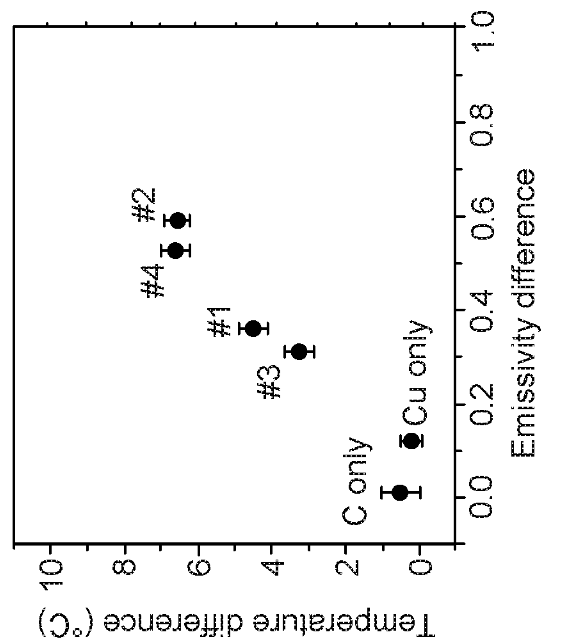
Figure 29:
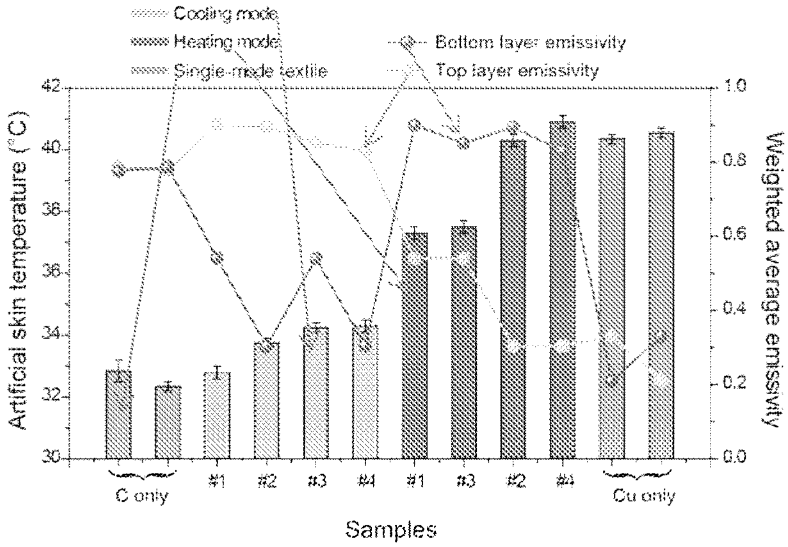
FIG. 29. Thermal measurement and weighted average emissivity of various samples. For carbon-only and copper-only samples, there is no emissivity contrast. The artificial skin temperature is strongly correlated with the top layer emissivity rather than the bottom layer.

In the dual-mode textile design, the total heat transfer coefficient is closely related to the emissivities of bilayer emitters. By adjusting the coating thickness of the emitter, its emissivity can be controlled to achieve a different extent of thermal property variation. Testing is performed on the artificial skin temperature of four dual-mode textiles with various emissivity combinations under both cooling and heating modes, so there are eight top layer emissivities ($\varepsilon_{top}$) (FIG. 22B). The emissivities are weight-averaged based on human body radiation. It is noted that the artificial skin temperature is inversely related to the top layer emissivity which determines the radiation heat transfer towards the ambience. The bottom layer emissivity ($\varepsilon_{bottom}$), on the other hand, has little influence on the artificial skin temperature (FIG. 29). This is because, between the skin and the bottom layer, the heat flux transporting through conduction is much larger than through radiation, so the bottom layer emissivity has little impact on the overall heat transfer coefficient. The temperature difference created by the dual-modality is plotted as the function of emissivity difference between the top and the bottom layer for each sample (FIG. 22C). It is shown that temperature tunability is predominantly controlled by the emissivity difference between the two emitting layers in the dual-mode textile. The samples with just copper and just carbon were also tested to confirm the dual-modality is not dependent of absolute value of emissivities but their difference (FIG. 29).

In order to numerically predict the maximal temperature tunability in the proposed design, the thermal resistance of individual components and interfaces are fitted with thermal measurement and emissivity measurement data of the dual-mode textile samples. The corresponding thermal resistance circuit is shown in FIG. 24. The fitted thermal resistances are then used to construct the heat transfer model and derive the relationship of skin temperature, $\varepsilon_{top}$ and $\varepsilon_{bottom}$ (FIG. 22D). The dual-mode textile operates in cooling mode when $\varepsilon_{top}>\varepsilon_{bottom}$ and in heating mode when $\varepsilon_{top}<\varepsilon_{bottom}$, as marked by the dotted line in FIG. 22D. The upper and lower thresholds of emissivity are set at 0.9 and 0.1, respectively. This is to better reflect the case that the nanoPE has finite transmittance and the porous emitters may not achieve perfect reflectivity. The maximal temperature change occurs when $\Delta\varepsilon$=about 0.8, that is, ($\varepsilon_{top}$, $\varepsilon_{bottom}$)=(0.9, 0.1) for cooling and ($\varepsilon_{top}$, $\varepsilon_{bottom}$)=(0.1, 0.9) for heating. The calculation shows that this maximum dual-mode textile has $$T_{max}^{dual-mode} = 47.1^\circ \text{ C.}$$

and $$T_{min}^{dual-mode} = 32.4^\circ \text{ C.},$$

which corresponds to about 14.7° C. of temperature variation. In practice, these emissivities can be realized by improving the coating method to maximize the absorption for high-emissivity layer and the reflection for low-emissivity layer while maintaining the porosity and breathability. Further enhancement of infrared transmittance of nanoPE can also further take full advantage of the bilayer emitter design. This numerical modeling points out the tuning range of the dual-mode textile. In order to achieve thermal comfort, the heat transfer coefficient contrast as well as its average value should be optimally engineered to fit different scenarios.

Figure 23:
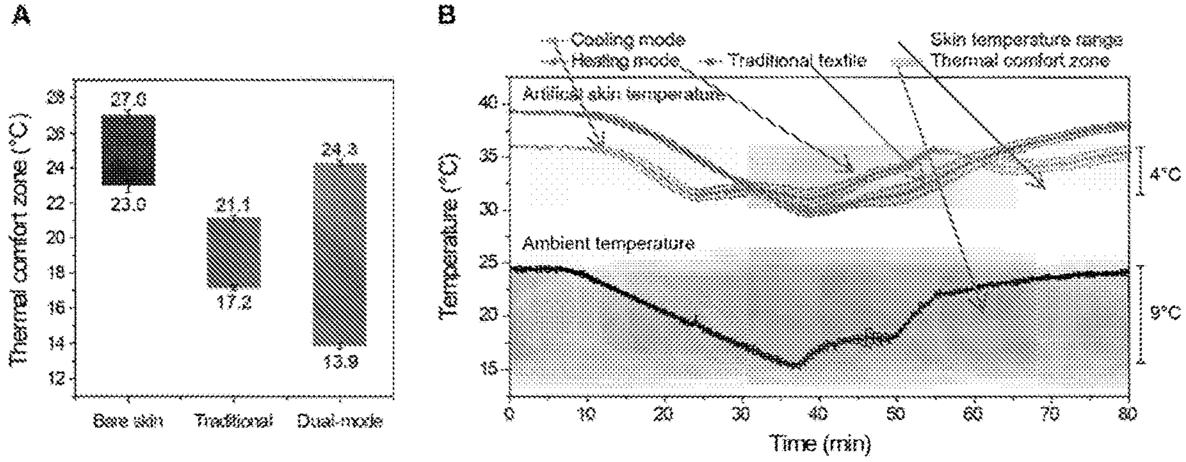
FIG. 23. Expansion of thermal comfort zone by a dual-mode textile. (A) Thermal comfort zone of bare skin, traditional textile, and dual-mode textile. The artificial skin temperature is between about 32-36° C. (B) Real-time thermal measurements of dual-mode and traditional textile under varying ambient temperatures. By using cooling mode at high ambient temperature and heating mode at low temperature, the artificial skin temperature stays within about 32-36° C. even when the ambient temperature changes between about 16-25° C. In contrast, the traditional textile follows the trend of ambient temperature variation and results in thermal discomfort during the ambient temperature sweep. The error bars represent the standard deviation of three measurements.

Thermal comfort zone is specified as a range of ambient condition in which residents feel comfortable. It can be subjective and can involve polls and statistics to reach a consensus. As a proof of concept, artificial skin temperature is used as the indicator of thermal comfort and about 32-36° C. is chosen to be the comfortable range. In other words, the ambient temperature range that can result in the artificial skin temperature of about 32-36° C. is set as the thermal comfort zone. Depending on the thermal insulation property, different samples will have different thermal comfort zones, as measured by the steady-state thermal measurement device (FIG. 23A). Because the temperature change is relatively small and the heat transfer coefficients do not vary with temperature, the thermal comfort zone changes linearly with the artificial skin temperature and covers just about 4° C. for the case of bare skin and traditional textile. For dual-mode textile, because it has two heat transfer coefficients, the thermal comfort zone ranges from about 13.9 to about 24.3° C., which is about 10.4° C. of coverage. Further real-time demonstration of the thermal comfort zone expansion by the dual-mode textile is shown in FIG. 23B, with a traditional textile as a comparison. Note the time-resolved thermal measurement is considerably affected by the thermal inertia, so the measured artificial skin temperatures are lagged behind the ambient temperature changes and are slightly different from the steady-state values in FIG. 23A. The error bars represent the standard deviation of three independent measurements. The traditional textile follows the ambient temperature variation and provides thermal comfort in a small temperature range. As for the dual-mode textile, when the ambient temperature was so low that the artificial skin temperature almost fell below about 32° C., the dual-mode textile was switched to heating mode and caused the artificial skin temperature to rise. Because the ambient temperature was still decreasing, the artificial skin temperature would eventually drop again until the ambient temperature is increased at 37 min. When the ambient temperature became too high, the textile was switched back to cooling mode. As a result, the dual-mode textile can maintain the artificial skin temperature within about 32-36° C. while encountering about 9° C. of dynamic ambient temperature fluctuation. This expansion of thermal comfort zone is obtained by flipping the sides of the textile, and it does not involve any additional energy input such as fossil fuels or electricity, which is particularly attractive for energy efficiency improvement and large-scale fabrication.

Figure 31:
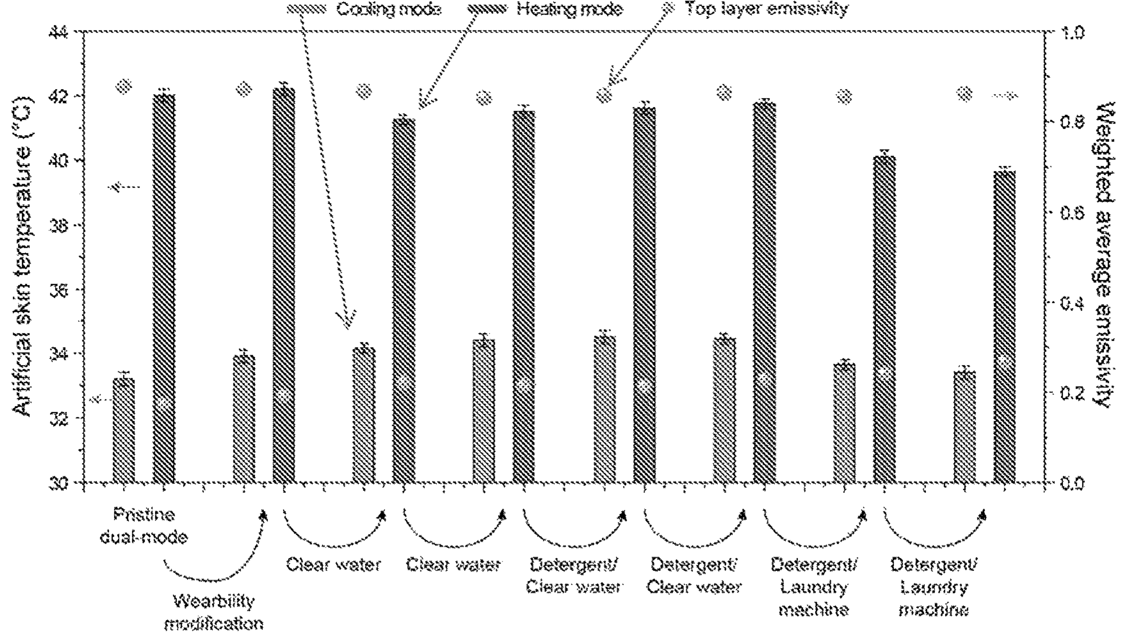
FIG. 31. Durability of dual-mode textile against wash cycles. The evolution of artificial skin temperature and the top-layer emissivity of the same piece of dual-mode textile after being subjected to wearability modification, clear water stirring×2, detergent solution stirring×2, and laundry machine wash×2. Because of the binder inside the carbon coating and the protection provided by nanoPE, the performance is maintained.

When designing the desirable emissivity, it is also desired to maintain the wearability as a human cloth. Several modification methods can be used to improve the wearability of nanoPE, including polydopamine coating for hydrophilicity, microneedle punching for air permeability, and embedding cotton mesh for mechanical strength. These modifications can enhance nanoPE's air permeability, water vapor transmissivity, mechanical strength, and wicking property. Similar wearability modification was performed onto the dual-mode textile, as described in the Examples. The thickness and the morphology of the bilayer emitter is specifically engineered, so the air and water vapor permeability of the dual-mode textile remain as high as traditional textiles (FIG. 30). Moreover, the microneedle-punched holes and the sewing threads take just a few percent of the total area, and the hydrophilic polydopamine coating is extremely thin, so the overall emissivity and therefore the radiative property can be preserved (FIG. 31). Because of the binder inside the carbon coating and the protection provided by the nanoPE/emitter/nanoPE sandwich structure, the dual-mode textile shows good durability against wash cycles (FIG. 31). Printing and dyeing and other deposition techniques which involve covalent or hydrogen bonds between a coating layer and a textile also can be used to further improve the durability.

Figure 32:
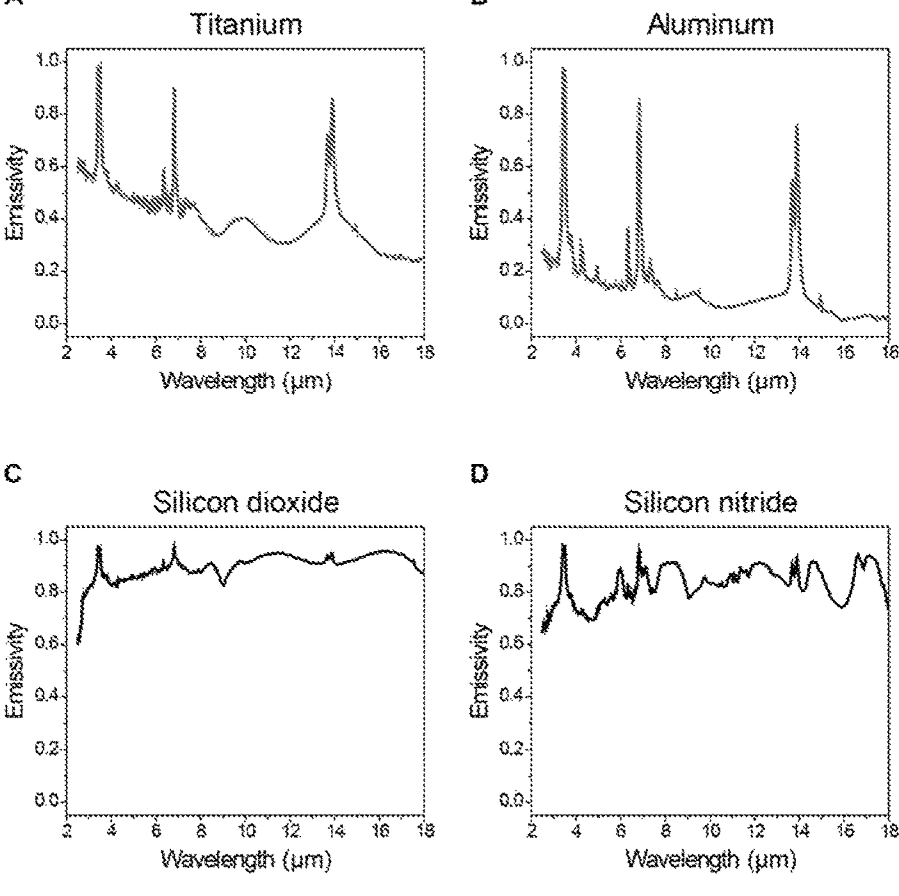
FIG. 32. Emissivities of other materials for bilayer emitters. (A) nanoPE/Ti/C/nanoPE×2. (B) nanoPE/Al/C/nanoPE×2. (C) nanoPE×2/$SiO_2$/Cu/nanoPE. (D) nanoPE×2/$Si_3N_4$/Cu/nanoPE.
Figure 33:
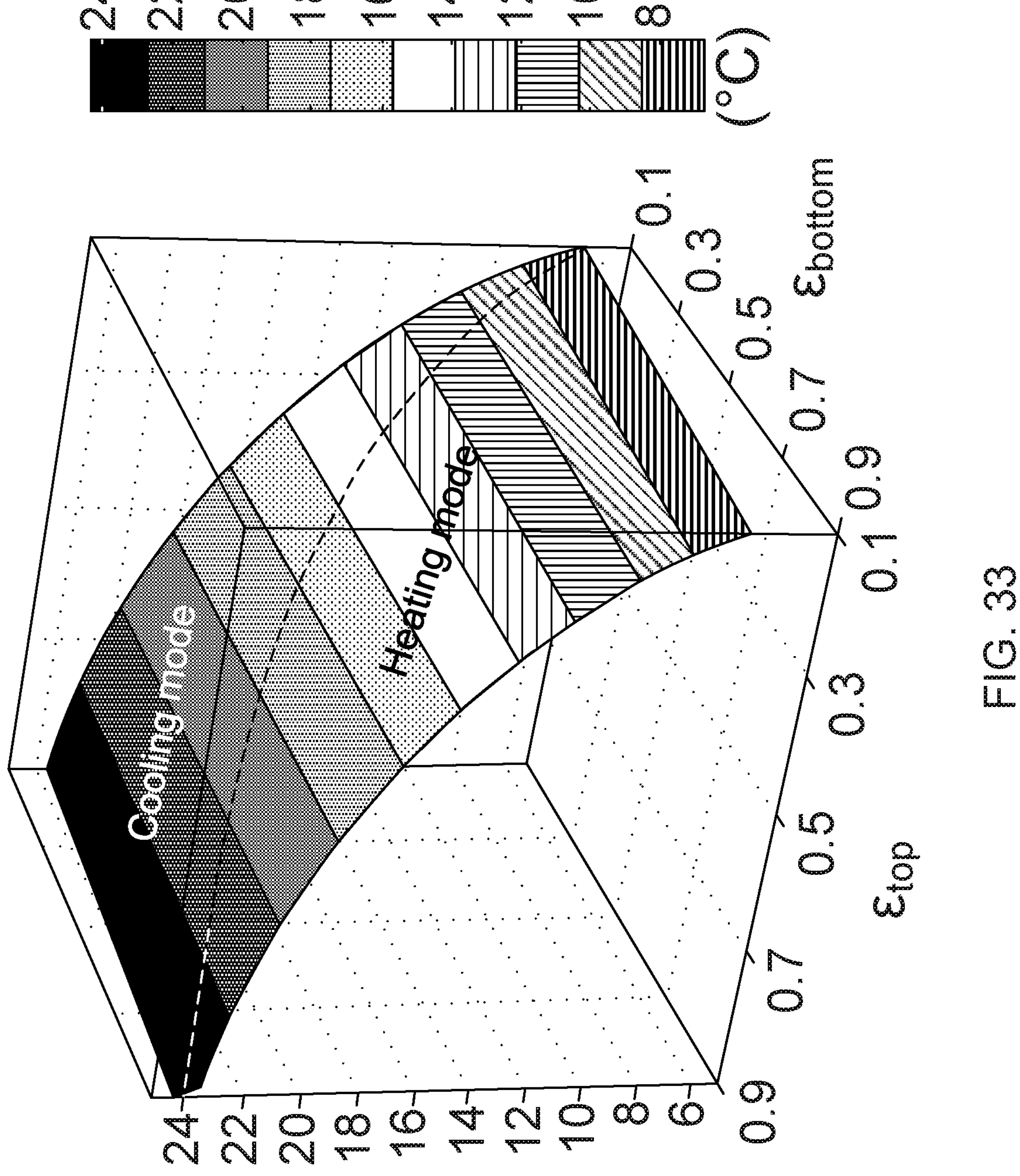
FIG. 33. Calculated comfortable ambient temperature as a function of top and bottom layer emissivities at $T_{skin}$=about 34° C.

In some embodiments, the concept of the dual-mode textile for radiative cooling and heating is based on an asymmetrical thermal emitter embedded in the IR-transparent nanoPE which can allow the emitter to radiate mid-infrared radiation at a desired temperature. The concept is general, and various material choices can be made. For a low-emissivity layer, aluminum and titanium are both highly reflective, inexpensive, stable and non-toxic (FIG. 32). For a high-emissivity layer, silicon dioxide and silicon nitride also have relatively high absorption coefficients at about 9.5 μm, which are about 26574 $cm^{-1}$ and about 9362 $cm^{-1}$, respectively. This broad range of selection provides flexibility for satisfying wearability criteria and temperature range tunability. With such flexibility, the concept of radiative heating/cooling textile also can be applicable to wearable electronics to provide benefits for one another. For example, wearable electronic devices can provide better control of the heat transfer modes or complement the radiative heating/cooling using thermoelectric or electrical heating, and the radiative heating/cooling textile can mitigate against the negative impact of the electronic devices on personal thermal comfort.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Porous Polyethylene Textile for Radiative Human Body Cooling

Materials

The textile samples are obtained as follows: nanoporous PE (Teklon, about 0.5 mil, Entek International LLC), cotton textile (single jersey cotton, about 130 grams per square meter), normal PE (ClingWrap, about 0.5 mil, The Glad Products Company), and Tyvek (about 7 mil, Dupont).

Sample Characterization

The IR transmittance is measured by a FTIR spectrometer (Model 6700, Thermo Scientific) accompanied with a diffuse gold integrating sphere (PIKE Technologies). The visible opacity was measured by a UV-visible spectrometer (Agilent, Cary 6000i). The SEM images were taken by FEI Nova NanoSEM (15 kV).

Visible and IR Transmittance Simulation

Figures 17, 18:
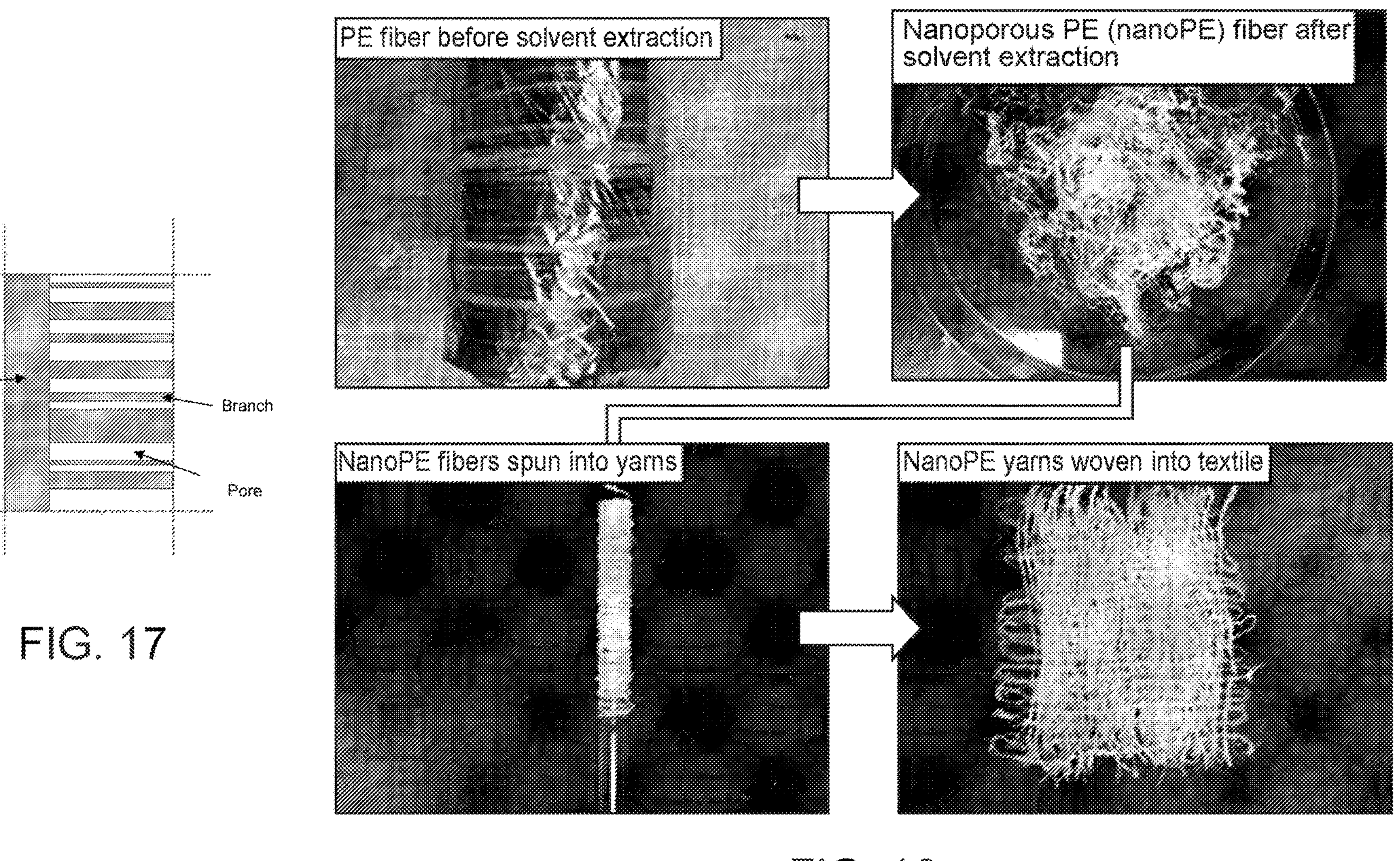
FIG. 17. Unit cell for rigorous coupled-wave analysis (RCWA) transmittance simulation (top view).
FIG. 18. Fabrication process of nanoPE textile.

In this simulation, rigorous coupled wave analysis (RCWA) methods have been employed to simulate the optical properties of nanoPE multi-layered films. The refractive index of PE can be found. FIG. 17 shows a simulation schematic to reflect the random nature of nanoPE structure. Each layer of the nanoPE film is modeled as repeats of the cells depicted in FIG. 17.

Due to the large size of one cell, the interference effects between cells are spectrally far away from the interested wavelength region; thus the simulation should reproduce the actual case faithfully. Each cell is composed of one PE fiber and several small branches and pores. The widths of the pore and the branches are randomly generated. The final nanoPE film is a stack of the one-layer nanoPE, with random offsets among the layers. Multiple random configurations were generated for the structure, and calculated results are averaged. The structural parameters are summarized in Table 2.

TABLE 2

Structural parameters of RCWA simulation model. (The length unit is μm)

| Total thickness | Layers | Single layer thickness | Average pore width | Average branch width | Fiber length | Fiber width |
|---|---|---|---|---|---|---|
| 12 | 1 | 12 | 4.8 | 2.4 | 7.2 | 9.6 |
| 12 | 2 | 6 | 2.4 | 1.2 | 3.6 | 4.8 |
| 12 | 3 | 4 | 1.6 | 0.8 | 2.4 | 3.2 |
| 12 | 4 | 3 | 1.2 | 0.6 | 1.8 | 2.4 |
| 12 | 6 | 2 | 0.8 | 0.4 | 1.2 | 1.6 |
| 12 | 12 | 1 | 0.4 | 0.2 | 0.6 | 0.8 |
| 12 | 24 | 0.5 | 0.2 | 0.1 | 0.3 | 0.4 |

Thermal Measurement

A human body can perform thermoregulation to stabilize the core temperature to maintain physiological functions, the so-called endothermy. For example, when the ambient temperature is high, human body perspires to cool down via evaporation; when the temperature is low, human body shivers to generate more heat. However, either experimentally simulating the thermoregulation or manipulating the ambient temperature involves careful proportional-integral-derivative (PID) control which is slow and often oscillating. Instead of keeping the temperatures constant, the power is set to be substantially constant and measurement is made of the steady-state skin temperature which is determined by power input, thermal resistance, natural convection heat transfer coefficient, surface emissivity, and ambient temperature. The skin is simulated by a fiberglass cloth heating tape (BriskHeat) that is connected to a power supply (Keithley 2400). The generated area power density is about 140 W/m$^2$. A bead-probe thermocouple (K-type, Fluke) which is connected to a temperature monitor (Digi-Sense, Cole-Parmer) was used to measure the skin temperature which is sandwiched by the textile and the insulating foam. Each temperature data is stabilized for about 20 minutes to reach steady state. The ambient temperature is 23.5±0.2° C. The heating tapes cover an area of about 8×8 cm$^2$, the sample size is about 5×5 cm$^2$, and the thermocouple bead probe is about 1 mm in diameter. The thermocouple is in close contact with the heating tapes and the sample. This configuration avoids the measurement from being affected by the edge, so the system can be approximated as an one-dimensional heat transport. The thermal images were taken by a calibrated thermal camera (MikroSHOT, Mikron).

Wearable nanoPE Modification

The polydopamine coating solution is made by dissolving dopamine hydrochloride (about 2 g/L, Sigma-Aldrich) into Tris-buffer solution (about 10 mM, about pH 8.5, Teknova). NanoPE was firstly perforated by a micro-needle array (AdminPatch 300, NanoBioScience) or 30G needles (BD PrecisionGlide) and then dipped into the coating solution for about 24 hours to render the surface hydrophilic. A cotton mesh which has opening of about 1×1 cm$^2$ was made by weaving. The cotton mesh was sandwiched between two layers of PDA-nanoPE and bonded at the joints by using a soldering iron.

Water Vapor Transmission Rate Test

The testing procedure is based on ASTM E96 with modification. About 100-mL media bottles (Fisher Scientific) were filled with about 80-mL of distilled water. The bottles were sealed by the textile samples using open-top caps and silicone gaskets (Corning). The exposed area of textile is about 3 cm in diameter. The sealed bottles were then placed into an environmental chamber in which temperature was held at about 35° C. and relative humidity at 30±10%. The mass of the bottles and the samples was measured periodically, and the reduced mass should come from the evaporated water. The reduced mass was then divided by the area to derive the water vapor transmission.

Air Permeability Test

The testing procedure is based on ASTM D737 with modification. Textile samples were sealed between two pipes using flange adapters, a centering O-ring, and a clamp. The exposed area of textile is about 2.3 cm in diameter. One pipe is connected to a T-connector at the short/straight leg and then connected to the compressed air source. The other pipe is also connected to a T-connector at the short/straight leg and then connected to open air. In other words, the air flows straight through the pipe and the textile. A differential pressure gauge (UEi Test Instruments) was connected to both long/branch legs to measure the pressure drops across the textile sample at different air flow rates.

Wicking Test

The testing procedure is based on AATCC TM 197 with modification. The textile samples were cut into about 2-cm-wide strips and dipped into distilled water. The water started to climb up the sample due to capillary force. The climbing duration was about 10 seconds.

Mechanical Test

The tensile strength test was measured by Instron 5565. The sample size was about 2 cm-wide and about 5 cm-long, and the gauge distance was about 3 cm-long. The displacement rate was about 20 mm/min.

Example 2

Fabrication of Woven NanoPE Textiles

Referring to FIG. 18, PE of various molecular weights was dissolved in paraffin oil to form a viscous PE solution. The solution is loaded inside a syringe, and PE/oil fibers can be extruded to form fibers. Then the fibers were immersed into methyl chloride to remove the paraffin, leaving nanopores throughout the PE fibers. This produces nanoPE fibers. The nanoPE fibers can then be spun into yarns and woven into textiles.

Figure 19:
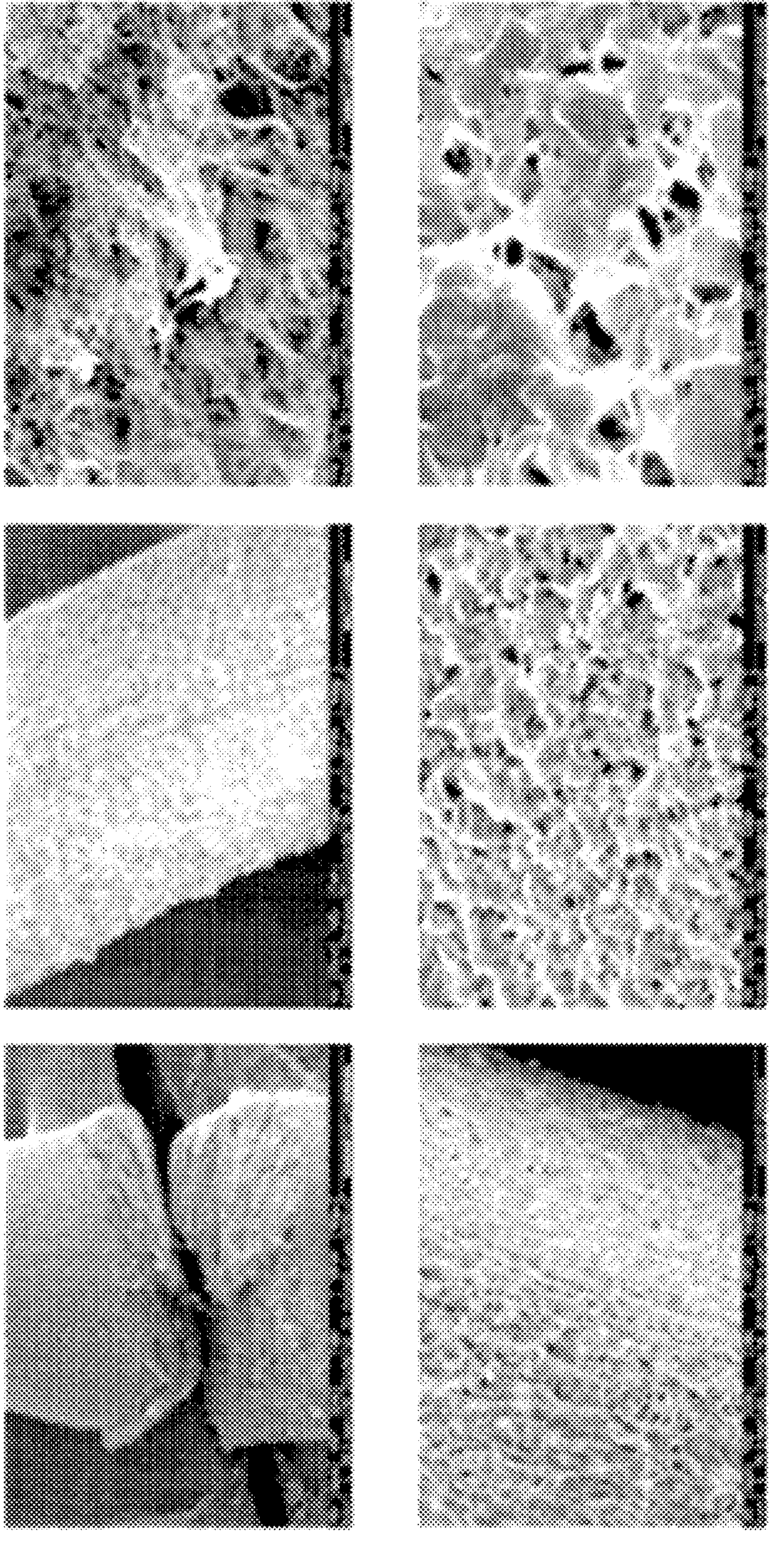
FIG. 19. SEM images of nanoPE fibers.

Referring to FIG. 18 and FIG. 19, the woven nanoPE textiles are expected to "feel" more like normal cloth and have stronger mechanical properties. The nanopores provide air and water vapor permeability, in contrast with normal PE. The IR transparency should remain high with careful control of pore size and fiber diameter. FIG. 19 shows SEM images of the interconnected nanopores.

Example 3

Dual-Mode Textile

Materials and Methods

Materials

The nanoporous polyethylene is obtained from Entek International LLC (Teklon, about 12 μm). The traditional textile is a sweatshirt made by 60% cotton/40% polyester, brushed-back jersey, about 267 grams per square meter, and about 750 μm-thick. The T-shirt textile which was used for wearability test is single jersey 100% cotton, about 130 grams per square meter. Carbon slurry is made by dispersing 1 part of carbon black (Super C65, Imerys Graphite & Carbon) and 1 part of polyacrylonitrile (PAN, molecular weight: about 150000 g/mol, Sigma-Aldrich) in proper amount of N,N-dimethylformamide (DMF, >about 99.8%, Sigma-Aldrich). Silicon dioxide slurry is made by dispersing 9 part of about 0.8 μm silicon dioxide powder prepared by the modified Stöber process and 1 part of polyvinylidene fluoride (PVDF, melting point: about 155-160° C., Alfa Aesar) in proper amount of N-methyl-2-pyrrolidone (NMP, >about 99.0%, Sigma-Aldrich). Silicon nitride slurry is made by dispersing 9 part of silicon nitride powder (>about 99.9%, Sigma-Aldrich) and 1 part of PVDF in proper amount of NMP. All slurries were rigorously stirred for at least about 12 hours before use.

Methods

Bilayer Emitter Fabrication

The high-emissivity layer was formed by doctor-blade coating the slurry which contains high-emissivity materials onto nanoPE. The doctor blade has changeable gauges for different coating thicknesses. The coated films were air-dried until the solvent substantially completely evaporated before testing. The thicknesses were measured by a calibrated micrometer screw gauge. Carbon is about 9 μm or about 4 μm thick, silicon dioxide is about 199 μm thick, and silicon nitride is about 61 μm thick. The low-emissivity layers on nanoPE are deposited by magnetron sputtering of various metals (AJA International), which thicknesses were controlled by the sputtering power and time. Copper is about 150 nm or about 50 nm thick, aluminum is about 150 nm thick, and titanium is about 270 nm thick.

Characterization

The SEM images were taken by FEI XL30 Sirion (about 5 kV). The IR properties were measured by a FTIR spectrometer (Model 6700, Thermo Scientific) accompanied with a diffuse gold integrating sphere (PIKE Technologies). The FTIR was used to measure reflectivity (ρ) and transmissivity (τ), and the emissivity (ε) was calculated based on $\varepsilon=1-\rho-\tau$.

Thermal Measurement

A steady-state, constant heat flux setup is used for measuring the total heat transfer coefficient of the textile samples (FIG. 26). The artificial skin was an about 9 cm×about 8 cm silicone rubber electric heater with a k-type thermocouple attached on the center of the top surface, denoted as $T_{skin}$. An about 9 cm×about 8 cm guard heater was placed below the artificial skin with a k-type thermocouple attached on the center of the bottom surface, denoted as $T_{guard}$, which is kept the same as $T_{skin}$, so the interface between the main heater and the guard heater can be regarded as an insulting boundary. Therefore, the heat generation of the main heater can be treated as an one-directional heat flux, denoted as q. All the electronic equipment stated above were purchased from Omega Engineering. The artificial skin and the tested sample were enclosed in a clear acrylic chamber (TAP Plastics) with circulating water to control the chamber air temperature, denoted as $T_{amb}$ (Cole-Parmer). For all thermal measurements except the real-time comfort zone measurement (FIG. 23B), $T_{amb}$=22° C. and q=51 W/m$^2$. When textiles with different heat transfer coefficients are placed onto the artificial skin or $T_{amb}$ changes, $T_{skin}$ will change accordingly. The textile samples are about 5 cm×about 5 cm in size.

Sweating Hotplate Thermal Measurement

A sweating hotplate is based on the basic components of normal thermal measurement but with additional metal foam water container for simulating perspiration (FIG. 27). The experimental method is based on ASTM F1868 with modification. The metal foam is thermally insulated by fiberglass tapes, and a water-proof and vapor-permeable film is covered on the top of the metal foam to prevent the textile sample from contact with water. To make the vapor pressure substantially constant, the heat flux is adjusted to maintain the artificial skin temperature as 35±0.1° C. for all measurements. The ambient temperature and the relative humidity are controlled. The ambient temperature is controlled by the water recirculator at 19±0.1° C., and the chamber is large enough to keep the relative humidity within 30±5%. Both ambient temperature and relative humidity are measured by a digital hygrometer (Fisher Scientific).

Wearable nanoPE Modification

The wearability modification for dual-mode textile is as follows. NanoPE was firstly perforated by a microneedle array (AdminPatch 300, NanoBioScience) or 30G needles (BD PrecisionGlide). Secondly, it was coated with polydopamine by pH-induced polymerization for about 24 hours. The coating solution is composed of dopamine hydrochloride (about 2 g/L, Sigma-Aldrich), Tris-HCl (about 10 mM, pH of about 8.5, Teknova) and about 50 wt. % methanol/water solution. The processed nanoPE was then coated with the high/low emissivity layer and sewn together by a sewing machine with the same sequence as FIG. 21G. The sewing threads are made of polyester and has a grid-like pattern with mesh size of about 1×about 1 cm$^2$.

Water Vapor Transmission Rate Test

The testing procedure is based on ASTM E96 with modification. About 100 mL media bottles (Fisher Scientific) were filled with about 20 mL of distilled water. The bottles were sealed by the textile samples using open-top caps and silicone gaskets (Corning). The exposed area of textile is about 35 mm in diameter. The sealed bottles were then placed into an environmental chamber in which the temperature was held at about 35° C. and relative humidity at 30±10%. The masses of the bottles and the samples were measured periodically, and the reduced mass should come from the evaporated water. The reduced mass was then divided by the area to derive the water vapor transmission.

Air Permeability Test

The testing procedure is based on ASTM D737 with modification. Textile samples were sealed between two pipes using flange adapters, a centering O-ring, and a clamp. The exposed area of textile is about 17.3 mm in diameter. One pipe is connected to a T-connector at the short/straight leg and then connected to the compressed air source. The other pipe is also connected to a T-connector at the short/straight leg and then connected to open air. In other words, the air flows straight through the pipe and the textile. A differential pressure gauge (UEi Test Instruments) was connected to both long/branch legs to measure the pressure drops across the textile sample at different air flow rates.

Wicking Test

The testing procedure is based on AATCC TM 197 with modification. The textile samples were cut into about 2 cm-wide strips and dipped into distilled water. The water started to climb up the sample due to capillary force. The climbing duration was about 10 seconds.

Mechanical Test

The tensile strength test was measured by Instron 5565. The sample size was about 25 mm-wide and about 5 cm-long, and the gauge distance was about 4 cm-long. The displacement rate was about 10 mm/min.

Thermal Circuit Analysis of Dual-Mode Textile

FIG. 24 shows corresponding thermal circuits of a traditional textile, a cooling-mode textile, and a heating-mode textile. For the traditional textile, the heat transfer circuit remains the same irrespective of which side of textile is facing out (FIG. 24A). The total heat transfer resistance is:

$$R_{textile}^{total} = R_{air\,gap}^{cond} + R_{textile}^{cond} + \frac{R_{air}^{conv} \times R_{textile}^{rad}}{R_{air}^{conv} + R_{textile}^{rad}} \quad (19)$$

where cond, conv, and rad are the abbreviations for conduction, convection, and radiation, respectively.

For the dual-mode textile, the conduction, convection, and air gap resistance are similar. The major difference is that the $$R_{low-\varepsilon}^{rad} \text{ and } R_{high-\varepsilon}^{rad}$$

are capable of performing radiative heat exchange directly with the skin or the ambience, which will change the total heat transfer resistance (FIG. 24B and FIG. 24C). The total heat transfer resistances are:

$$R_{cooling}^{total} = \frac{(R_{air\,gap}^{cond} + R_{thin\,nanoPE}^{cond})R_{skin/low-\varepsilon}^{rad}}{R_{air\,gap}^{cond} + R_{thin\,nanoPE}^{cond} + R_{skin/low-\varepsilon}^{rad}} + R_{bilayer}^{cond} + \frac{(R_{air}^{conv} + R_{thick\,nanoPE}^{cond})R_{high-\varepsilon/amb}^{rad}}{R_{air}^{conv} + R_{thick\,nanoPE}^{cond} + R_{high-\varepsilon/amb}^{rad}} \quad (20)$$

$$R_{heating}^{total} = \frac{(R_{air\,gap}^{cond} + R_{thick\,nanoPE}^{cond})R_{skin/high-\varepsilon}^{rad}}{R_{air\,gap}^{cond} + R_{thick\,nanoPE}^{cond} + R_{skin/high-\varepsilon}^{rad}} + R_{bilayer}^{cond} + \frac{(R_{air}^{conv} + R_{thin\,nanoPE}^{cond})R_{low-\varepsilon/amb}^{rad}}{R_{air}^{conv} + R_{thin\,nanoPE}^{cond} + R_{low-\varepsilon/amb}^{rad}} \quad (21)$$

To analyze the radiation resistance terms, Stefan-Boltzmann's law is used to describe the radiation heat transfer:

$$q^{rad} = \frac{\sigma(T_1^4 - T_2^4)}{\varepsilon_1^{-1} + \varepsilon_2^{-1} - 1} = \frac{\sigma(T_1^2 + T_2^2)(T_1 + T_2)}{\varepsilon_1^{-1} + \varepsilon_2^{-1} - 1}(T_1 - T_2) \quad (22)$$

Assuming $$\overline{T}^2 = \left(\frac{T_1 + T_2}{2}\right)^2 \approx T_1 T_2 \quad (23)$$

then equation (22) becomes:

$$q^{rad} \approx \frac{4\sigma\overline{T}^3}{\varepsilon_1^{-1} + \varepsilon_2^{-1} - 1}(T_1 - T_2) = \frac{4\sigma\overline{T}^3}{\varepsilon_1^{-1} + \varepsilon_2^{-1} - 1}\Delta T \quad (24)$$

Because both skin and ambience have emissivities close to unity, the emissivity of the bilayer can be set as E and equation (24) is rewritten as:

$$q^{rad} = 4\sigma\varepsilon\overline{T}^3\Delta T \quad (25)$$

and so the radiation resistance is:

$$R^{rad} = \frac{\Delta T}{q_{1\to 2}^{rad}} = \frac{1}{4\sigma\varepsilon\overline{T}^3} \quad (26)$$

Assuming $\overline{T}$=(306+298)/2=302 K and plugging the Stefan-Boltzmann constant $\sigma=5.67\times10^{-8}\ Wm^{-2}K^{-4}$ into equation (26) yields:

$$R^{rad} = \frac{1}{4\sigma\varepsilon\overline{T}^3} = \frac{1}{4\times(5.67\times10^{-8})\times\varepsilon\times302^3} \cong \frac{0.16}{\varepsilon}\text{m}^2\text{ K/W} \quad (27)$$

where ε is determined by the bilayer emissivity.

To evaluate how $R^{rad}$ affects the entire thermal circuit, comparison is made with other components, namely convection and conduction. First, consider natural convection. Assuming the human torso is a vertical cylinder of about 1 m-high and about 30 cm in diameter, then the natural convection heat transfer coefficient is:

$$R_{air}^{conv} = \frac{1}{h_{air}^{conv}} = \frac{L}{Nu \times k_{air}} \quad (28)$$

where Nu is the Nusselt number, k is the thermal conductivity of air, and L is the cylinder height. For air at 302 K, thermal expansion coefficient $\beta=1/302=3.311\times10^{-3}$ $K^{-1}$, thermal conductivity $k_{air}$=0.026 W/mK, kinematics viscosity $\nu=18\times10^{-6}$ $m^2/s$, Prandt number Pr=0.72, and gravitational constant g=9.8 $m^2/s$. The Rayleigh number, Ra, is:

$$Ra = GrPr = \frac{g\beta L^3 \Delta T}{\nu^2} Pr = 5.79 \times 10^8 \quad (29)$$

and $$Nu = 0.59 Ra^{1/4} = 91.52 \quad (30)$$

and $$R_{air}^{conv} = \frac{L}{Nu \times k_{air}} = \frac{1}{91.52 \times 0.026} = 0.42 \text{ m}^2\text{K/W} \quad (31)$$

Next, the thermal resistivity of the textile, $k_{tex}$ is about 0.33 W/mK. For an about 12 m-thick nanoPE, the conduction resistance is:

$$R_{tex}^{cond} = \frac{t}{k_{tex}} = \frac{12 \times 10^{-6}}{0.33} = 3.6 \times 10^{-5} \text{ m}^2\text{K/W} \quad (32)$$

Comparison of equations (27), (31), and (32) shows that conduction resistance is much smaller than radiation and convection, which are of a similar order of magnitude. Assuming the interface resistance is also much smaller than radiation and convection resistance, and the high-emissivity layer has emissivity close to 1, the low-emissivity layer has a very low emissivity, then equation (20) can be approximated as:

$$R_{cooling}^{total} \approx (R_{air\ gap}^{cond} + R_{thin\ nanoPE}^{cond}) + R_{bilayer}^{cond} + \frac{R_{air}^{conv} + R_{high-\varepsilon/amb}}{4} \quad (33)$$

and equation (21) becomes:

$$R_{heating}^{total} \approx (R_{air\ gap}^{cond} + R_{thin\ nanoPE}^{cond}) + R_{bilayer}^{cond} + R_{air}^{conv} \quad (34)$$

The above results demonstrate the two heat transfer coefficients of the dual-mode textile is a combinational result of conduction, convection, and radiation.

Comparison of Dual-Modality Between IR-Opaque and IR-Transparent Textiles

Figure 34A:
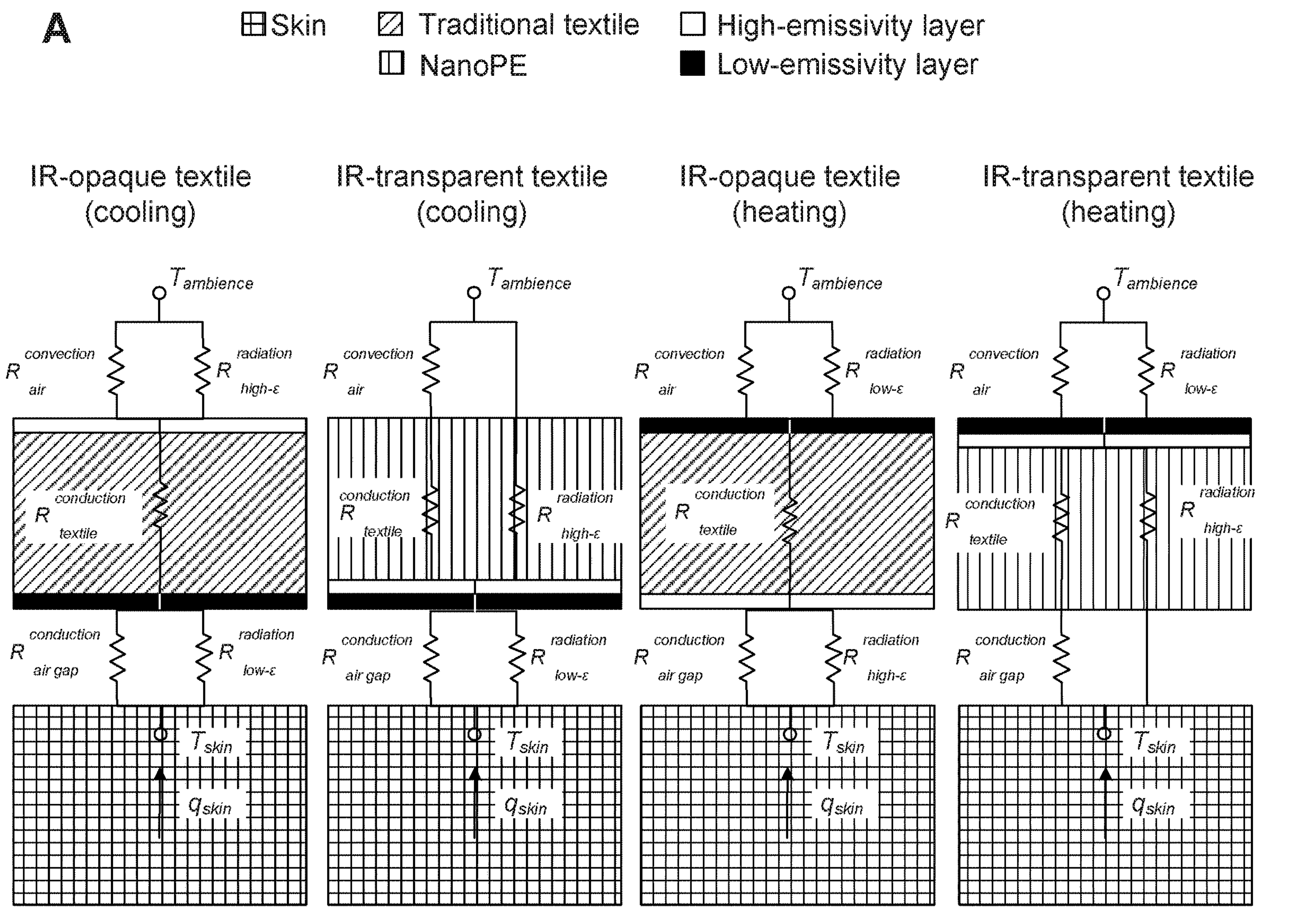
FIG. 34. Comparison between IR-transparent and IR-opaque dual-mode textiles. (A) Heat transfer circuit models of four modes: IR-opaque heating/cooling and IR-transparent heating/cooling. (B) Temperature profiles of the four modes. Note that the IR-transparent textile has much better cooling effect than the IR-opaque textile, but the heating effect is similar. As a result, IR-transparent textile can achieve larger dual-modality.
Figure 34B:
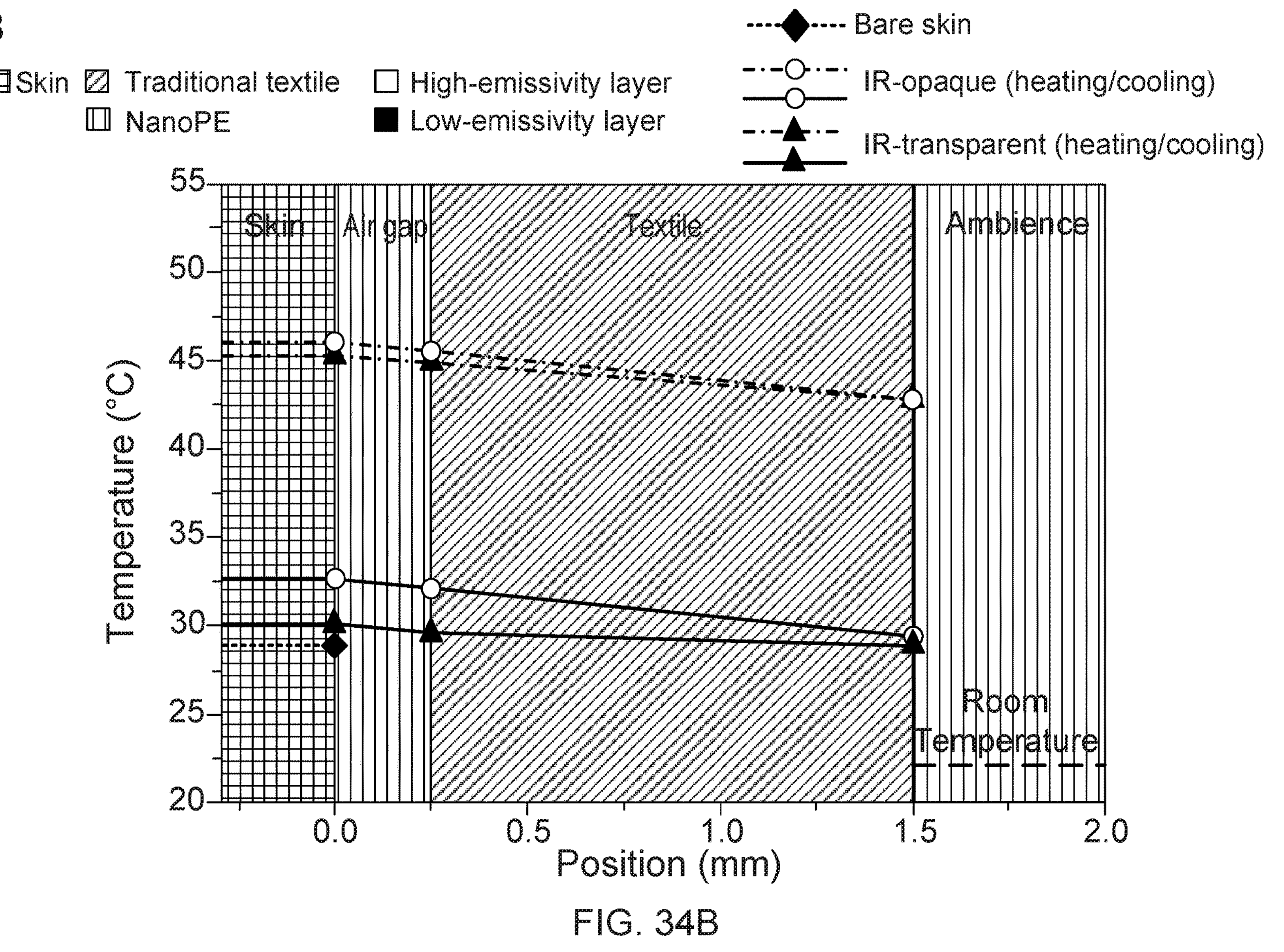
Figure 35:
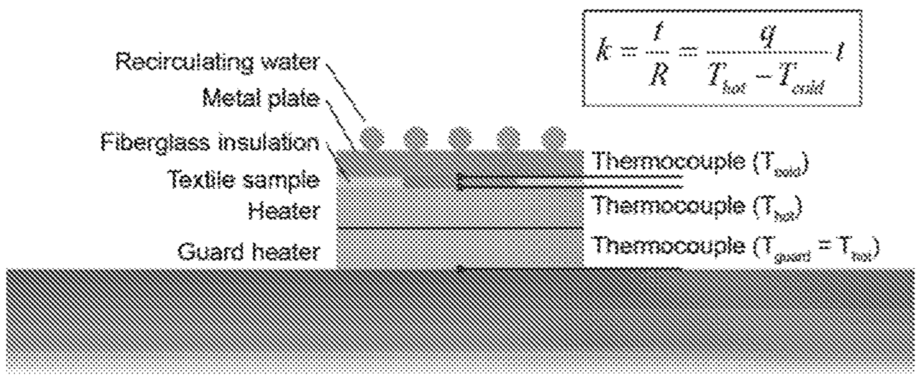
FIG. 35. Guarded hotplate setup for thermal conductivity measurement.
Figure 36:
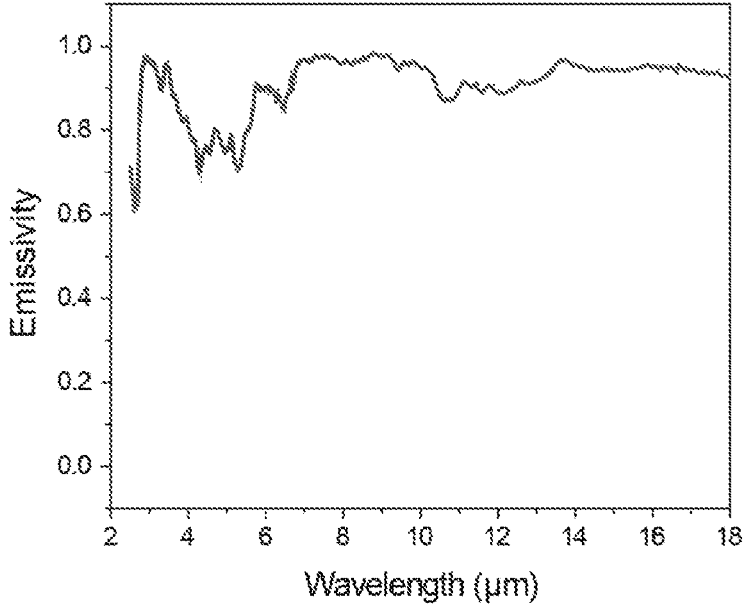
FIG. 36. Emissivity spectrum of a traditional textile.

In addition to nanoPE, other materials with asymmetrical emissivities can have, to some extent, dual-modality. However, IR-transparent materials (e.g., nanoPE) can realize both meaningful cooling and heating, but IR-opaque materials largely switch between "warm" and "warmer." Here, it is demonstrated that the dual-mode textile formed by IR-opaque layers (IR-opaque/carbon black/metal) is less effective than the design achieved by the nanoPE (IR-transparent/carbon black/metal). FIG. 34A are the heat transfer circuits of four configurations: IR-opaque heating/cooling and IR-transparent heating/cooling. Without loss of generality, the bilayer emitter is placed on the outside of the IR-transparent layer. FIG. 34B shows the calculated temperature profile of four configurations by plugging the thermal resistances into the heat transfer circuits:

$$T_{ambient} = 22^\circ \text{ C.}, \varepsilon_{skin} = 0.98, \varepsilon_{wall} = 1, \varepsilon_{high-\varepsilon} = 0.9,$$
$$\varepsilon_{low-\varepsilon} = 0.1, \tau_{IR-transparent} = 1, \tau_{IR-opaque} = 0$$
$$R_{textile}^{conduction} = 0.05 \text{ m}^2\text{K/W}, R_{air}^{convection} = 0.5 \text{ m}^2\text{K/W},$$
$$R_{air\ gap}^{conduction} = 0.01 \text{m}^2\text{K/W}.$$

At cooling mode, the IR-transparent textile is about 2.5° C. cooler than the IR-opaque textile and is very close to the bare skin scenario. Because bare skin represents the lower threshold of skin temperature, it is not a trivial task to achieve such a large difference in cooling effect without maximizing radiative heat transfer using IR-transparency. If the air gap resistance is infinitely small and the carbon layer has emissivity as high as human skin, then the cooling power will be very close to the case with just nanoPE. This poses a fundamental distinction between IR-transparent and IR-opaque textile. At heating mode, the IR-opaque textile is about 0.8° C. warmer than the IR-transparent, so the IR-transparent textile has a much more pronounced dual-modality. Essentially, IR-transparent textile can approach the bare skin threshold and switch the heat transfer mode between "cool" and "warm", but IR-opaque textile can achieve "warm" and "warmer".

To generalize the comparison between IR-transparent and IR-opaque textile, comparison can be made of their total thermal resistances. In most scenarios, the temperature difference between the skin and the ambience is tens of degrees Celsius, and it can be assumed that the radiation heat transfer coefficient is independent of the emitter temperature. Therefore, for cooling mode:

$$R_{IR-opaque}^{cooling} = \frac{R_1 R_2}{R_1 + R_2} + R_3 + \frac{R_4 R_5}{R_4 + R_5} \quad (35)$$

$$R_{IR-transparent}^{cooling} = \frac{(R_1 + R_3) R_2}{(R_1 + R_3) + R_2} + \frac{R_4 R_5}{R_4 + R_5} \quad (36)$$

$$\Delta R^{cooling} = R_{IR-opaque}^{cooling} - R_{IR-transparent}^{cooling} = \frac{R_1 R_2}{R_1 + R_2} + R_3 - \frac{(R_1 + R_3) R_2}{(R_1 + R_3) + R_2} = \frac{R_3 (R_1^2 + 2R_1 R_2 + R_2 R_3 + R_1 R_3)}{(R_1 + R_2)(R_1 + R_2 + R_3)} > 0 \quad (37)$$

where $$R_1 = R_{air}^{convection},\ R_2 = R_{high-\varepsilon}^{radiation},\ R_3 = R_{textile}^{conduction},\ R_4 = R_{air\ gap}^{conduction},\ R_5 = R_{low-\varepsilon}^{radiation}. \quad \text{Equation (37)}$$

shows that the IR-transparent textile is always cooler than the IR-opaque textile.

Similarly, for heating mode:

$$\Delta R^{heating} = R_{IR-opaque}^{heating} - R_{IR-transparent}^{heating} = \frac{R_4R_2}{R_4+R_2} + R_3 - \frac{(R_4+R_3)R_2}{(R_4+R_2)+R_2} = \frac{R_3(R_4^2+2R_4R_2+R_2R_3+R_4R_3)}{(R_4+R_2)(R_4+R_2+R_3)} > 0 \quad (38)$$

which corresponds to replacing $R_1$ in equation (37) with $R_4$.

To demonstrate that the IR-transparent textile has higher dual-modality, it should be established that:

$$\left(R_{IR-transparent}^{heating} - R_{IR-transparent}^{cooling}\right) - \left(R_{IR-opaque}^{heating} - R_{IR-opaque}^{cooling}\right) = \Delta R^{cooling} - \Delta R^{heating} > 0 \quad (39)$$

Consider the $R_1$ derivative of $\Delta R^{cooling}$:

$$\frac{d\Delta R^{cooling}}{dR_1} = \frac{R_2^2R_3(2R_1+2R_2+R_3)}{(R_1+R_2)^2(R_1+R_2+R_3)^2} > 0 \quad (39)$$

This means $\Delta R^{cooling}$ decreases as $R_1$ decreases. In most scenarios, the thermal resistance of convection is much larger than that of air gap conduction, namely $R_1 > R_4$. Because $\Delta R^{cooling}$ and $\Delta R^{heating}$ has the same expression except for exchanging $R_1$ and $R_4$, this means $\Delta R^{cooling} > \Delta R^{heating}$. Therefore, equation (39) is valid, and the IR-transparent textile has higher dual-modality than the IR-opaque textile.

Numerical Fitting of Dual-Mode Textiles

Figure 28:
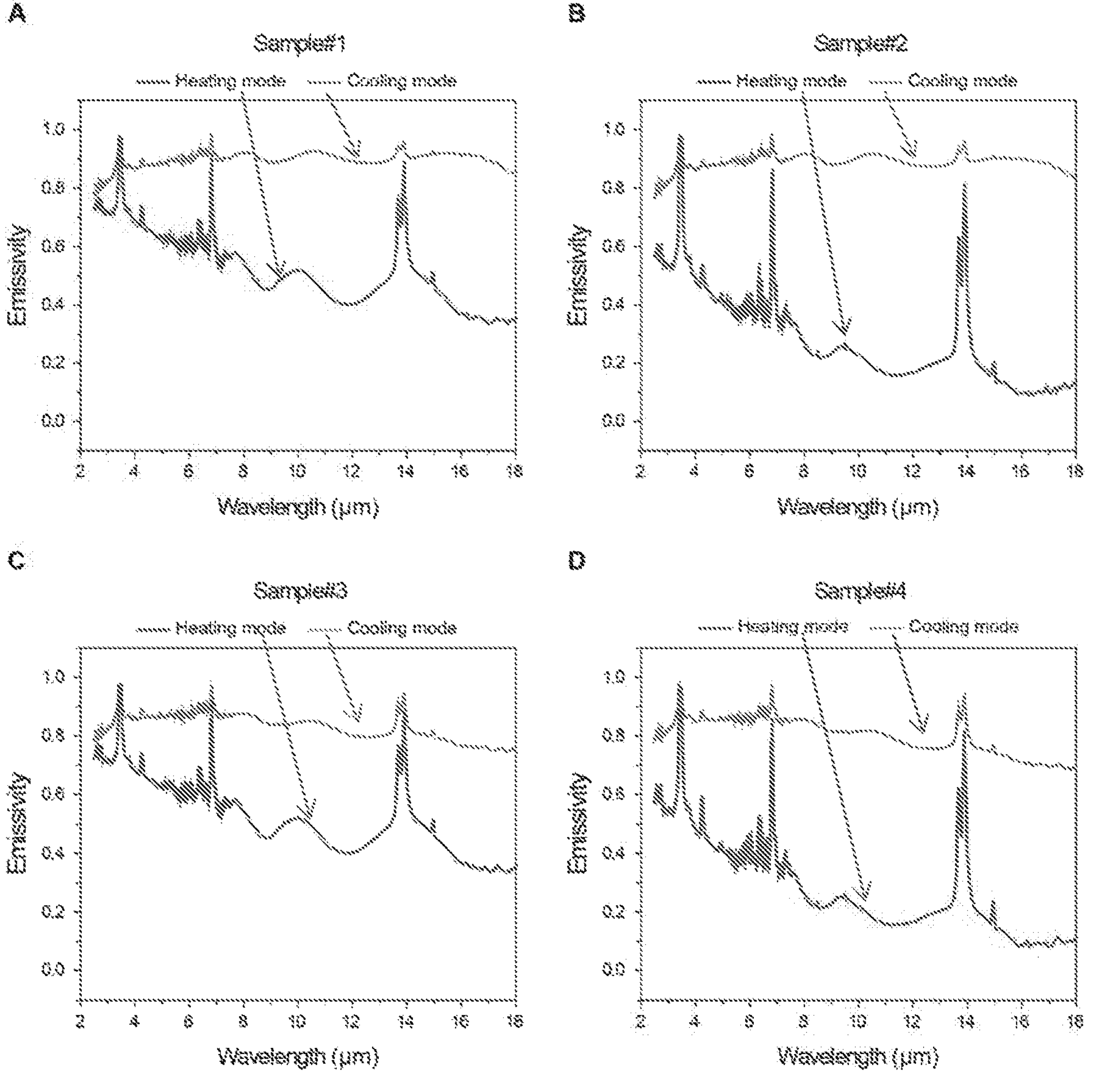
FIG. 28. Emissivities of samples #1-4 used in the experiments. (A) Sample #1. (B) Sample #2. (C) Sample #3. (D) Sample #4.

To predict the maximal dual-modality base on the proposed design, the heat transfer resistance components in the thermal circuit are fitted using equations (20) and (21), and the thermal measurement and emissivity data of the bare skin and the eight dual-mode measurements (FIG. 28). The input by the experiments are $T_{skin}$, $T_{amb}$, q, $\varepsilon_{top}$, and $\varepsilon_{bottom}$, and the input by other reports are $$\varepsilon_{skin}^{artificial} = 0.8,\ \varepsilon_{ambience} = 1, \text{ and } \sigma = 5.67\times10^{-8}Wm^{-2}K^{-4}.$$

$T_{amb}$ is assumed to be about 22° C. when calculating artificial skin temperature. Because the transmittance of nanoPE has been accounted when measuring emissivities, nanoPE is treated as completely IR-transparent in the fitting process. The temperatures of bilayer emitters were expressed by these inputs, and then the expression for radiation resistances can be derived. The radiation, conduction, and convection resistance are used to calculate the total heat transfer resistance, which yields the calculated artificial skin temperature. These calculated values are fitted with the experimental values using least squares linear regression method to derive the heat transfer resistance components (Table 4). The contact resistance within the bilayer is assumed to be the same as within two layers of nanoPE, and the thermal conductivity of nanoPE and carbon coating were excerpted from reported values.

Gray Body Assumption

Figure 37:
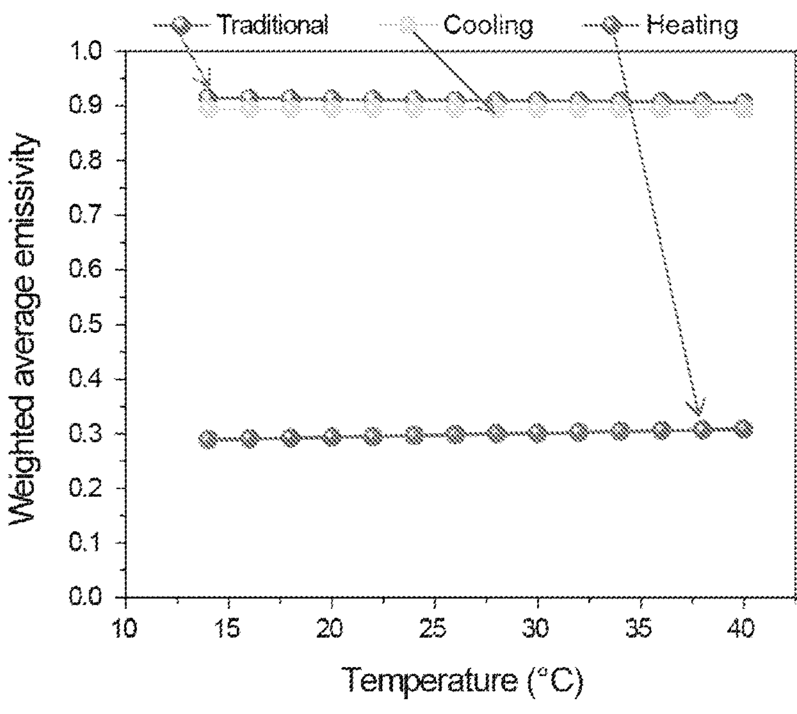
FIG. 37. Weighted average emissivities of heating-mode, cooling-mode, and traditional textile as a function of temperature. The emissivities stay substantially constant throughout the entire temperature range. This means the gray body approximation for textiles is valid within the temperature range.

In this Example, a gray-body assumption is applied to the textiles, namely $\varepsilon_{tex}(T_{skin})=\alpha_{tex}(T_{skin}, T_{amb})$. This assumption is valid because the temperature difference between the textile and the ambience, which is usually less than about 20K, is small enough to neglect the wavelength distribution of the thermal radiation. Quantitatively, the emissivity spectrum of cooling-mode, heating-mode, and traditional textile are used to calculate the weighted average emissivities as a function of temperature (FIG. 37). The emissivities are substantially constant throughout the entire ambient temperature range. According to Kirchhoff's Law, these weighted average emissivities are substantially the same as the weighted average absorptivity at the same temperature. This means the absorptivity of textile for the ambience ($T_{amb}$=about 14-40° C.) is substantially the same as the emissivity at skin temperature ($T_{skin}$=34° C.).

TABLE 3

Thickness of dual-mode textiles.

| Sample | High-ε layer | Low-ε layer |
|---|---|---|
| #1 | Carbon about 9 μm | Copper about 50 nm |
| #2 | Carbon about 9 μm | Copper about 150 nm |
| #3 | Carbon about 4 μm | Copper about 50 nm |
| #4 | Carbon about 4 μm | Copper about 150 nm |
| Carbon only | Carbon about 9 μm | |
| Copper only | Copper about 150 nm | |

TABLE 4

Numerically fitted values of heat transfer components.

| Heat transfer components | Resistance ($m^2K/W$) |
|---|---|
| $R_{skin/textile}^{interface}$ | 0.0657947 |
| $R_{thin\ nanoPE}^{cond}$ | 0.000036 |
| $R_{thick\ nanoPE}^{cond}$ | 0.0285214 |
| $R_{bilayer\text{-}9\ \mu m}^{cond}$ | 0.0284583 |
| $R_{bilayer\text{-}4\ \mu m}^{cond}$ | 0.0284534 |
| $R_{air}^{conv}$ | 0.5947054 |

TABLE 5

Thermal properties of dual-mode and traditional textiles measured by guarded hotplate method.

| Sample | Thickness (μm) | Heat flux (W/m$^2$) | $T_{hot}$ (° C.) | $T_{cold}$ (° C.) | Resistance (m$^2$K/W) | Conductivity (W/mK) | Average emissivity |
|---|---|---|---|---|---|---|---|
| Traditional | 749 | 447 | 36.3 | 31.1 | 0.0116 | 0.0645 | 0.909 |
| Dual-mode | 45 | 558 | 37.9 | 36.9 | 0.0018 | 0.0251 | 0.894/0.303 |

Example 4

Insulation Property of Bifunctional Textiles

Figure 38:
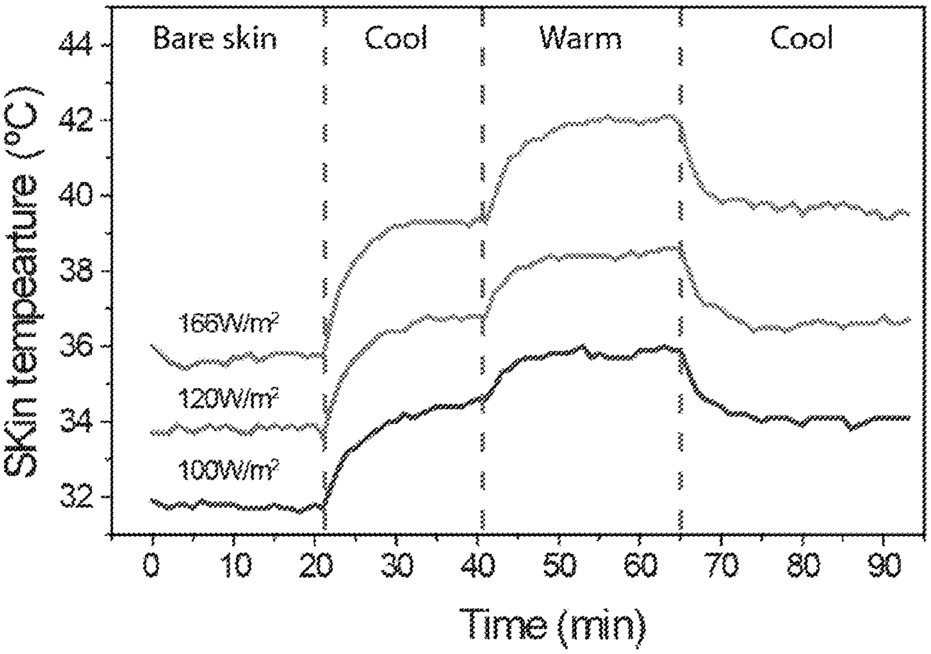
FIG. 38. Insulation property measurements.

Referring to FIG. 38, thermal measurements were performed to demonstrate the insulation property of a bifunctional textile. Here, three different levels of power have been applied to simulate difference metabolic heat generation rates, which represent different initial skin temperatures.

In a first stage, there was no textile sample, so a thermocouple measured bare simulated skin temperature. At about 21 minutes, a cooling-mode bifunctional textile was placed onto the simulated skin and some temperature increase was observed. At about 41 minutes, the textile sample was flipped, so it started to operate under a heating mode. About 2° C. of skin temperature difference was observed. This demonstrates the bifunctionality of the textile sample. At about 65 minutes, the textile sample was flipped back to the cooling mode and a temperature dropped was observed. This thermal measurement is an experimental demonstration of a textile that possesses two insulation properties.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A textile comprising:

a first porous layer including a first polyolefin;

a first coating disposed immediately on the first porous layer, wherein the first coating comprises one of a carbonaceous material, a non-metal oxide, or a non-metal nitride;

a second coating comprising one of a metal or a metal alloy and disposed immediately on the first coating; and a second porous layer including a second polyolefin and having a transmittance of infrared radiation at the wavelength of 9.5 μm of at least 40%, wherein the first coating and the second coating are disposed between the first porous layer and the second porous layer, and the second coating is in contact with the second porous layer, wherein the first porous layer has a thickness greater than a thickness of the second porous layer, and the thickness of the second porous layer is about 12 μm;

wherein the first coating has a thickness greater than a thickness of the second coating, wherein the thickness of the first coating is about 4-9 μm and the thickness of the second coating is about 50-150 nm; and wherein the first coating has a greater emissivity with respect to infrared radiation than the second coating.

2. The textile of claim 1, wherein the first porous layer has pores having an average pore size in a range of 50 nm and 1000 nm.

3. The textile of claim 1, wherein the first coating has a first emissivity of infrared radiation at the wavelength of 9.5 μm, the second coating has a second emissivity of infrared radiation at the wavelength of 9.5 μm, and a difference between the first emissivity and the second emissivity is at least 0.4.

4. The textile of claim 1, wherein the first coating comprises the carbonaceous material, and wherein the carbonaceous material comprises carbon black.

5. The textile of claim 1, wherein the metal comprises one of copper, aluminum, or titanium.

* * * * *